（12）United States Patent
Kato

(10) Patent No.: US 7,110,362 B2
(45) Date of Patent: Sep. 19, 2006

(54) NETWORK MANAGEMENT SYSTEM

(75) Inventor: Kei Kato, Chiba (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 959 days.

(21) Appl. No.: 10/074,048

(22) Filed: Feb. 14, 2002

(65) Prior Publication Data

US 2002/0112060 A1 Aug. 15, 2002

(30) Foreign Application Priority Data

| Feb. 15, 2001 | (JP) | ............................. 2001-038245 |
| Mar. 6, 2001 | (JP) | ............................. 2001-062513 |
| Apr. 25, 2001 | (JP) | ............................. 2001-127818 |
| Apr. 25, 2001 | (JP) | ............................. 2001-127819 |

(51) Int. Cl.
*H04J 1/16* (2006.01)

(52) U.S. Cl. ................................. 370/236.1; 370/236.2

(58) Field of Classification Search ................ 370/231, 370/236, 236.1, 236.2, 241, 242, 241.1, 247, 370/248, 251, 252, 262
See application file for complete search history.

(56) References Cited

U.S. PATENT DOCUMENTS

| 5,323,394 | A | | 6/1994 | Perlman |
| 5,634,097 | A | * | 5/1997 | Ashi et al. ..................... 714/45 |
| 5,675,741 | A | | 10/1997 | Aggarwal et al. |

FOREIGN PATENT DOCUMENTS

| JP | 10-224350 | 8/1998 |
| JP | 2000-216830 | 8/2000 |

OTHER PUBLICATIONS

Stevens et al., "Traceroute Program," TCP/IP Illustrated: The Protocols, Professional Computing Series, Reading, MA: Addision Wesley, vol. 1, pp. 97-109 (1994).
Govindan et al., "Heuristics for Internet Map Discovery," Infocom 2000, Nineteenth Annual Joint Conference of the IEEE Computer And Communications Societies, Proceedings, pp. 1371-1380 (2000).

* cited by examiner

*Primary Examiner*—Brenda Pham
(74) *Attorney, Agent, or Firm*—Venable LLP; Michael A. Sartori

(57) ABSTRACT

A network management system is provided which is capable of reducing a load of processing to be performed by each of nodes when information about a path on a network in each of nodes is acquired.

The network management system includes a first edge node serving as an entrance unit to a communication network, second edge node serving as an exit unit, relay node mounted between both the edge nodes and path information acquiring unit to send out a tracing signal used to trace a transfer signal along a transfer route to the first edge node and to obtain information about a path for the transfer signal. Each node is made up of a path information holding unit, tracing signal residing unit, and tracing signal sending unit. The path information acquiring unit acquires the information about the path on a transfer route from one node out of a plurality of nodes.

63 Claims, 15 Drawing Sheets

Fig.8

| Class / Degree of importance | Class 4 ~74 Precedence: Emergency(100) | Class 3 ~75 Precedence: Urgency(Flash Override, 100) Urgency(Flash,011) | Class 2 ~76 Precedence: Immediacy(010) Priority(001) | Class 1 ~77 Precedence: Ordinary(000) |
|---|---|---|---|---|
| Degree of importance (High) ~71 Sender IP address:AAA (Low delay,high throughput) | Transmission of four packets per one time transmission. Order of transmitting 1, 31, 51 ~78 | Transmission of three packets per one time transmission. Order of transmitting 2,5, 32,35, 52,55 ~79 | Transmission of two packets per one time transmission. Order of transmitting 3,6,8, 33,36,38, 53,56,58 ~80 | Transmission of one packet per one time transmission. Order of transmitting 4,7,9,10, 34,37,39,40, 54,57,59,60 ~81 |
| Degree of importance (Middle) ~72 Sender IP address:CCC (High throughput) | Transmission of four packets per one time transmission. Order of transmitting 11, 41 ~82 | Transmission of three packets per one time transmission. Order of transmitting 12,15, 42,45 ~83 | Transmission of two packets per one time transmission. Order of transmitting 13,16,18, 43,46,48 ~84 | Transmission of one packet per one time transmission. Order of transmitting 14,17,19,20, 44,47,49,50 ~85 |
| Degree of importance (Low) ~73 Sender IP address:EEE (Ordinary) | Transmission of four packets per one time transmission. Order of transmitting 21 ~86 | Transmission of three packets per one time transmission. Order of transmitting 22,25 ~87 | Transmission of two packets per one time transmission. Order of transmitting 23,26,28 ~88 | Transmission of one packet per one time transmission. Order of transmitting 24,27,29,30 ~89 |

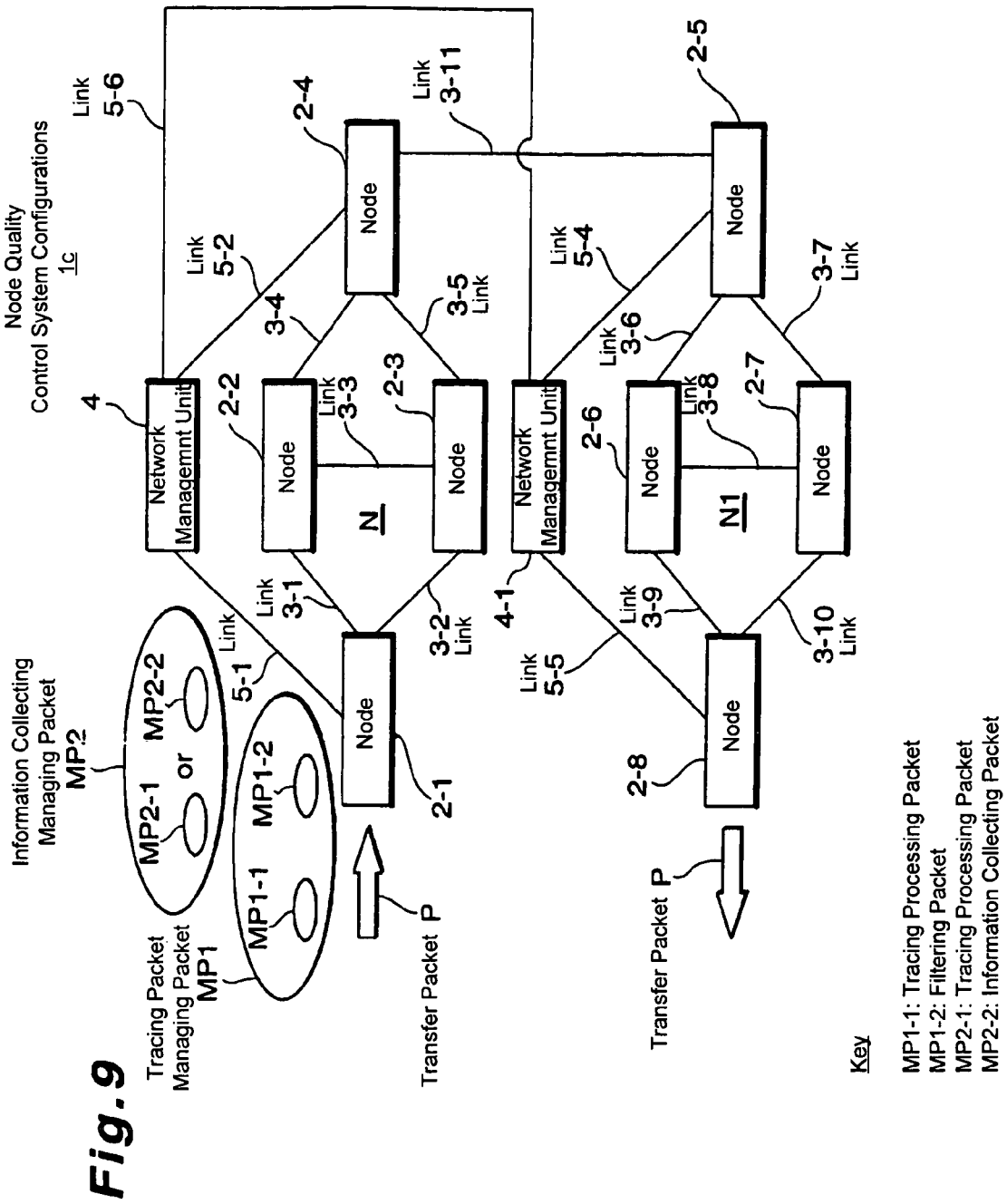

Fig.11

[Table 7']  ~7'

| Value for check item \ Check item | Value of check item exceeds maximum threshold value ~72 | Value of check item equal to maximum threshold value ~73 | Value of check item is minimum threshold value or more and maximum threshold or less ~74 | Value of check is minimum threshold value or less ~75 |
|---|---|---|---|---|
| Average use frequency of queuing for transfer packet in node ~71 | Transfer packet is abandoned ~71a | Transfer packets are abandoned at designated frequency ~71b | Transfer packets are abandoned depending on values of check item ~71c | Transfer packets are not abandoned ~71d |
| First option (Above check item + precedence of transfer packet) ~76 | All transfer packets are abandoned starting from packet having lower precedence ~76a | Transfer packets are abandoned starting from packet having lower precedence at designated frequency ~76b | Transfer packets are abandoned starting with packet having lower precedence, depending on average frequency of queuing as value of check item ~76c | Not transfer packets are abandoned ~76d |
| Second option (Average frequency of queuing control section of predetermined transfer packet ~77 | All predetermined transfer packets P are abandoned ~77a | Predetermined transfer packet P is abandoned by designated frequency ~77b | Predetermined transfer packet is abandoned depending on value of check item ~77c | No predetermined transfer packet P is abandoned ~77d |
| Third option (Contents provided in second option + precedence of predetermined transfer packets P) ~78 | All packets P having lower precedence are abandoned ~78a | Predetermined transfer packet P is abandoned starting with packet having lower precedence with designated frequency ~78b | Predetermined transfer packet P is abandoned starting with packet having lower precedence and depending on value of check item ~78c | No predetermined transfer packet P is abandoned ~78d |

Fig.12

[Table 8] ~8

| Check item \ Value for check item | Value of check item exceeds maximum threshold value ~82 | Value of check item equal to maximum threshold value ~83 | Value of check item is minimum threshold value or more and maximum threshold or less ~84 | Value of check is minimum threshold value or less ~85 |
|---|---|---|---|---|
| Average transmission rate in traffics of transfer packet in node ~81 | Transfer packet is abandoned ~81a | Transfer packets are abandoned at designated frequency ~81b | Transfer packets are abandoned depending on values of check item ~81c | Transfer packets are not abandoned ~81d |
| Fourth option (Above check item + precedence of transfer packet) ~86 | All transfer packets are abandoned starting from packet having lower precedence ~86a | Transfer packets are abandoned starting from packet having lower precedence at designated frequency ~86b | Transfer packets are abandoned starting with packet having lower precedence, depending on average frequency of queuing as value of check item ~86c | Not transfer packets are abandoned ~86d |
| Fifth option (Average transmission rate in traffics of predetermined packet in node) ~87 | All predetermined transfer packets P are abandoned ~87a | Predetermined transfer packet P is abandoned by designated frequency ~87b | Predetermined transfer packet is abandoned depending on value of check item ~87c | No predetermined transfer packet P is abandoned ~87d |
| Sixth option (Fifth option + precedence of predetermined transfer packet P) ~88 | All packets P having lower precedence are abandoned ~88a | Predetermined transfer packet is abandoned starting with packet having lower precedence with designated frequency ~88b | Predetermined transfer packet P is abandoned starting with packet having lower precedence and depending on value of check item ~88c | No predetermined transfer packet P is abandoned ~88d |

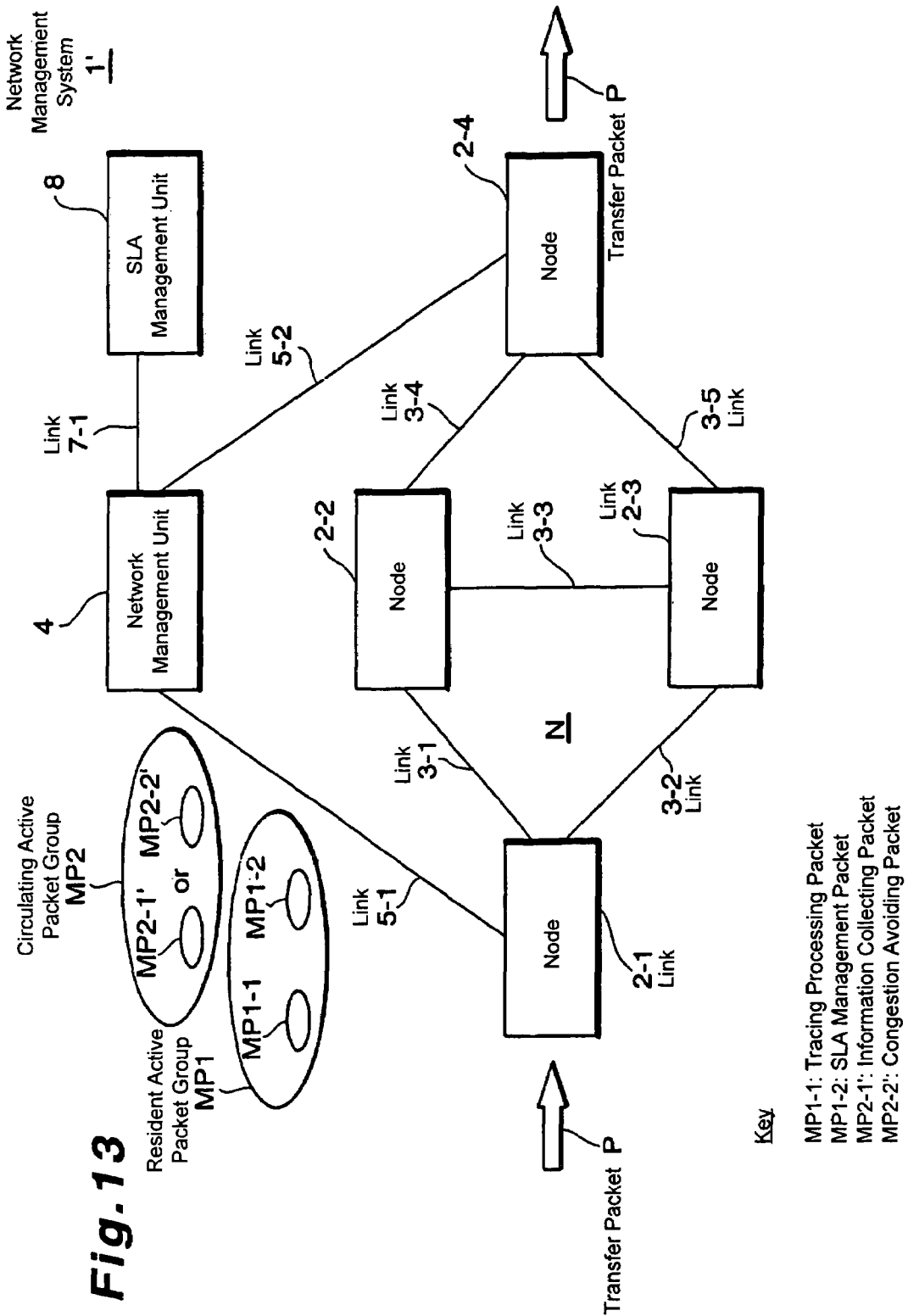

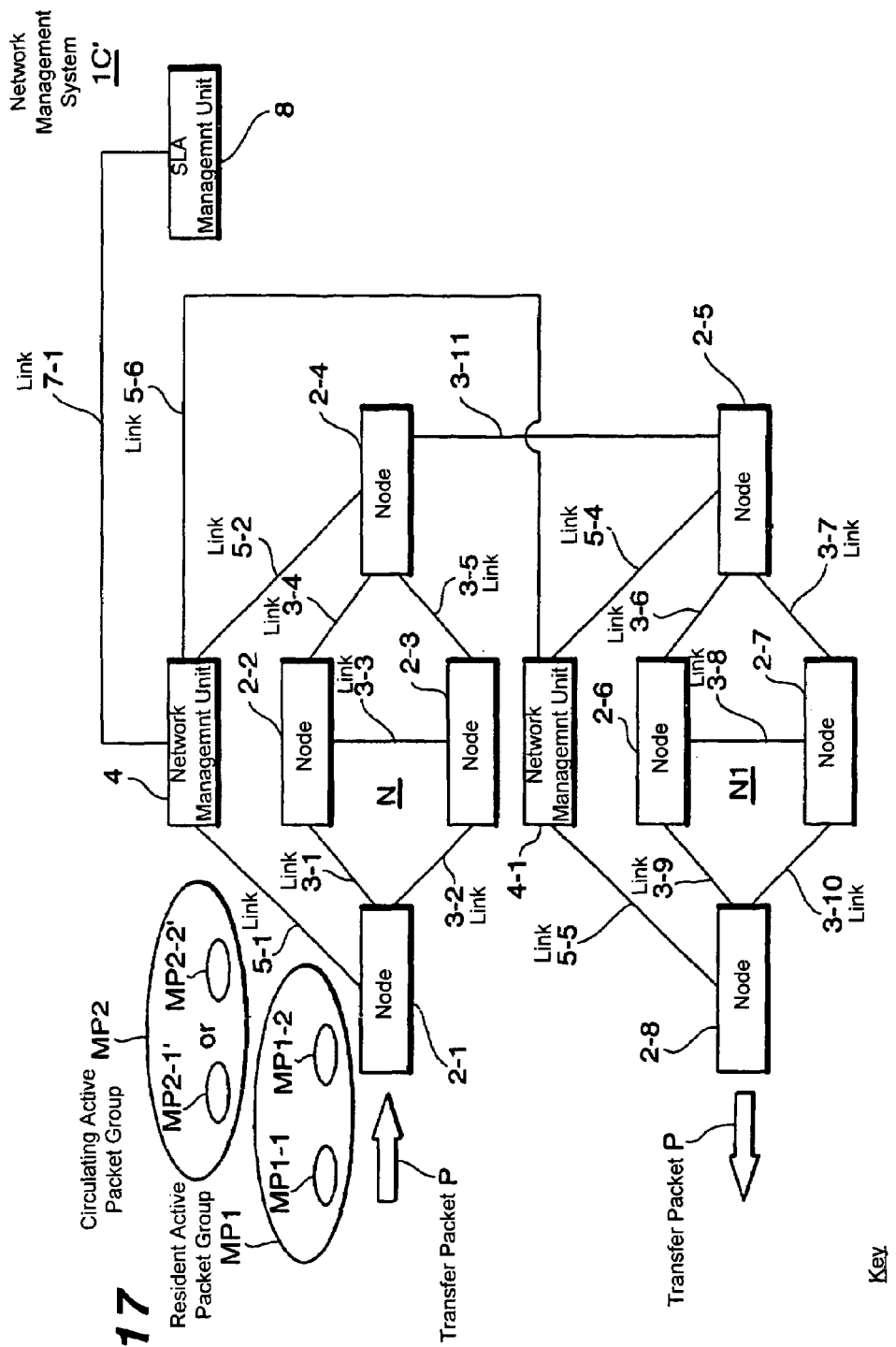

NETWORK MANAGEMENT SYSTEM

BACKGROUND OF THE INVENTION

1. Field of the Invention

The present invention relates to a network management system and more particularly to the network management system being suitable for acquiring information about a path through which a packet has passed in a network which is of a connectionless mode communication type.

2. Description of the Related Art

In a general network management system, for example, a device adapted to manage the network acquires information about connection among transmission paths housed in units making up nodes on the network and about packets having passed through the transmission paths and, based on the acquired information, produces information about a path of a network through which a packet has passed, that is, information indicating contents of the packet having passed through the path and kinds or numbers of the paths through which the packet has passed and holds the information. Such conventional technology is disclosed in Japanese Patent Application Laid-open Nos. Hei 10-224350 and 2000-216830.

However, in the conventional connectionless-type network management system, when the network managing device acquires information about a series of paths existing between a unit which has originally produced a packet and a destination of the packet transmission, processing of having information about the passage of each of packets supplied from all nodes to the network managing device in each of nodes is required, irrespective of whether or not the packet has passed in each of nodes. That is, irrespective of whether or not a packet passes through a node, setting to cause the node to provide information about the passage of the packet is needed, which is wasteful processing. Moreover, the network managing device acquires information about the node through which the packet does not pass, which is also wasteful processing.

In some cases, the network management unit requires that not only the information about the path but also information about delay time in the passage of packets in each of the nodes as information to be used for management be provided. If such the processing is required, when the packet does not pass through the node, it means that further additional wasteful processing is performed.

Furthermore, as the number of nodes to be installed on the network increases, the number of the nodes from which information has to be acquired increases and, as a result, processing that has to be performed by the network managing system becomes complicated.

Same problems as described above occur not only in the connectionless network but also a connection oriented type network in which communications are carried out with the connection being established in advance. That is, it means that the network managing device has to acquire information from all the nodes whose connection has been established.

SUMMARY OF THE INVENTION

In view of the above, it is an object of the present invention to provide a network management system which is capable of reducing a load of processing to be performed by each of nodes and in a network management unit when information about management of network in each of nodes is acquired.

It is another object of the present invention to control Quality of Service (QoS) of a packet transfer path in response to information about communication quality of the network in each of nodes and to reduce a load of processing being associated with the QoS control by each of nodes and by the network management unit, in the above network management system.

It is still another object of the present invention to perform processing of filtering a packet in each of nodes located in the packet transfer path and to reduce the load of processing being associated with the filtering processing by each of nodes and by the network management unit, in the above network management system.

It is still another object of the present invention to perform SLA (Service Level Agreement) management for a packet based on information acquired in each of nodes located in the packet transfer path and to reduce the load of processing being associated with the management by each of nodes and by the network management unit, in the above network management system.

According to a first aspect of the present invention, there is provided a network management system including:

a communication network having a first edge node serving as an entrance unit to the network for a transfer signal passing through the network, a second edge node serving as an exit unit used to send out the transfer signal from the network to an outside and a relay node being mounted between the first edge node and the second edge node and on a transfer route extending from the first node to the second node;

a path information acquiring unit being connected to the first edge node and second edge node so as to be communicable with the first and second edge nodes and being used to send out a tracing signal used to trace the transfer signal along the transfer route on which the transfer signal has passed, to the first edge node, and being used to acquire information about a path through which the transfer signal passes; and wherein each of the nodes is made up of a path information holding unit used to hold information about the path through which the transfer signal passes, a tracing signal residing unit used to make the tracing signal be resident when having received the tracing signal and to produce a replica of the tracing signal and a tracing signal transmitting unit used to feed the replica of the tracing signal to the nodes being adjacent to each other on the transfer route and wherein the path information acquiring unit used to acquire the information about the path on the transfer route for the transfer signal extending from the first edge node to the second edge node, from one node out of a plurality of the nodes.

In the foregoing, a preferable mode is one wherein the path information holding unit is used to insert the path information into the tracing signal being resident in the node having the path information holding unit.

Also, a preferable mode is one wherein the path information holding unit holds the path information so as to be associated with the tracing signal which resides in the node having the information holding unit.

Also, a preferable mode is one wherein the path information acquiring unit feeds information collecting signal used to collect the path information being held by each of the nodes on the transfer route for the transfer signal, to the first edge node.

Also, a preferable mode is one wherein each of the nodes further comprises an information collecting signal processing sending unit used to insert, when having received the information collecting signal, the path information being held by the information collecting signal processing sending unit, into the information collecting signal and used to feed the collecting signal to the nodes being adjacent to each other on the transfer route.

Also, a preferable mode is one wherein the path information acquiring unit receives the path information for the transfer route of the transfer signal extending from the first edge node through the relay node to the second edge node, from the second edge node.

Also, a preferable mode is one wherein the path information acquiring unit receives the information collecting signal fed from the first edge node through the relay node to the second edge node, from the second edge node.

Also, a preferable mode is one wherein the path information held by the path information holding unit contains information about paths leading to the node having the path information holding unit and wherein the path information acquiring unit acquires all path information for the transfer signal by receipt of the tracing signal having the path information from the second edge node.

Also, a preferable mode is one wherein the path information acquiring unit is a network management unit and wherein the network management unit feeds the tracing signal to the first edge node.

Also, a preferable mode is one wherein the path information acquiring unit is a network management unit and wherein the network management unit feeds the information collecting signal to the first edge node.

Also, a preferable mode is one wherein a user terminal serving as a sender of the transfer signal is connected to the first edge node and wherein the network management unit acquires the path information in accordance with an instruction fed from the user terminal.

Also, a preferable mode is one wherein the path information acquiring unit is a user terminal serving as a sender of the transfer signal and being connected to the first edge node and wherein the user terminal feeds the tracing signal to the first edge node.

Also, a preferable mode is one wherein the path information acquiring unit is a user terminal serving as a sender of the transfer signal and being connected to the first edge node and wherein the user terminal feeds the information collecting signal to the first edge node.

Also, a preferable mode is one wherein the network is of a connectionless-mode communication type.

With the above configurations, information about the path for the transfer signal is obtained by using the tracing signal to trace the transfer signal and therefore it is possible to make minimum the number of nodes required for obtaining the path information and possible to reduce a load of processing to be performed by nodes.

Also, a preferable mode is one wherein each of the signals is handled in a form of a packet and wherein the tracing packet has a tracing processing program to trace the transfer packet and wherein the path information acquiring unit sends out a quality control packet having a program to control a quality of communications in each of the nodes and a driving packet having a driving program to start the control program contained in the quality control packet, to the first edge node.

Also, a preferable mode is one wherein the path information acquiring unit simultaneously sends out the tracing packet and the quality control packet.

Also, a preferable mode is one wherein the tracing signal residing unit is made up of a first storing section to store the tracing packet fed from the path information acquiring unit and a first packet executing section to execute the program contained in the tracing processing packet in the first storing section and to insert the path information in the transfer packet into the tracing packet and wherein the tracing signal sending unit has a first packet sending section used to feed the tracing packet into which the path information has been inserted by the first packet executing section and the quality control packet fed from the path information acquiring unit, to the nodes being adjacent to each other on the transfer route for the transfer packet and wherein each of the nodes is further provided with a second storing section used to store the quality control packet, a third storing section used to store the driving packet fed from the path information acquiring unit, a third packet executing section used to execute the program contained in the driving packet in the third storing section and to produce a driving instruction to start the program contained in the quality control packet in the second storing section, a second packet executing section used to execute the quality control program driven by the driving instruction and to control the communication quality and a second packet sending section used to feed the driving packet to the nodes being adjacent to each other on the transfer route for the transfer packet.

Also, a preferable mode is one wherein the path information acquiring unit receives the tracing packet, the quality control packet and the driving packet fed to the second edge node from the first edge node through the relay node, from the second edge node.

Also, a preferable mode is one wherein the second packet executing section acquires results from the quality control processing.

Also, a preferable mode is one wherein the path information acquiring unit feeds an information collecting packet containing an information collecting program used to collect the path information being held by each of the nodes on the transfer route for the transfer packet, to the first edge node.

Also, a preferable mode is one wherein the third storing section stores the information collecting packet fed from the path information acquiring unit and wherein the third packet executing section executes the collecting program contained in the information collecting packet in the third storing section and inserts information about results from the communication quality control into the information collecting packet and wherein the second packet sending section feeds the information collecting packet to the nodes being adjacent to each other on the transfer route.

Also, a preferable mode is one wherein the path information acquiring unit receives the information collecting packet fed from the first edge node through the relay node to the second edge node, from the second edge node.

Also, a preferable mode is one wherein the path information acquiring unit is a network management unit.

Also, a preferable mode is one wherein the path information acquiring unit is a network management unit.

Also, a preferable mode is one wherein a communication server or a user terminal serving as a sender of the transfer signal is connected to the first edge node and wherein the network management unit sends out the tracing processing packet, the quality control packet and the driving packet in accordance with an instruction fed from the server or the user terminal.

Also, a preferable mode is one wherein the network management unit sends out the information collecting packet in accordance with an instruction fed from the server or the user terminal.

Also, a preferable mode is one wherein the path information acquiring unit is a communication server being connected to the first edge node or a user terminal serving as a sender of the transfer signal being connected to the first edge node.

Also, a preferable mode is one wherein the path information acquiring unit is a communication server being connected to the first edge node or a user terminal serving as a sender of the transfer packet being connected to the first edge node.

Also, a preferable mode is one wherein the network is of a connectionless-mode communication type.

With the above configurations, information about the path for the transfer signal can be collected and information about the execution of the QoS control and about results from the QoS control can be obtained from the minimum number of the nodes, the load of processing to be performed by each of the nodes can be reduced.

Also, a preferable mode is one wherein each of the signals is handled in a form of a packet and wherein the tracing packet has a tracing processing program to trace the transfer packet and wherein the path information acquiring unit sends out a filtering processing packet containing a filtering processing program to select a transfer packet fed from the each of nodes based on a predetermined condition and a driving packet having a driving program to start the program contained in the processing packet, to the first edge node.

Also, a preferable mode is one wherein the path information acquiring unit simultaneously sends out the tracing packet and the filtering processing packet.

Also, a preferable mode is one wherein the tracing signal residing unit is provided with a first storing section used to store the tracing packet fed from the path information acquiring unit and with a first packet executing section used to execute the processing program contained in the tracing packet in the first storing section and to insert the path information in the transfer packet into the tracing packet and wherein the tracing signal sending unit is provided with a first packet sending section used to feed the tracing packet into which the path information has been inserted by the first packet executing section and the transfer packet fed from the path information acquiring unit to the nodes being adjacent to each other on the transfer route for the transfer packet and wherein each of the nodes is further provided with a second storing section used to store the filtering processing packet, with a third storing section used to store the driving packet fed from the path information acquiring unit, with a third packet executing section used to execute the driving program contained in the driving packet in the third storing section and to produce a driving instruction to run the program contained in the filtering processing packet in the second storing section, with a second packet executing section used to execute the filtering processing program driven by the driving instruction and to perform the filtering processing and with a second packet sending section used to feed the driving packet to the nodes being adjacent to each other on the transfer route for the transfer packet.

Also, a preferable mode is one wherein the second packet executing section acquires information about results from the filtering processing.

Also, a preferable mode is one wherein the path information acquiring unit feeds an information collecting packet having an information collecting program to collect the path information being held by each of the nodes on the transfer route for the transfer packet, to the first edge node.

Also, a preferable mode is one wherein the third storing section stores the information collecting packet fed from the path information acquiring unit and wherein the third packet executing section executes the collecting program contained in the information collecting packet in the third storing section and inserts information about results from the filtering processing into the information collecting packet and wherein the second packet sending section feeds the information collecting packet to the nodes being adjacent to each other on the transfer routes.

Also, a preferable mode is one wherein the path information acquiring unit receives the information collecting packet fed to the second edge node from the first edge node through the relay node, from the second edge node.

Also, a preferable mode is one wherein the path information acquiring unit is a network management unit and wherein the network management unit has a first packet producing and transmitting section used to produce the tracing packet and the filtering processing packet and to send out both the packets and a second packet producing and transmitting section used to the driving packet and to send out the driving packet and wherein, after the tracing processing packet and the filtering packet have been sent out from the first packet producing and transmitting section, the driving packet is transmitted from the second packet producing and transmitting section.

Also, a preferable mode is one wherein the path information acquiring unit is a network management unit and wherein the network management unit is provided with a first packet producing and transmitting section used to produce the tracing packet and the filtering processing packet and to send out the both packets, with a second packet producing and transmitting section used to produce the driving packet and to send out the produced driving packet and with a third packet producing and transmitting section used to produce the information collecting packet and to send out the produced information collecting packet and wherein, after the tracing processing packet and the filtering processing packet have been sent out from the first packet producing and transmitting section, the driving packet is sent out from the second packet producing and transmitting section and, after the transmission of the driving packet, the information collecting packet is sent out from the third packet producing and transmitting section and the information collecting packet fed to the second edge node through the relay node from the first edge node is received from the second edge node.

Also, a preferable mode is one wherein a communication server or a user terminal serving as a sender of the transfer signal is connected to the first edge node and wherein the network management unit sends out the tracing processing packet, the filtering processing packet and the driving packet in accordance with an instruction fed form the communication server or the user terminal.

Also, a preferable mode is one wherein a communication server or a user terminal serving as a sender of the transfer signal is connected to the first edge node and wherein the network management unit sends out the tracing processing packet, the filtering processing packet, the driving packet and the information collecting packet in accordance with an instruction fed from the communication server and user terminal.

Also, a preferable mode is one wherein the path information acquiring unit is a communication server being connected to the first edge node or a user terminal serving as a sender of the transfer signal being connected to the first edge node.

Also, a preferable mode is one wherein the path information acquiring unit is a communication server being connected to the first edge node or a user terminal serving as a sender of the transfer signal being connected to the first edge node.

With the above configurations, information about the path for the transfer signal can be collected and information about the execution of the filtering and about results from filtering can be obtained from the minimum number of the nodes, the load of processing to be performed by each of the nodes can be reduced.

Also, a preferable mode is one wherein the network is of a connectionless-mode communication type.

Also, a preferable mode is one wherein each of the signals is handled in a form of a packet and wherein the tracing packet has at least a tracing processing program to trace the transfer packet and wherein the path information acquiring unit sends out a Service Level Agreement (SLA) management packet having a program to manage the SLA processing and check as to whether predetermined service is maintained in accordance with the SLA already agreed in advance between the network manager and a user and information collecting packet having an information collecting program to collect the path information held by each of the nodes on the transfer route for the transfer packet, to the first edge node.

Also, a preferable mode is one wherein the path information acquiring unit simultaneously sends out the tracing packet and the SLA packet.

Also, a preferable mode is one wherein the tracing signal residing unit is provided with a first storing section used to store the tracing packet fed from the path information acquiring unit and with a first packet executing section used to execute the processing program contained in the tracing packet in the first storing section and to insert the transfer information in the transfer packet into the tracing packet and wherein the tracing signal sending unit has a first packet sending section used to feed the tracing packet into which the path information has been inserted by the first packet executing section and the SLA management packet fed from the path information acquiring unit to the nodes being adjacent to each other on the transfer route for the transfer packet and wherein each of the nodes is further provided with a second storing section used to store the SLA management packet, with a second packet executing section used to execute the management program contained in the SLA management packet in the second storing section and to acquire information about results form transfer management of the transfer packet, with a third storing section used to store the information collecting packet fed from the path information acquiring unit, with a third packet executing section used to execute the collecting program contained in the information collecting packet in the third storing section and to insert information about results from management obtained from the second packet executing section into the information collecting packet and with a second packet sending section used to feed the information collecting packet into which information about the management results is inserted by the third packet executing section to the nodes being adjacent to each other on the transfer route for the transfer packet.

Also, a preferable mode is one wherein the second storing section stores the information about results from the management obtained by the second packet.

Also, a preferable mode is one wherein the third packet executing section inserts the packet information contained in the transfer packet into the information collecting packet.

Also, a preferable mode is one wherein the path information collecting unit receives the information collecting packet fed to the second edge node through the relay node from the first edge node, from the second edge node.

Also, a preferable mode is one wherein the path information acquiring unit, when having judged, based on predetermined conditions, that the transfer route for the transfer packet is put in a congestion state, sends out a congestion avoiding packet having a program to reduce the congestion state so that the transfer packet is able to avoid the congestion.

Also, a preferable mode is one wherein the third storing section stores the congestion avoiding packet fed from the path information acquiring unit and wherein the third packet executing section executes the congestion avoiding program contained in the congestion avoiding packet in the third storing section and wherein the second packet sending section feeds the congestion avoiding packet to the nodes being adjacent to each other on the transfer route.

Also, a preferable mode is one wherein the path information acquiring unit receives the congestion avoiding packet fed to the second edge node through the relay node from the first edge node, from the second edge node.

Also, a preferable mode is one wherein the path information acquiring unit is a network management unit and wherein the network management unit is provided with a first packet producing and transmitting section used to produce the tracing packet and the SLA management packet and to send the both produced tracing processing packet and SLA management packets, with a second packet producing and transmitting section used to produce the information collecting packet and to send out the produced packet and with a first packet receiving section to receive the information collecting packet and wherein, after the transmission of the tracing processing packet and the SLA management packet from the first packet producing and transmitting section, the information collecting packet is sent out from the second packet producing and transmitting section.

Also, a preferable mode is one wherein the path information acquiring unit is a network management unit and wherein the network management unit is provided with a first packet producing and transmitting section used to produce the tracing packet and the SLA management packet and to send out the both packets, with a second packet producing and transmitting section used to produce the information collecting packet and to send out the produced packet, with a third packet producing and transmitting section used to produce the congestion avoiding packet and to send out the produced packet, based on the predetermined conditions, and with a second packet receiving section used to receive the information collecting packet and the congestion avoiding packet and wherein, after transmission of the tracing processing packet and the SLA management packet from the first packet producing and transmitting section, the information collecting packet is sent out from the second packet producing and transmitting section and, after the transmission of the information collecting packet, the congestion avoiding packet is sent out, whenever necessary, from the third packet producing and transmitting section.

Also, a preferable mode is one wherein the predetermined condition for the congestion avoiding packet is that the information collecting packet is not supplied to the path information acquiring unit within a fixed time.

Also, a preferable mode is one wherein a communication server or a user terminal serving as a sender of the transfer signal is connected to the first edge node and wherein the network management unit, based on an instruction fed from the server or user terminal, sends out the tracing processing packet, the SLA management packet and the information collecting packet.

Also, a preferable mode is one wherein a communication server or a user terminal serving as a sender of the transfer signal is connected to the first edge node and wherein the network management unit, based on an instruction fed from the server or user terminal, sends out the tracing processing packet, the SLA management packet, the information collecting packet and the congestion avoiding packet.

Also, a preferable mode is one wherein the third packet executing section inserts information about time when execution of the information collecting program has started and about time when running of the information collecting program has ended, into information about results from the management.

Also, a preferable mode is one wherein the SLA management unit used to manage the SLA is connected to the path information acquiring unit and wherein the path information acquiring unit, based on the management result information being stored in the information collecting packet fed from the second edge node and on unit information being able to be obtained for every unit of predetermined information about the management results, produces information about a return to a user of the network and feeds the information about the returns to the SLA management unit.

Also, a preferable mode is one wherein the network management unit inserts information about a first time showing time when the third packet producing and transmitting section has transmitted the congestion avoiding packet, into the congestion avoiding packet and information about a second time showing time when the second packet receiving section has received the congestion avoiding packet, into the congestion avoiding packet.

Also, a preferable mode is one wherein the LSA management unit used to control the SLA is connected to the network management unit and wherein the network management unit, based on information about a third time showing a difference between the first time and the second time contained in the congestion avoiding packet having received by the second packet receiving section and on unit time information obtained for every predetermined information unit of the third time information, produces information about the return for a user of the network and feeds the information about the return to the SLA management unit.

Furthermore, a preferable mode is one wherein the network is of a connectionless mode communication type.

According to a second aspect of the present invention, there is provided a node for being used in a communication network which is mounted on a transfer route for a transfer signal passing through the network and which receives a tracing signal used to trace the transfer signal and which stores information about a path on the transfer route for the transfer signal, including:

a path information holding unit to hold information about the path for the transfer signal passing through the path information holding unit;

a tracing signal residing unit, when having the tracing signal, to cause the tracing signal to be resident in the tracing signal residing unit and to produce a replica of the tracing signal; and a tracing signal sending unit to feed the replica of the tracing signal to nodes being adjacent to each other on the transfer route for the transfer signal.

According to a third aspect of the present invention, there is provided a path information acquiring unit being mounted on a transfer route of a transfer signal passing through a communication network including:

a first node used to receive a tracing signal which traces the transfer signal and which contains information about a path on the transfer route for the transfer signal;

a second node being mounted on the transfer route for the transfer signal and being used to receive the tracing signal; and wherein the path information acquiring unit is connected to the first and second nodes so as to be communicable with each other and sends out the tracing signal to the first node and acquires path information contained in the tracing signal in transfer route for the transfer signal extending from the first node to the second node, from the second node.

With the above configurations, information about the path for the transfer signal can be collected and information about the execution of the SLA management and about results from the SLA management can be obtained from the minimum number of the nodes, the load of processing to be performed by each of the nodes can be reduced. Moreover, since the network management system having a high scalability is made possible, even if a method for management is changed, by changing a program, the entire system can be operated without any change in the construction of the management system.

Moreover, with the above configurations, the path information management system of the present invention can obtain information about each path being held by each of nodes on transfer routes by transmitting and receiving information about the path from and to both edge nodes on the network, without transmitting and receiving information about the path from and to all the nodes mounted on the network or each of the nodes existing on transfer routes for the transfer packet.

BRIEF DESCRIPTION OF THE DRAWINGS

The above and other objects, advantages and features of the present invention will be more apparent from the following description taken in conjunction with the accompanying drawings in which:

FIG. 8 is a diagram showing configurations of a QoS control table employed in the fourth embodiment of the present invention;

FIG. 9 is a schematic block diagram showing configurations of a network quality control system according to a seventh embodiment of the present invention;

FIG. 11 shows configurations of one filtering table according to the eighth embodiment of the present invention;

FIG. 12 shows configurations of another filtering table according to the eighth embodiment of the present invention;

FIG. 13 is a schematic block diagram showing configurations of a network management system according to a twelfth embodiment of the present invention;

FIG. 17 is a schematic block diagram showing configurations of a network management system according to a fourteenth embodiment of the present invention.

DESCRIPTION OF THE PREFERRED EMBODIMENTS

Best modes of carrying out the present invention will be described in further detail using various embodiments with reference to the accompanying drawings.

(A) First Embodiment

A network management system of a first embodiment of the present invention will be described by referring to drawings.

(A-1) Configuration of First Embodiment

Figure 1:
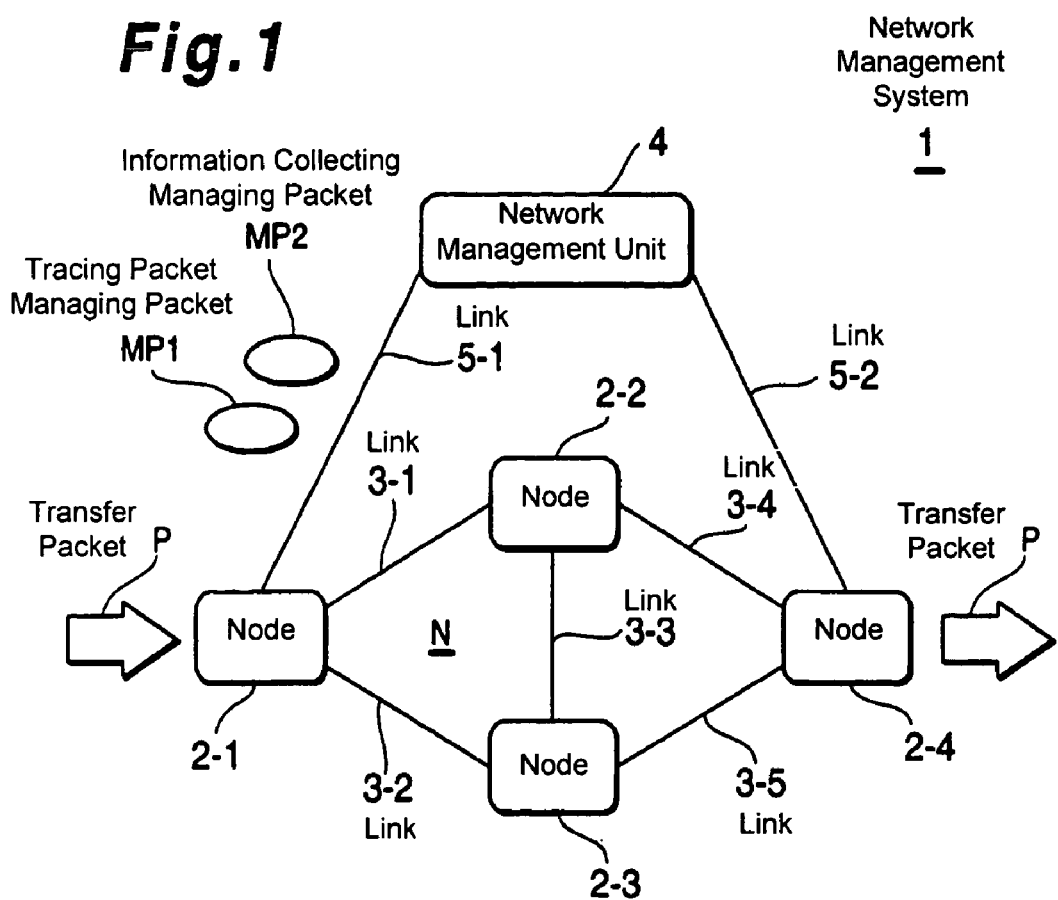
FIG. 1 is a schematic block diagram showing an entire configuration of a network management system according to a first embodiment of the present invention.

FIG. 1 is a schematic block diagram showing an entire configuration of a network management system of a first embodiment of the present invention. The network management system of the first embodiment is applied to a connectionless type network in which a packet is transferred to a destination without establishment of connection through the network. In FIG. 1, in the network management system 1 of the first embodiment, the network N is made up of a plurality of nodes 2-1 to 2-4 each of which is connected, as appropriate, by each of a plurality of links 3-1 to 3-5. In the example shown in FIG. 1, four pieces of packet transfer devices 2-1 to 2-4 each serving as the node are connected, as appropriate, by five links 3-1 to 3-5.

Out of nodes described above, the nodes 2-1 to 2-4 are so-called "edge nodes" which serve as connection points between the network N and nodes of other networks (not shown) or user terminals (not shown). In FIG. 1, an example is shown in which a series of packets P (hereafter referred to as a "transfer packet") is fed to the edge node 2-1 and is then guided from the edge node 2-4 to an outside of the network N. In the network management system, information about a path for the transfer packet P is collected. Here, the transfer packet P may be any information unit being used in any layers. For example, the transfer packet P may be an IP packet used in a network layer or an ATM cell used in a data link layers.

In the first embodiment of the present invention, at least, the edge nodes 2-1 and 2-4 are connected to a network management unit 4 via links 5-1 and 5-4. Moreover, nodes 2-2 and 2-3 connected between the edge nodes 2-1 and 2-4 are called "intermediate nodes" in the embodiment which are used to relay the transfer packet transmitted or received between the edge nodes.

The network management unit 4, for example, in accordance with starting processing in response to an instruction fed from an input/output (not shown) device by which an operator performs inputting and outputting operations, manages a communication state of the network N and collects information about nodes. As the network management unit 4, for example, a management unit being called an EMS (Element Management System) which is conventionally known may be employed.

The network management unit 4 produces two kinds of managing packets MP1 and MP2 used for collection of information about a path of the transfer packet P and sends out them to an edge node 2-1 existing on an introduction side of the transfer packet to the network N. Moreover, the two kinds of managing packets MP1 and MP2 are provided from the edge node 2-4 which is adapted to guide the transfer packet P from the network N to an outside. Each of the two kinds of managing packets MP1 and MP2 contains information to identify the transfer packet P whose path information is to be collected. As the information to be used for identification, for example, a sender address and a destination address can be applied.

The managing packet MP1 of a first kind flows through the path of the network N through which a series of the transfer packets P to be managed and is copied on the node on the path and is then made resident on the node. Into the managing packet MP1 of the first kind being resident in the node are inserted, for example, path information made up of any one of information about an input link being connected to the node, combined information about an input port and an output port and information about an output link of the node. Moreover, alternatively, each of the nodes can save information about the path used for the managing packet MP1 of the first kind being resident in the node. Part of the information having been inserted into an information area of the managing packet MP1 of the first kind makes up a program or data used for the collection of the information, together with processing program or data stored in the information collecting processing section placed in each of the nodes. Hereinafter, the managing packet of the first kind is called a "tracing packet".

A managing packet MP2 of a second kind is transmitted from the network managing unit 4 after fixed time following the transmission of the tracing packet MP1. The managing packet MP2 of the second kind which has been guided into the network N is transferred through the path through which the tracing packet MP1 has passed and collects the path information held directly or indirectly by the tracing packet MP1 being resident in each of the nodes on the path and inserts the collected path information into an information section of the managing packet MP2. Part of the information having been inserted into an information area of the managing packet MP2 of the second kind makes up a program or data used for the collection of the information, together with processing program or data stored in the information collecting processing section placed in each of the nodes.

Hereinafter, the managing packet of the second kind is called a "information collecting packet".

Figure 2:
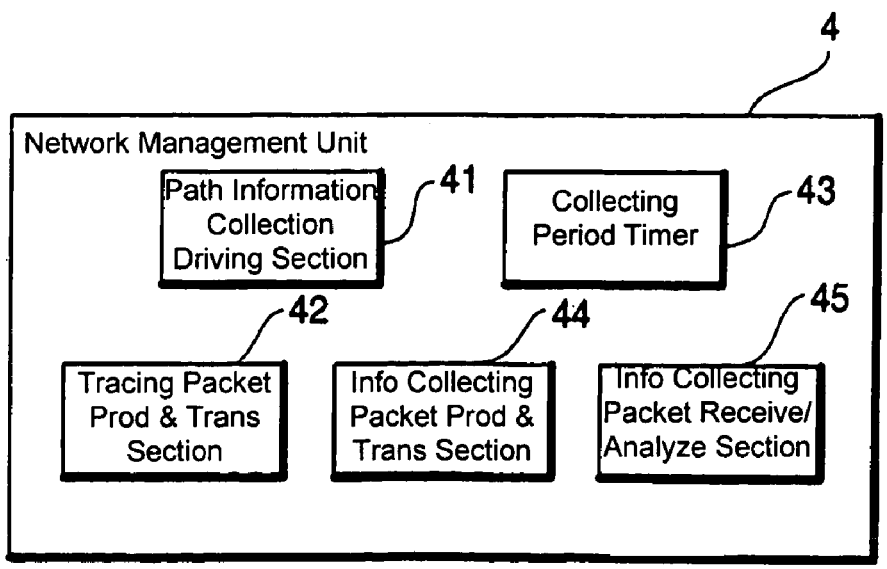
FIG. 2 is a schematic block diagram showing configurations of a network management unit according to the first embodiment of the present invention.

The network managing unit 4 has functional sections as shown in FIG. 2 for the collection of the path information of the transfer packet P using the tracing packet MP1 and information collecting packet MP2.

As shown in FIG. 2, the network managing unit 4 includes a path information collection driving section 41, a tracing packet producing and transmitting section 42, a collecting period timer 43, an information collecting packet producing and transmitting section 44 and an information collecting packet receiving and analyzing section 45.

Each of these functional sections 41 to 45 operates in parallel for every transfer packet P used for the collection of the path information.

A path information collection driving section 41 of the network managing unit 4 drives collecting operations of the path information about a series of transfer packet P in accordance with an instruction fed from an input and output device (not shown) manipulated by an operator. When the transfer packet P is specified out of numerous transfer packets guided into the network N, a sender address, a destination address or a like can be used. Moreover, the operator, when providing the instruction for collection of the path information, may designate contents and kinds of path information to be collected. For example, the operator provides instructions for collection of information about the path itself through which the transfer packet P has passed and, additionally, for collection of additional information such as a delay in the passage of the transfer packet through each of the nodes, sequence number of the transfer packet P, fluctuations caused by the delay or a like.

Moreover, the path information collection driving section 41, when receiving a notification of arrival of a first transfer packet making up a group of the packet from the edge node on a guiding-out side, drives the collecting operations of the path information.

The tracing packet producing and transmitting section 42 produces information used to identify the transfer packet to be traced and the trace packet MP1 containing contents and kinds of the path information to be collected, in accordance with a driving instruction to collect the path information of the transfer packet provided by the path information collection driving section 41 and transmits the tracing packet on the edge node 2-1 on the guiding-out side.

The collecting period timer 43 makes measurements of a period of collecting information about the path in each of nodes 2-1, . . . , 2-4 and, after the measurements have been completed, notifies the information collecting packet producing and transmitting section 44 of the result. The collecting period timer 43 starts a measurement of a fixed period of time, for example, from a time when the tracing packet producing and transmitting section 42 has transmitted the tracing packet MP1. Moreover, the fixed period of time may be designated by an operator from the input and output device (not shown). Also, driving of transmission of information collecting packet MP2 following the transmission of the tracing packet may be instructed by an operator. The information collecting packet producing and transmitting section 44, when receiving notification about the completion of the measurement of the fixed period of time from the collecting period timer 43, forms information collecting packet MP2 containing specified information about the transfer packet P and sends out the packet MP2 to the edge node 2-1 on the introduction side.

The information collecting packet receiving and analyzing section 45, when given the information collecting packet MP2 from the edge node 2-4 on the guiding-out side through the edge node 2-1 and intermediate node 2-2 or 2-3, analyzes its information collecting packet MP2 and acquires information about a type of the transfer packet P notified by the information collecting packet MP2. The information collecting packet receiving and analyzing section 45 outputs the acquired information about the path, for example, via an input and output device (not shown).

Moreover, in the connectionless mode communication type network, there is a case in which a series of transfer packets passes through a plurality of transfer packets and therefore the information collecting packet receiving and analyzing section 45 receives a plurality of information collecting packets MP2 for a same transfer packet P. In such the case, the information collecting packet analyzing section 45 performs analysis of the packet including the information collecting packet MP2 that has arrived first and other information collecting packet MP2 that has arrived within a fixed period of time after the arrival of the above information collecting packet MP2.

Figure 3:
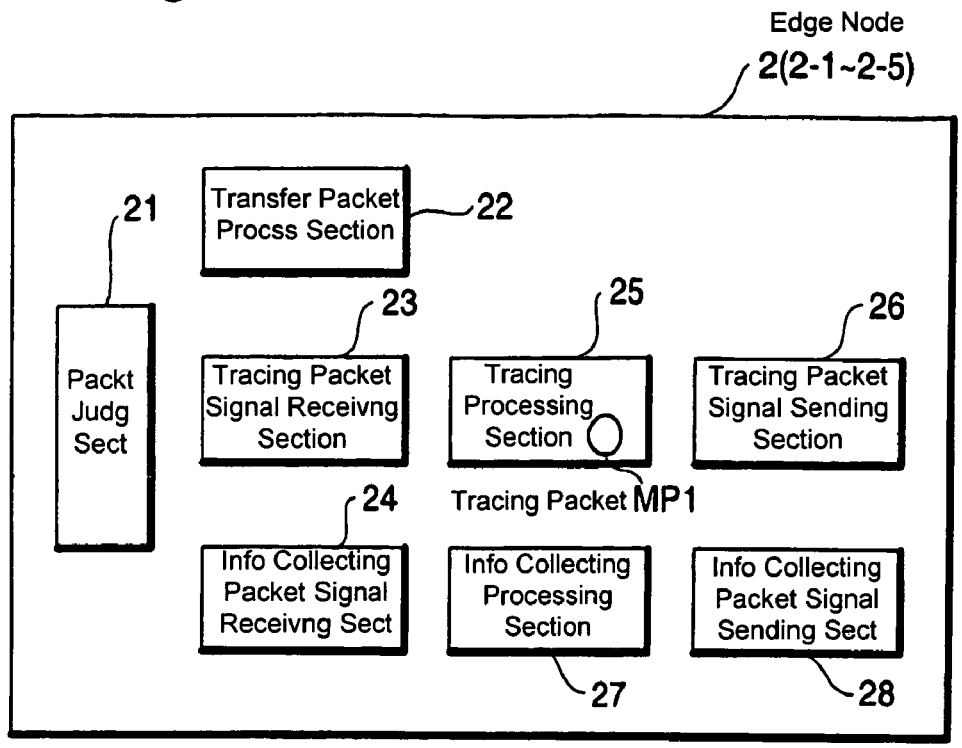
FIG. 3 is a schematic block diagram showing configurations of a node employed in the first embodiment of the present invention.

Each of the nodes 2-1, . . . , and 2-4 has functional parts as shown in FIG. 3 adapted to achieve the collection, by using the tracing packet MP1 and information collecting packet MP2, of information about the path through which the transfer packet P passes. Configurations of hardware in each of nodes 2-1, . . . , and 2-4 may be the same as those in the conventional technology. Each of the functional parts shown in FIG. 3 is constructed in a manner that hardware and software merge each other.

The functional parts of each of the nodes 2-1, . . . , and 2-4 include a packet judging section 21, a transfer packet processing section 22, a tracing packet signal receiving section 23, an information collecting packet signal receiving section 24, a tracing processing section 25, a tracing packet signal sending section 26, an information collecting processing section 27 and an information collecting packet signal sending section 28.

The functional parts of the introduction-side edge node 2-1, intermediate node 2-2 and guiding-out side edge node 2-4 are partially different from each other.

The packet judging section 21 specifies a type of the packet that has arrived in the node and assigns the packet according to its types. That is, the packet judging section 21, if the arrived packet is a transfer packet P to be managed, provides this to the transfer packet processing section 22. Moreover, the packet judging section 21, if the arrived packet is the tracing packet MP1, provides it to the tracing packet signal receiving section 23 and, if the arrived packet is the information collecting packet MP2, provides it to the information collecting packet signal receiving section 24.

The transfer packet processing section 22, as in the case of the conventional node, performs processing of transferring the transfer packet to the next node to which the packet is to be transferred or to the user terminal.

In the first embodiment, the transfer packet processing section 22 provides information about a path for the arrived transfer packet P (for example, information about a combination of the input port and output port) to the tracing processing section 25. As described above, since the network N is of a connectionless type, a path is determined which differs depending on a state of the network or a like for a series of the transfer packets P each being transmitted from a same sender and to a same receiver. Moreover, the transfer packet processing section 22 provides, in accordance with setting for the collection of information of the tracing processing section 25, additional information (a kind of information about the path) including a sequence number of the transfer packet P, information about a delay in processing or a like, to the trace processing section 25.

The tracing packet signal receiving section 23 receives the arrived tracing packet MP1 and provides it to the trace processing section 25. The information collecting packet signal receiving section 24 performs processing of receiving the arrived information collecting packet MP2 and feeds it to the information collecting processing section 27.

The tracing processing section 25, when having received the tracing packet MP1 from the trace packet signal receiving section 23, makes the tracing packet MP1 be resident. Moreover, the trace processing section 25, if the received tracing packet MP1 makes a request for the additional information including the sequence number of the transfer packet P, delay in the processing or a like, requests the transfer packet processing section 22 that information about the information be notified.

The tracing processing section 25, when information about a path of the transfer packet specified by the tracing packet MP1 is given first by the transfer packet processing section 22, makes a copy of the tracing packet MP1 being resident, rewrites to replace present path information with path information of a next node and provides the rewritten path information to the tracing packet signal receiving section 26 and then stores information about the path itself and about the path including the additional information or a like as information related to the resident tracing packet MP1. Thereafter, the tracing processing section 25, every time information about the path for the transfer packet to be specified by the tracing packet MP1 is given, judges whether or not the information is the path that has been used and, if it is a new path, makes a copy of the tracing packet MP1 and outputs it and stores information about the path. The tracing processing section 25, even when the tracing packet MP1 is copied and outputted, if necessary, collects and stores the additional information about the transfer packet or a like.

The tracing packet signal sending section 26 transmits the tracing packet MP1 fed from the tracing processing section 25 to a link existing on the same path as that used for the transfer packet that has been already sent out.

As described above, the introduction-side edge node 2-1 traces the transfer packet P that arrives after the tracing packet MP1 have been resident and stores the path information. The tracing processing section 25 for nodes other than the introduction side edge node 2-1 may be constructed in a manner that it causes the tracing packet MP1 having arrived immediately after the arrival of the transfer packet P to be resident and causes the information about a path for the transfer packet P to be stored. In this case, when the transfer packet P is sent out to a new route, storing of the information about the path, and copying and outputting of the tracing packet MP1 are performed.

Most of programs required for processing by the tracing processing section 25 can be described in advance in the tracing packet MP1 and the tracing processing section 25 may be configured so as to provide an environment in which the processing program can be executed.

The information collecting processing section 27, when receiving the information collecting packet MP2 from the information collecting packet signal receiving section 24, inserts the information about the path for the resident tracing packet MP1 and feeds it to the information collecting packet signal sending section 28. If there is a plurality of links that has sent out the tracing packet MP1, copies of the information collecting packet MP2 are produced and transmitted to each of the routes.

The information collecting packet signal sending section 28 is used to send the information collecting packet MP2 to the link from which the tracing packet MP1 was sent out. Moreover, the information collecting packet signal sending section 28 in the edge node on the introduction side sends out the information collecting packet MP2 to the network management unit 4.

Most of programs required for processing by the information collecting processing section 27 can be described in advance in the information collecting packet MP2 and the information collecting processing section 27 may be configured so as to provide an environment in which the processing program can be executed.

In the above example, the network management unit 4 is adapted to handle and collect a plurality of the information collecting packets MP2, however, the information collecting processing section 27 in the edge node on the guiding-out side may handle and collect them instead of the network management unit 4.

(A-2) Operations in First Embodiment

Operations of collecting the information about the path in the network management system 1 of the first embodiment will be briefly described.

The network management unit 4, when the transfer packet P for which the information about the path is to be collected is specified and when collection of the information about the path is instructed, forms the tracing packet MP1 and transmits it to the edge node 2-1 on the introduction side.

The edge node 2-1 allows the tracing packet MP1 fed from the network management unit 4 to be resident and waits for an arrival of the transfer packet P. The edge node 2-1, when the transfer packet P has arrived, stores the information about the packet P as the information related to the resident tracing packet MP1 and sends out a replica of the tracing packet MP1 to the link (for example, link 3-1 or 3-2) on the transfer path for the packet P. Other nodes 2-2 to 2-4 perform the same processing of the tracing packet as described above.

Moreover, replicating and outputting of the tracing packet MP1 are not performed on the transfer packet that has passed through the same path, while replicating and outputting of the tracing packet MP1 are performed on the transfer packet that has passed through a new route.

The network management unit 4, after the transmission of the tracing packet, sends out the information collecting packet MP2 fed from the network management unit 4 to the edge node 2-1 on the introduction side. Each of the nodes inserts the information about the path being stored as the information related to the tracing packet MP1 into the information collecting packet MP2 and sends out the information collecting packet MP2 to the link on the same path as for the tracing packet MP1. Moreover, the edge node 2-4 on the guiding-out side sends out the received information collecting packet MP2 to the network management unit 4. The network management unit 4 analyzes the arrived information collecting packet MP2 and acquires information about the path for the transfer packet P.

(A-3) Effects of First Embodiment

According to the first embodiment, the network management unit 4 can acquire the information about the path for the predetermined transfer packet having passed the network, without transmitting and receiving the information from or to all nodes or most of the nodes in the network N, by exchange of the information with both the edge nodes 2-1 and 2-4. As a result, a load of processing to be performed by the network management unit can be reduced more, compared with the conventional case.

Since only the node through which the transfer packet has passed performs operations when the information about the path is gathered, a load of processing to be performed by each node can be reduced, compared with the conventional case.

(A-4) Modified Embodiment of First Embodiment

In the above first embodiment, a method for erasing the tracing packet MP1 being resident at each node is not described, however, by using the following method, for example, the tracing packet MP1 can be erased.

A first method is to erase the tracing packet MP1 being resident when the processing of sending the information collecting packet MP2 has been completed in each node. A second method is for the network management unit 4 to send out an erasing driving packet having a program to execute erasing operations, to the edge node 2-1. Each of the nodes, when having received the erasing driving-packet, makes the program run to erase the tracing packet being resident. A third method is to write time when the tracing packet MP1 or time while the tracing packet is resident in advance in the tracing packet MP1 and to control the time so that each of the nodes autonomously erases the tracing packet MP1 which is resident at each of the nodes. A fourth method is for each of the nodes to erase the tracing packet MP1 being resident, when the passage of a final packet making up a series of the transfer packet P is recognized or a condition that the information collecting packet MP2 has already passed (irrespective of whether the final packet has passed or has not yet passed) is satisfied.

In the first embodiment, the information about the path is obtained using two kinds of the tracing packets MP1 and information collecting packet MP2, however, the information about the path may be acquired by using only the tracing packet MP1.

For example, the above acquisition can be achieved by describing information about all the paths leading to the arrived node in the tracing packet MP1 and by causing the edge node 2-4 on the introduction side to send out the tracing packet MP1 to the network management unit 4.

(B) Second Embodiment

The network management system of the second embodiment of the present invention will be explained by referring to a drawing.

Figure 4:
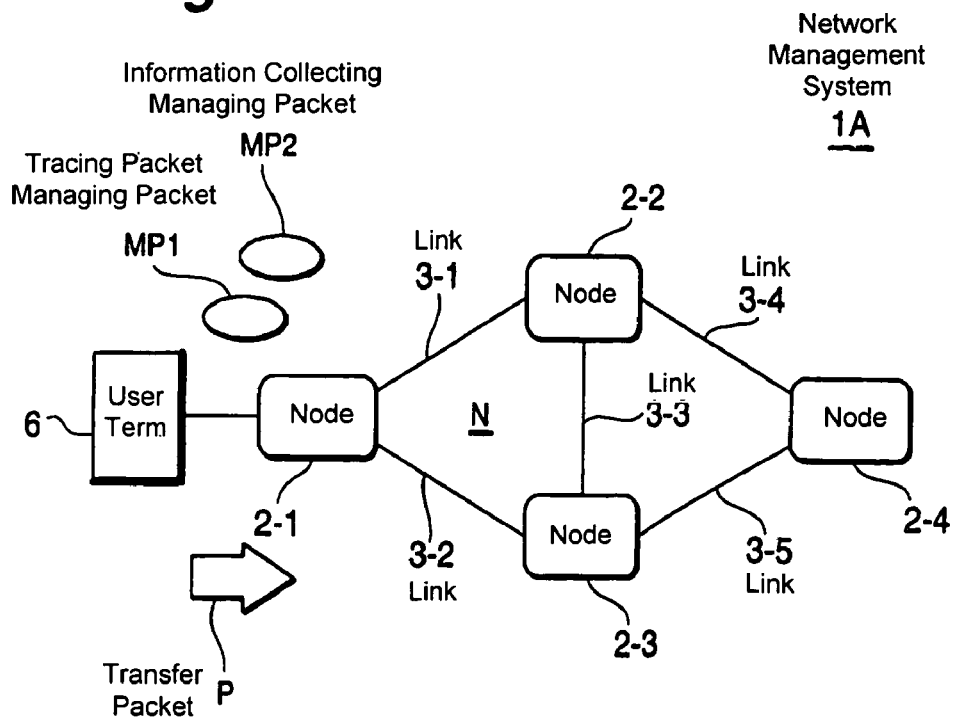
FIG. 4 is a schematic block diagram showing configurations of a network management system according to a second embodiment of the present invention.

FIG. 4 is a block diagram showing configurations of a network management system of the second embodiment. In FIG. 4, same reference numbers are assigned to corresponding parts having the same functions as those in FIG. 1.

In the network management system 1A of the second embodiment shown in FIG. 4, instead of the network management unit 4 of the first embodiment shown in FIG. 1, a user terminal 6 being a sender of the transfer packet P is provided as a sender of the tracing packet MP1 and information collecting packet MP2. The user terminal 6 is connected to the edge node 2-1 on the introduction side.

Processing to be performed by each of nodes 2-1, . . . , and 2-4 is almost the same as those in the first embodiment, but is different on following points. That is, the node on the guiding-out edge node 2-4 for the transfer packet P, when having received the information collecting packet MP2 and having completed the processing to be performed on the collecting packet MP2, performs processing of returning the received information collecting packet MP2 to the user terminal 6 through the Internet N. The route to be used for returning the information collecting packet MP2 may be one passing the packet in a reverse direction to the path used for transferring the packet P or may be one having no bearing on any route used for transferring the packet P. In the former case, each of the nodes, when the information collecting packet MP2 to be returned has arrived, can erase the tracing packet MP1 being resident at each of the nodes to be erased.

According to the second embodiment, as in the case of the first embodiment, when the path information is collected, since only the node through which the transfer packet to be managed has passed performs operations required for the above collection, a load of processing to be performed by the node can be reduced, on average, when compared with the conventional case.

Moreover, since the user terminal 6 is a sender of the tracing packet and information collecting packet, a user can obtain the information about the path on demand.

Technological though provided as the modified embodiment of the first embodiment can be applied to the second embodiment.

(C) Third Embodiment

The network management system of the third embodiment of the present invention will be explained by referring to drawings.

Figure 5:
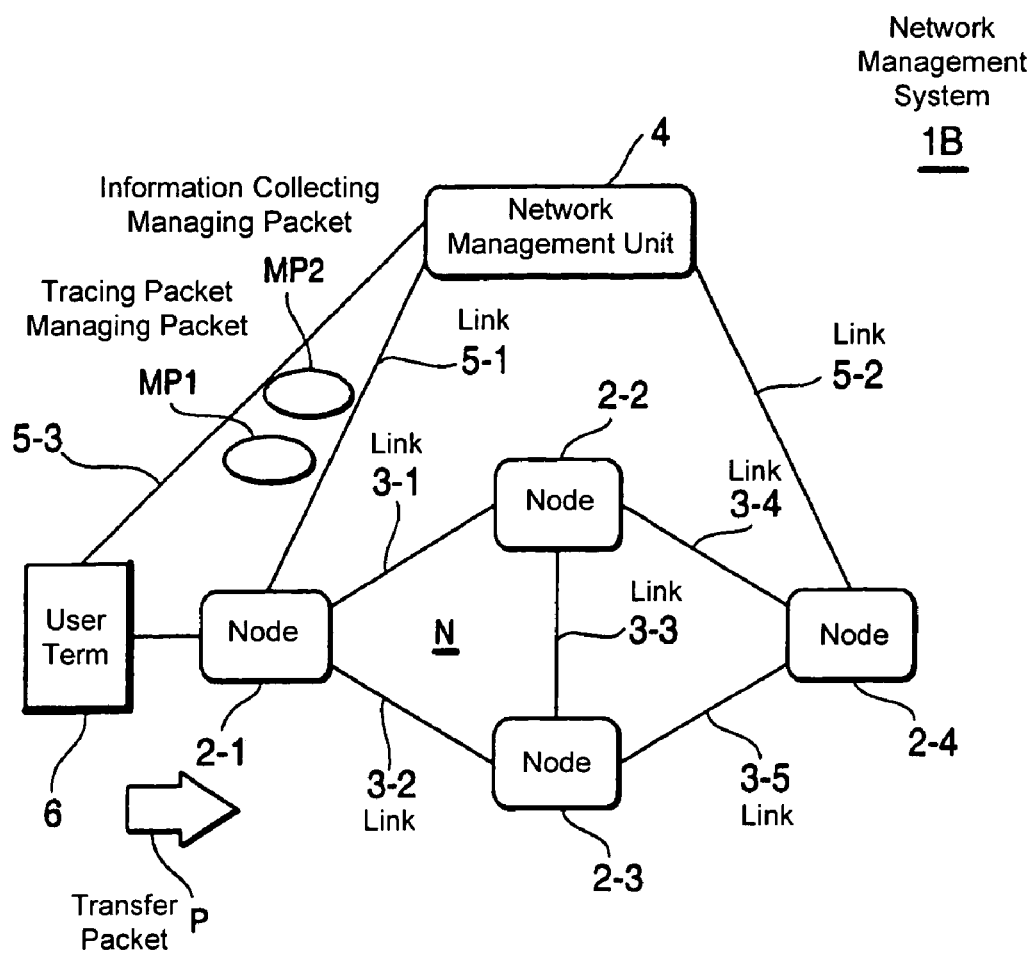
FIG. 5 is a schematic block diagram showing configurations of a network management system according to a third embodiment of the present invention.

FIG. 5 is a schematic block diagram showing configurations of a network management system according to the third embodiment of the present invention. In FIG. 5, same reference numbers are assigned to corresponding parts having the same functions as those in FIGS. 1 and 4.

In the network management system 1B of the third embodiment, as in the case of the first embodiment, a network management unit 4 serves as a sender of the tracing packet MP1 and the information collecting packet MP2 and collects the information about the path, however, an instruction to collect the information about the path is provided from the user terminal 6 through links 5-3 to the network management unit 4 and the obtained information about the path is provided from the network management unit 4 through the link 5-3 to the user terminal 6.

Operations of each of the nodes 2-1, . . . , and 2-4 of the embodiment are the same as those of each of the nodes described in the first embodiment.

According to the third embodiment, the same effects as obtained in the first embodiment can be achieved. It is not necessary for the user to produce the tracing packet MP1 or information collecting packet MP2 and to be able to acquire the information about the path on demand.

Moreover, technological though provided as the modified embodiment of the first embodiment can be applied to the third embodiment.

(D) Fourth Embodiment

The network management system of the fourth embodiment of the present invention will be described by referring to FIG. 1 showing the first embodiment.

The network management system 1 of the fourth embodiment performs quality control on communications of a series of the transfer packets. Hereinafter, the quality control on the communications is called Quality of Service ("QoS").

(D-1) Configurations of Fourth Embodiment

In the network management system of the fourth embodiment, the same components as provided in the network management system of the first embodiment can be employed. The network management system of the fourth embodiment, as in the case of each of the above embodiments, is applied to the network of the connectionless mode communication type.

The network management unit 4 of the fourth embodiment produces a group of first management packets described above and a group of second management packets in order to acquire the information about the path for the transfer packet and performs the QoS control on each of the nodes through which the packet passes. The group of the first management packets includes a management packet which performs the same function as the tracing packet MP1 being resident on each of the nodes described above and thereafter is called a "resident active packet group MP1". Also, the group of the second management packets includes another management packet which performs the same function as the information collecting packet MP2 which circulates through each of the nodes and thereafter is called a "circulating active packet MP2".

The network management unit 4 transmits both the resident active packet group MP1 and circulating active packet MP2 to the introduction-side edge node 2-1 serving as a first node and receives from the guiding-out edge node 2-4 serving as a fourth node. Each of the resident active packet group MP1 and circulating active packet MP2 includes packet specific information which serves to specify a content of the transfer packet on which the QoS control is exercised. As the packet specific information, for example, a header of the transfer packet, a sender address and receiver address incorporated in a field, a MAC (Media Access Control) address, a TCP (Transmission Control Protocol)/UDP (User Datagram Protocol) port number, TOS (Type of Service) and application information in the transfer packet P can be used.

The resident active packet group MP1 being resident in a node includes two kinds of the packets, one being the tracing processing packet MP1-1 having the same function as the tracing packet MP1 adapted to trace the transfer packet P described above and another being a QoS control packet MP1-2 adapted to exercise the QoS control on a series of the transfer packet P. The tracing processing packet MP-1 can be called a "first resident active packet MP1 and the QoS control packet MP1-2 can be called a "second resident active packet MP1". As the resident active packet group MP1, not only a single packet but also a plurality of packets can be used. Each of the tracing processing packet MP1-1 and QoS control packet MP1-2 can be either a single packet or a plurality of packets. The tracing processing packet MP1-1 includes, as in the case of the tracing packet MP1 described above, a tracing processing program, tracing processing parameters (including conditional parameters), tracing processing data or a like. The tracing processing program retrieves information about the path made up of any one of, for example, information about a link having arrived at the node, information obtained by combining information fed from an input port with information fed from an output port at the corresponding node, information about an output link fed from the node and information about the path for to the resident active packet MP1 being resident in the node is incorporated in data on the tracing processing. Moreover, the tracing processing program, when the transfer packet P is transferred to a new path, incorporates the information about the new path into the tracing processing data. The tracing processing program makes a copy of the resident active packet group MP1 being resident in the node and transfers the copied packet group to a new path to which the transfer packet P is transferred.

The QoS control packet MP1-2 includes, for example, a QoS control program, QoS control parameters and QoS control data or a like. The QoS control program performs the QoS control operation according to the QoS control parameters for the transfer packet P on which the QoS control is exercised and information about the results from the QoS control operations provided to the transfer packet is incorporated in the QoS control data. The QoS control parameter is designated by a QoS control table which shows transfer priority of the transfer packet. In the table, for example, a degree of importance and a class can be employed which use the packet specific information used to specify contents of the transfer packet P as parameters. The result obtained from the QoS control operation is inserted into the QoS control data, which is made up of an amount of the transfer packets accumulated in the queuing unit, QoS control table, use amount of the queue corresponding to the QoS control table, bandwidth, amount of transmission, delay in the passage of transfer packets in each node, fluctuations caused by the delay or a like.

On the other hand, the circulating active packet group MP2, when fixed time has elapsed since the time of transmitting the resident active packet group MP1, is sent out from the network management unit 4. The circulating active packet group MP2 that circulates through the node includes a driving packet MP2-1 and information collecting packet MP2-2. The driving packet MP2-1 can be called a "first circulating active packet MP2" and the information collecting packet MP2-2 can be called a "second circulating active packet MP2".

Here, as the circulating active packet group MP2, either a single packet or a plurality of packets can be used. Moreover, each of the driving packet MP2-1 and information collecting packet MP2-2 can be made up of either a single packet or a plurality of packets.

The driving packet MP2-1 is made up of a resident packet driving program, driving parameters, driving data, tracing processing data or a like. The driving program produces a driving signal used to run the QoS control program being resident in each node and drives operations of the QoS control program.

The information collecting packet MP2-2, as in the case of the information collecting packet MP2, includes an information collecting program, information collecting parameters, information collecting data, and tracing processing data. The information collecting program collects path information obtained directly or indirectly by the resident active packet group MP1 being resident in the node designated by the information collecting parameters and information about the results obtained from the QoS control operation and inserts the information into the information collecting data.

Figure 6:
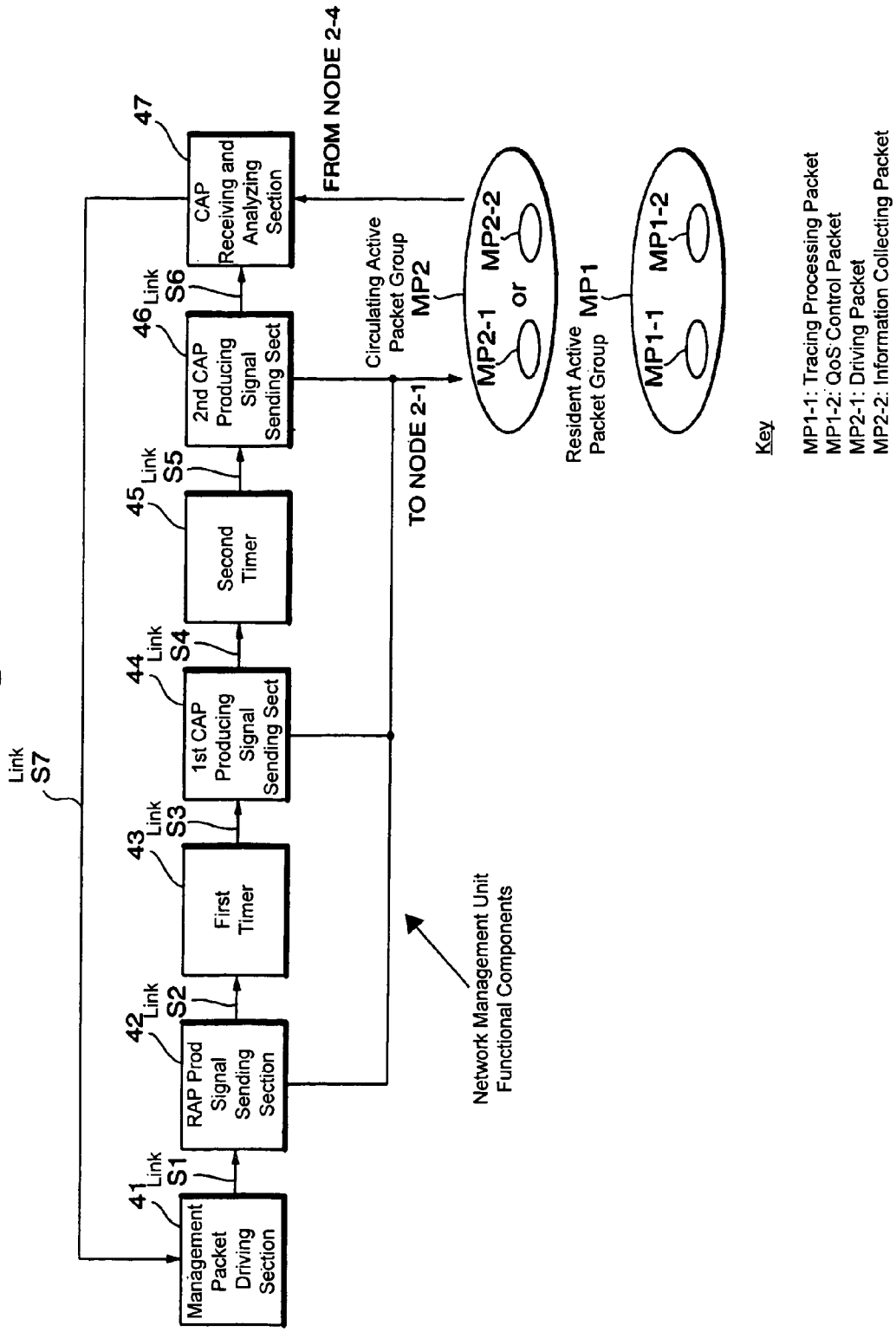
FIG. 6 is a schematic block diagram showing configurations of a network management unit according to a fourth embodiment of the present invention.

The network management unit 4 of the fourth embodiment, as shown in FIG. 6, has a management packet driving section 41, a resident active packet producing signal sending section 42, a first timer 43, a first circulating active packet producing signal sending section 44, a second timer 45, a second circulating active packet producing signal sending section 46 and a circulating active packet receiving and analyzing section 47. Each of these components, at the time of the QoS control operation, is operative to function for every kind of the transfer packet P in parallel.

The management packet driving section 41, in accordance with an instruction fed from the input and output device (not shown) manipulated by an operator, performs setting for the QoS control operation on the transfer packet P and drives the QoS control operations. In order to exercise the QoS control on the transfer packet, the transfer packet P, out of the transfer packets passing through the network N, is specified based on the information specific to the packet on which the QoS control is to be exercised.

An operator, when providing an instruction for the QoS control, can use the QoS processing table (for example, as in the case of Weighted Fair Queuing (WFQ) method) showing transfer priority of the transfer packet given in the form of a class and a degree of importance using the packet specific information which specifies contents of the transfer packet P as the parameter. Moreover, for the QoS control described above, priority-based queuing control (PQ) or custom-based queuing control (CQ) may be employed.

Also, the operator, based on a throughput or the number of errors (probability) of data transfer to be handled in a layer above the network layer or on the delay in the passage of the transfer packet through each of the nodes or fluctuations caused by the delay, can provide an instruction for changing the priority in the QoS control table described above for the transfer packet on which the QoS control is to be exercised.

If the network is of a type of connection oriented communication, the operator, based on a delay in establishing the network connection and a delay in releasing the network connection, can provide an instruction for changing the priority in the QoS control table.

The management packet driving section 41 may be configured so that, for example, the management packet driving section 41, when receiving a notification of a receipt of a first transfer packet P of the same packet group from the introduction side edge node 2-1 serving as a first node, performs setting for the QoS control and drives the QoS control operation. The management packet driving section 41 transmits a completion signal S1 notifying that the processing to be performed by the management packet driving section 41 has been completed to the resident active packet producing signal sending section 42.

The resident active packet producing signal sending section 42, after having received the completion signal S1 from the management packet driving section 41, forms the resident active packet group MP1 which contains the tracing processing packet MP1-1 for processing of tracing the transfer packet P and the QoS control packet MP1-2 for setting of the QoS control on the transfer packet P and then transmits it to the introduction edge node 2-1. The resident active packet producing signal sending section 42 transmits a completion signal S2 notifying that the above processing has been completed, to a first timer section 43.

The first timer section 43, after having received the completion signal S2 from the resident active packet producing signal sending section 42, makes measurements of a period of time during which the QoS control is set so as to be operating and, when the measurement of time has been completed, notifies the measured time to a first circulating active packet producing signal sending section 44. That is, the first timer 43, for example, starts the measurement of the fixed time from a time point when the resident active packet producing signal sending section 42 has transmitted the resident active packet group MP1. Moreover, the fixed time may be designated by an operator from the input and output device (not shown). The first timer section 43 transmits a completion signal S3 notifying that the measuring processing has been completed, to a first circulating active packet producing signal sending section 44. Moreover, the first timer 43 may send out, instead of the completion signal S3 to be sent immediately after the above measurement processing, the signal in accordance with an instruction of the operator.

The first circulating active packet producing signal sending section 44, after the receipt of the completion signal S3 from the first timer 43, forms the driving packet MP2-1 serving as the first circulating active packet and sends it to the introduction-side edge node 2-1.

The first circulating active packet producing signal sending section 44 sends a completion signal S4 notifying that the processing has been completed, to the second timer section 45.

The second timer section 45, after having received the completion signal S4 from the first circulating active packet producing signal section 44, makes the measurement of the period of time during which the QoS control operation is driven at the first node 2-1 to fourth node 2-4 and, at the time of completion of the measurement, notifies the circulating active packet producing sending section 46 of the result from the QoS control. The second timer 43, for example, starts the measurement of the fixed time from a time point when the first circulating active packet producing signal sending section 44 has transmitted the driving packet MP2-1. The fixed time may be designated by the operator from the input and output device (not shown). The second timer section 45 sends a completion signal S5 notifying that the processing by the second timer section has been completed. Moreover, the second timer 45 may perform the transmittance of the completion signal in accordance with an instruction of the operator.

The second circulating active packet producing signal sending section 46, after having received a completion signal S5 from the second timer 45, forms the information collecting packet MP2-2 serving as the second circulating active packet used for the collection of information about the result of the QoS control of the transfer packet P and sends it to the introduction-side edge node 2-1. The second circulating active packet producing signal sending section 46 transmits a completion signal S6 notifying that the processing has been completed, to the circulating active packet receiving and analyzing section 47.

The circulating active packet receiving and analyzing section 47, after having received a completion signal S6 from the second circulating active packet producing signal sending section 46, analyzes followings. The circulating active packet receiving and analyzing section 47, when being given the information collecting packet MP2-2 from the edge node 2-4 on the guiding-out side, analyzes whether or not the QoS control processing has been properly performed on the transfer packet P, based on information about the QoS processing result inserted into data on the QoS control on the packet MP2-2. The circulating active packet receiving and analyzing section 47, for example, outputs a result from the QoS control through the input and output device (not shown).

The information about the result includes information as to whether a throughput or the number of errors (probability) of the transfer packet, delay in the passage of transfer packets P in each node or fluctuations caused by the delay in each node can satisfy predetermined conditions.

If the network N is of the type of connection oriented communication, the information about the QoS control includes information as to whether a delay in establishing the network connection, delay in releasing the network connection or a like can satisfy predetermined conditions.

The circulating active packet receiving and analyzing section 47 produces an instruction S7 indicating whether processing is performed using parameters on which the QoS control is exercised for every active packet group MP1 being resident in each node, or processing by each of the management packet driving section 41 to the circulating active packet receiving and analyzing section 47 is performed or processing by each of the management packet driving sections 41 to the circulating active packet receiving and analyzing section 47 is performed using the resident active packet group MP1 with newly changed parameters. Operations by the management packet driving section 41 are again performed in accordance with contents given in the instruction S7.

Moreover, since the network N used here is of the connectionless type, a series of transfer packets P passes through a plurality of paths in some cases. Therefore, as in the case of the first embodiment, when a plurality of information collecting packets MP2-2 has arrived at the circulating active packet receiving and analyzing section 47 in the node, an analysis is made on not only the information collecting packet MP2-2 being related to the transfer packet that has arrived first but also the information collecting packet MP2-2 that has arrived within the predetermined period of time after the arrival of the packet that had arrived first.

Figure 7:
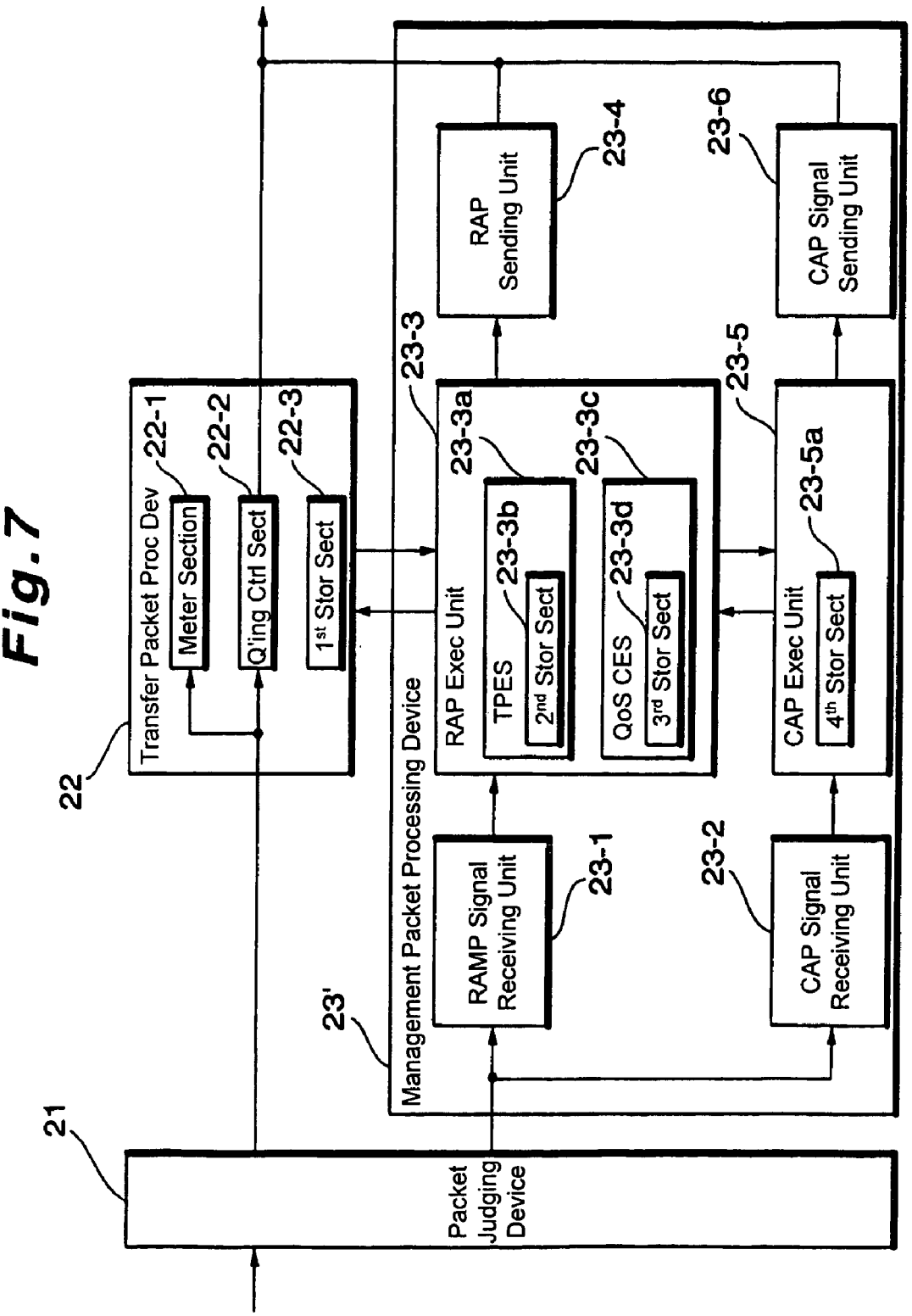
FIG. 7 is a schematic block diagram showing configurations of a node employed in the fourth embodiment of the present invention;.

Each of the first node 2-1 to the fourth node 2-4 has functional components as shown in FIG. 7. Configurations of hardware of the first node 2-1 to the fourth node 2-4 may be those employed in the conventional example. Each of the first node 2-1 to the fourth node 2-4 shown in FIG. 7 is configured in a manner that its hardware and software merge each other.

Each of the first nodes 2-1 to the fourth nodes 2-4 includes a packet judging device 21, a transfer packet processing device 22 made up of a meter section 22-1, a queuing control section 22-2 and a first storing section 22-3, a management packet processing device 23' made up of a resident active packet signal receiving unit 23-1, a circulating active packet signal receiving unit 23-2 and a resident active packet executing unit 23-3 made up of a tracing processing executing section 23-3a including a second storage section 23-3b, a QoS control executing section 23-3c including a third storage section 23-3d, a resident active packet sending unit 23-4, a circulating active packet executing unit 23-5 including a fourth storage section 23-5a and a circulating active packet signal sending unit 23-6.

Functions of the edge node 2-1 on the introduction side are different partially from those of the edge node 2-4 on the guiding side.

The packet judging device 21, as in the case of the first embodiment, is used to judge a type of a packet that has arrived at the node and to assign the packet to an appropriate section. That is, the packet judging device 21 assigns, if the packet that has arrived is a transfer packet P, the arrived packet to the transfer packet processing device 22 and, if the packet that has arrived is a packet of the resident active packet group MP1, the arrived packet to the resident active packet signal receiving unit 23-1 contained in the management packet processing device 23' and, if the packet that has arrived is a packet of the circulating active packet group MP2, the arrived packet to the circulating active packet signal receiving unit 23-2 contained in the management packet processing device 23'.

When the type of the packet is identified, packet specific information contained in the transfer packet P serving to specify a content of the packet is referred. At this point, the packet judging device 21 feeds the packet specific information contained in the arrived transfer packet P to the meter section 22-1 in the transfer packet processing device 22.

Further, at this point, an area for a flag indicating that an arrived packet is a packet of the resident active packet group MP1 and an area for a flag indicating that an arrived packet is a packet of the circulating active packet group MP2 are provided in a non-used area in a header field of each of the packets including the resident active packet group MP1 and circulating active packet group MP2 and a packet is specified by recognizing a state of these flags.

The transfer packet processing device 22, as in the case of the first embodiment, performs processing of transferring the transfer packet to a subsequent node or a user terminal (or to a server).

In the fourth embodiment, the transfer packet processing device 22 provides information about a path for the arrived transfer packet P, to a tracing processing executing section 23-3a in the management packet processing device 23' through the first storage section 22-3 in the packet processing device 22.

Moreover, the transfer packet processing device 22 exercises the QoS control on the arrived transfer packet P in accordance with an instruction fed from the QoS control executing section 23-3c contained in the management packet processing device 23'. The transfer packet processing device 22 provides the information about a result from the processing to the QoS control executing section 23-3c in the management packet processing device 23' through the first storage section 22-3 described above. The information about the result from the processing includes, for example, a throughput of the data transfer of the transfer packet, the number of errors (probability), delay in the passage of the transfer packet P in each of the nodes, fluctuation caused by the delay or a like and, if the network is of the connection-oriented type, a delay in establishment of the network connection and delay in releasing of the network connection may be included.

To exercise the above QoS control, as described above, the transfer packet processing device 22 is made up of the meter section 22-1, queuing control section 22-2, and the first storing section 22-3.

The meter section 22-1 measures, for example, a throughput or the number of errors (probability) of the data transfer to be handled in a layer beyond the network layer for a path through which the transfer packet P flows, and stores these results from the measurements in the storage section 22-3. Moreover, the delay in the passage of packets in each node, fluctuations caused by the delay or a like is measured for the path through which the transfer packet P flows and results from the measurement are stored in the first storage section 22-3. When the network is of the connection oriented type, the operator measures the delay in establishing the network connection, delay in releasing the network connection for the path through which the transfer packet flows or a like and results from the measurement are stored in the first storage section 22-3. The result from the measurement is provided through the first storage section 22-3 from the meter section 22-1 to the tracing processing executing section 23-3a contained in the management packet processing device 23'.

The queuing control section 22-2 receives the transfer packet P outputted from the packet judging device 21 and performs processing of transferring the transfer packet P to the subsequent node or the user terminal (or the server). If no instruction is provided from the QoS control executing section 23-3c in the management packet processing device 23', by using the information stored in the first storage unit 23-3, general queuing control is exercised on the transfer packet P. For example, the queuing control section 22-2 controls the queuing in a first-in first-out (FIFO) manner in response to a change in a throughput of the transfer packet P on a receiving side and in the throughput of the transfer packet P on the sending side.

Moreover, the queuing control section 22-2, when an instruction for the QoS control is provided from the QoS control executing section 23-3c, performs queuing control of the transfer packet P in accordance with the QoS control method which can satisfy the instruction.

The management packet processing device 23', as described above, includes the resident active packet signal receiving unit 23-1, the circulating active packet signal receiving unit 23-2, the resident active packet signal receiving unit 23-3 made up of the tracing processing executing section 23-3a including the second storage section 23-3b, of the QoS control executing section 23-3c including the third storage section 23-3d, the resident active packet sending unit 23-4, the circulating active packet executing unit 23-5 including the fourth storage section 23-5a and the circulating active packet signal sending unit 23-6.

The management packet processing device 23' causes the tracing processing packet MP1-1 to be resident and, at the same time, performs tracing processing of the transfer packet P and causes the QoS control packet MP1-2 to be resident to exercise the QoS control on the transfer packet P. Moreover, the management packet processing device 23', when receiving the driving packet MP2-1, drives the QoS control packet MP1-2 to control the QoS of the transfer packet and collects the information about the result from the QoS control by using the information collecting packet MP2-2.

The resident active packet signal receiving unit 23-1 receives and processes a packet contained in the resident active packet group MP1 fed from the packet judging device 21 and provides the received packet to the resident active packet executing unit 23-3. Here, when each of the tracing processing packet MP1-1 and the QoS control packet MP1-2 is made up of a plurality of packets, the resident active packet signal receiving unit 23-1, after having received and processed the plurality of the packet, may restore them back to one packet and may provide them to the resident active packet executing unit 23-3.

The circulating active packet signal receiving unit 23-2 receives and processes a packet contained in the circulating active packet group MP2 fed from the packet judging device 21 and provides it to the circulating active packet executing unit 23-5. Here, if each of the driving packet MP2-1 and information collecting packet MP2-2 is made up of a plurality of packets, the circulating active packet signal receiving unit 23-2, after having received and processed the plurality of the packet, may restore them back to one packet and then may provide each of them to the circulating active packet executing unit 23-5.

The resident active packet executing unit 23-3 has the tracing processing executing section 23-3a and the QoS processing executing section 23-3c.

The resident active packet executing unit 23-3 stores the tracing processing packet MP1-1 fed from the resident active packet signal receiving unit 23-1 in the second storage section 23-3b of the tracing processing executing section 23-3a and causes the tracing processing program of the tracing processing packet MP1-1 to be resident in the tracing processing executing section 23-3a and the tracing processing program to be executed.

The tracing processing executing section 23-3a, when path information of the transfer packet P designated by the tracing processing packet MP1-1 is first provided from the transfer packet processing unit 22, makes a copy of the tracing processing packet MP1-1 to be stored in the second storage section 23-3c and the QoS control packet MP1-2 to be stored in the third storage section 23-3d (to be described later) contained in the QoS processing executing section 23-3c. The tracing processing executing section 23-3a rewrites an address of a unit to which the tracing processing packet MP1-1 produced by the copying and the QoS control packet MP1-2 is to be transferred in order to have the transfer packet traced and provides it to the resident active packet sending unit 23-4.

Thereafter, every time the information about the path of the transfer packet designated by the tracing processing packet MP1 is provided, whether or not the path is one that has been used and, if it is a new path, copying and outputting of the resident active packet group MP1 or storing of path information are performed.

Moreover, tracing processing executing section 23-3a of the node other than the edge node 2-1 on the introduction side may allow the tracing processing packet MP1-1 that has arrived after the arrival of the transfer packet P to be resident and the information about the path of the transfer packet P to be stored. In this case, when the transfer packet P is transmitted to a new path, storing of the information about the path, copying and outputting of the resident active packet group MP1 are performed.

Most of processing programs required for processing by the tracing processing executing section 23-3a may be described in advance and the tracing processing executing section 23-3a may be constructed so as to have an environment in which the processing program is executed.

Moreover, the resident active packet executing unit 23-3 stores the QoS control packet MP1-2 stored in the third storage section 23-3d in the QoS processing executing section 23-3c and has the QoS processing program of the QoS control packet MP1-2 be resident in the QoS processing executing section 23-3c. This program is executed by a driving signal for the QoS control to be described later.

Then, the QoS control executing section 23-3c, for example, in accordance with the QoS control parameter for the transfer packet P to be transferred, performs setting to the queuing control section 22-2 so that the QoS control is exercised. The information about the result from the QoS control exercised on the transfer packet P to be transferred is stored in the QoS control data.

As the QoS control parameter, for example, values shown in the QoS control table 7 in FIG. 8 are used. In the uppermost portion in a row direction in the QoS control table 7 are shown parameters having the most highest degree of importance of the packet. The degree of importance 71 (highest important) is a parameter to be used for transmitting a packet being sent from a sender having an IP address being AAA with a low delay and with a high throughput. The degree of importance 72 (middle importance) is a parameter to be used for transmitting a packet being sent from a sender having an IP address being CCC with a low delay and with a high throughput. The degree of importance 73 (low importance) is a parameter to be used for ordinarily transmitting a packet being sent from a sender having an IP address being EEE.

Moreover, in the leftmost portion in a column direction in the QoS control table 7 are shown parameters having the highest class of the packet.

In the column direction in the QoS table, a higher class is assigned to the packet, which has been transmitted from the sender IP address, showing a content requiring for a higher emergency. That is, the packet being assigned class 4 represent a packet having a content requiring for emergency in transmittance, the packet being assigned class 3 represents a packet having a content requiring for urgency in transmittance, the packet being assigned class 2 represents a packet having a content requiring for immediacy in transmittance and the packet being assigned class 1 represents a packet having a content requiring for the ordinary in transmittance.

The QoS processing parameters 78 to 89 in the QoS control table 7 are assigned so that a packet having a higher degree of importance is provided with a higher order of transmittance and a packet being assigned a higher class is provided with a higher order of transmittance. Moreover, in general, in the network, since the packet being assigned the "ordinary" class is transmitted in many cases, in the control table, the many numbers of transmittance are assigned to the packet having the lower class. As shown in FIG. 8, in each of parameters 78 to 89 is described a value showing transmitting order of the packet and each of the packets is transmitted in this order. For example, four packets corresponding to the parameter 78 are first transmitted (transmitting order: "1"), three packets corresponding to the parameter 79 are then transmitted (transmitting order: 2), two packets corresponding to the parameter 80 are then transmitted (transmitting order: 3) and one packet corresponding to the parameter 81 is transmitted (transmitting order: 4). Thereafter, packets are transmitted in accordance with the transmitting order, with the same procedures as described above.

When a packet to be transmitted from a sender (sender IP address AAA) having the degree of importance 71 is a packet for which a communication delay is not allowed, such as packets for VoIP (Voice over IP) or VOD (Video on Demand), the QoS control parameters 78 to 89 may be handled as follows, in accordance with the packet specific information used to specify the packet. When considerations is given to the throughput of the data transfer or the number of errors (probability) and when a delay in the passage of the transfer packet P in the node, fluctuations caused by the delay or a like makes it difficult to transmit packets to be used for the VoIP or VOD from the sender having the degree of importance 71 (highest importance), the above packets for the VoIP or VOD may be transmitted by using the transmitting order provided by the QoS control parameters 89, 88 or 87, not by the QoS control parameters 78 to 81.

The QoS control parameter is not limited to the above, however, a DS (DiffServ) code point used in a DiffServ (Differentiated Services) which is conventionally known may be used.

The information about results from the QoS control is stored in the third storage section 23-3d of the QoS control executing section 23-3c and the above information is made up of an amount of information accumulated in the queue section, the QoS control table, an amount of use of the queuing corresponding to the QoS control table, a band, an amount of transmittance of packets, delays in the passage of packets, fluctuations caused by the delay or a like.

Here, most of the processing program required for processing by the QoS control executing section 23-3c is described in the QoS control packet MP1-2 and the QoS control executing section 23-3c may be so configured as to have an environment to execute the processing program.

The resident active packet sending unit 23-4 transmits a packet contained in the resident active packet group MP1 fed from the resident active packet executing unit 23-3 to the same route (link) as is used to transmit the transfer packet P corresponding to the packet group.

If there exists a plurality of routes (links) that has transmitted the transfer packet P, a copy of the resident active packet MP1 is further made in order to send it out to each of the routes. Moreover, the resident active packet sending unit 23-4 of the guiding-out edge node 2-4 transmits the resident active packet group MP1 to the network management unit 4.

If the tracing processing packet MP1-1 made up of a plurality of packets and the QoS control packet MP1-2 made up of a plurality of packets are incorporated into single packet by the resident active packet signal receiving unit 3-1, when these packets are to be transmitted, the resident active packet sending unit 23-4 may divide the single packet into a plurality of packets and sends them to the network management unit 4.

The circulating active packet executing unit 23-5, when the driving packet MP2-1 is fed to the circulating active packet signal receiving unit 23-2, drives the QoS control packet MP1-2 being resident at the QoS control executing unit 23-3c of the circulating active packet executing unit 23-5. To drive the QoS control packet MP1-2, a driving signal is produced, which is fed to the QoS control packet MP1-2 contained in the QoS control executing section 23-3c.

The circulating active packet executing unit 23-5, when being fed with the driving packet MP2-1, inserts information about a path, which is stored in the second storage section 23-3b, for the tracing processing packet MP1-1 being resident in the tracing processing packet executing section 23-3a into the tracing processing data included in the driving packet MP2-1.

Moreover, the circulating active packet executing unit 23-6, when being fed with the information collecting packet MP2-2, inserts QoS information, which is stored in the third storage section 23-3d, for the resident tracing processing packet MP1-2 being resident, into the QoS processing data included in the information collecting packet MP2-2.

Here, most of the processing program required for processing by the circulating active packet executing unit 23-5 is described in a packet of the circulating active packet group MP2 and the circulating active packet executing unit 23-5 may be so configured as to have an environment to execute the processing program.

The circulating active packet sending unit 23-6 sends out the driving packet MP2-1 contained in the circulating active packet group MP2 and information collecting packet MP2-2, to the route (link) from which the resident active packet group MP1 has been transmitted. At this point, the circulating active packet signal sending unit 23-6 makes reference to the driving packet MP2-1 and the tracing processing data of the information collecting packet MP2-2. Moreover, the circulating active packet signal sending unit 23-6 of the guiding-out side edge node 2-4 transmits each of the above packets of the circulating active packet group MP2 to the network management unit 4. If there is a plurality of routes (links) that has transmitted the resident active packet group MP1, a copy of the circulating active packet MP2 is made so that it can be sent out to each of the paths.

Moreover, the circulating active packet signal sending unit 23-6, after having divided each of the packets of the circulating active packet group MP2 into a plurality of packets, may transmit them to the network management unit 4.

In the above description, the network management unit 4 collects the plurality of the circulating active packets MP2 together, however, the circulating active packet executing unit 23-5 of the guiding-out edge node may collect the plurality of the circulating active packet MP2 together.

(D-2) Operations in Fourth Embodiment

Next, operations of the QoS control in the fourth embodiment will be briefly described.

In the network management unit 4, a transfer packet P on which the QoS control is exercised is designated out of the transfer packets to be introduced into the network and, when an instruction for the QoS control is provided, the resident active packet group MP1 made up of the tracing processing packet MP1-1 and QoS control packet MP1-2 is formed, which is transmitted to the first edge node 2-1 on the introduction side.

The edge node 2-1 on the introducing side has the storing section 23-3b in the tracing processing executing section 23-3a store the tracing packet MP1-1 fed from the network management unit 4 and has the tracing processing executing section 23-3a run the tracing processing program and waits for the corresponding packet P to arrive.

Moreover, the edge node 2-1 on the introduction side has the third storing section 23-3d in the QoS control executing section 23-3c store the QoS control packet MP1-2 and the QoS control executing section 23-3c execute the QoS control program.

The edge node 2-1 on the introduction side, when the transfer packet has arrived, has the tracing processing executing section 23-3a store information about a path of the transfer packet P in the tracing processing data stored in the second storing section 23-3b in which the tracing processing packet MP1-1 is saved and sends out a replica of the resident active packet group MP1 through the resident active packet sending section 23-4 to a route (for example, destination: link 3-1 or 3-2) for the transfer packet. Other nodes 2-2 to 2-4 perform the same tracing processing on the transfer packet P as for the node 2-1.

Moreover, the replication and outputting of the resident active packet group MP1 are not performed on the packets that have passed through the same route (link), out of a series of the transfer packets P and the replication and outputting of the resident active packet group MP1 are performed on the transfer packets P that have passed through a new route.

The network management unit 4, thereafter, transmits the driving packet MP2-1 to the edge node 2-1 on the introduction side. Each of the nodes has the storing section 23-4a in the circulating active packet executing unit 23-5 store the driving packet MP2-1 and has the circulating active packet executing unit 23-5 execute a driving program contained in the driving packet.

Each of the nodes inserts path information inserts information about setting for the path for the tracing processing packet MP1-1 being stored in the second storing section 23-3b in the tracing processing executing section 23-3a into the tracing processing data contained in the driving packet MP2-1 and sends out the driving packet MP2-1 to the same route (link) as the resident active packet group MP1 has been transmitted through. When the driving packet MP2-1 has been sent out, the running of the driving program is terminated, and in the storing section 23-5a in the circulating active packet executing unit 23-5, all the information other than that indicating that the driving packet MP2-1 has passed are erased.

The edge node 2-4 on the guiding-out side transmits the driving packet MP2-1 fed through the edge node 2-1 on the introduction side through the intermediate node 2-2 or 2-3 to the network management unit 4. The network management unit 4, by the driving packet MP2-1 that has arrived, recognizes that the setting for the QoS control on the transfer packet P in each of the nodes has been completed.

The network management unit 4, thereafter, transmits the information collecting packet MP2-2 to the edge node 2-1 on the introduction side. Each of the nodes has the fourth storing section 23-5 in the circulating active packet executing unit 23-5 store the information collecting packet MP2-2 and has the circulating active packet executing run the information collecting program contained in the collecting packet.

Each of the nodes inserts information about results from the QoS control related to the QoS control packet MP1-2 being stored in the third storing section 23-3d in the QoS control executing section 23-3, into the information collecting data contained in the information collecting packet MP2-2 being saved in the fourth storing section 24-5a.

Moreover, each of the nodes inserts information about the setting for the path for the tracing processing packet MP1-1 being stored in the second storing section 23-3b in the tracing processing executing section 23-3a into the tracing processing data contained in the information collecting packet MP2-2 and sends out the information collecting packet to the same route (link) as the resident active packet group MP1 has been transmitted through. When the information collecting packet MP2-2 has been sent out, the information collecting program is terminated and, in the storing section 23-5a in the circulating active packet executing unit 23-5, all the information other than that indicating that the information collecting packet MP2-2 has passed, are erased. The edge node 2-4 on the guiding-out side transmits the information collecting packet MP2-2 fed through the edge node 2-1 on the introduction side through the intermediate node 2-2 or 2-3 to the network management unit 4. The network management unit 4 analyzes the arrived information collecting packet MP2-2 at the circulating active packet receiving and analyzing section 47 and checks results from the QoS control related to the transfer packet P.

When the information about the result from the above QoS control does not satisfy predetermined conditions, by using the resident active packet group MP1 having a new parameter changed so as to be suitable to the QoS control, an instruction (S7) for carrying out each of operations at the management packet driving section 41 to the circulating active packet receiving and analyzing section 47 is produced.

(D-3) Effects of Fourth Embodiment

According to the fourth embodiment, the network management unit 4 is able to collect the results from the QoS control, in addition to the path information of the transfer packet having passed through the network, by the transmission and receipt of information only between the edge node 2-1 and the edge node 2-4, without the transmission and receipt of information among all the nodes or among many nodes of the network N. As a result, the load of processing to be performed by the network management unit 4 can be reduced more, compared with the conventional case.

Moreover, when the QoS control is carried out and results from the QoS control are collected, since only the node through which the transfer packet has passed performs necessary operations, the load of processing to be performed by the node can be reduced, on average, when compared with the conventional case.

(D-4) Modified Example of Fourth Embodiment

In the fourth embodiment, if units to which a series of transfer packets P is to be transferred does not change dynamically and if setting of executing environment for the QoS control is possible by the queuing control section 22-2, all that the QoS control packet executing section 23-3c has to do is to set a table required for the QoS control at the queuing control section 22-2. In this case, it is not necessary for the tracing processing executing section 23-3a to have the tracing processing packet MP1-1 continue to be resident and, similarly, for the QoS control packet executing section 23-3c to have the QoS control packet MP1-2 continue to be resident.

To erase the resident active packet group MP1 containing the tracing processing packet MP1-1 and the QoS control packet MP1-2 being resident at each node, the same method to erase the tracing packet MP1 as was employed in the first embodiment can be used.

In the above embodiment, procedures for obtaining the information about the execution of the QoS control and about the results from the QoS control using the two kinds of management packet groups including the resident active packet group MP1 and circulating active packet group MP2 are provided, however, the processing can be realized by using only the resident active packet group MP1.

For example, the procedure may be realized by describing the information about all the paths leading to the node and by having the fourth node 2-4 (edge node on the guiding-out) send out the resident active packet MP1 to the network management unit 4.

(E) Fifth Embodiment

Next, a network management system of the fifth embodiment of the present invention will be described briefly by referring to a drawing.

Configurations of the network management system of the fifth embodiment can be explained by referring to FIG. 4 which is used in the second embodiment. Therefore, same parts and reference numbers assigned to the corresponding parts as employed in the second embodiment can be used in the fifth embodiment.

In the network management system 1A of the fifth embodiment, as in the case of the second embodiment, instead of the network management unit 4 used in the first embodiment, a user terminal or a server 6 serving as a sender of the transfer packet P is introduced which is used as a sender of the resident active packet group MP1 and circulating active packet group MP2.

Processing by the nodes 2-1 to 2-4 is almost the same as that in the fourth embodiment except the following point. That is, the edge node on the guiding-out side, when the circulating active packet group MP2 has arrived and the processing for the packet has terminated, performs returning processing, through the network, so that the circulating active packet group MP2 is fed to the user terminal or to the server 6. As the path to return the circulating active packet group MP2 to the user terminal, a reverse path for the transfer packet P may be used or irrelevant path may be also used. In the former case, when the information collecting packet MP2-2 to be returned has arrived, the resident active packet group MP1 being resident at each node may be erased.

According to the fifth embodiment, as in the case of the fourth embodiment, when the QoS control is carried out and the result from the QoS control is collected, since only the node through which the transfer packet has passed performs necessary operations, the load in processing to be performed by the node can be reduced more, on average, compared with the conventional case.

Moreover, since the user terminal or the server 6, instead of the network management unit 4, serves as the sender of the resident active packet or the circulating active packet, the user or the server can get the path information on demand.

The technological thought used in the modified example of the fourth embodiment can be applied to the fifth embodiment.

(F) Sixth Embodiment

Next, a network management system of the sixth embodiment of the present invention is described by referring to the drawing. Configurations of the network management system of the sixth embodiment can be explained by referring to FIG. 5 which is used in the third embodiment. Therefore, same parts and reference numbers assigned to the corresponding parts as is employed in the third embodiment can be used.

In the network management system 1B of the sixth embodiment, as in the case of the fourth embodiment, the network management unit 4 serves as the sender of the resident active packet group MP1 and the circulating active packet group MP2 so as to exercise the QoS control and to collect the result from the QoS control, and an instruction for performing the above processing is provided to the network management unit 4 from the user terminal or the server 6 through the eighth link 5-3, as in the case of the third embodiment. The acquired path information and information about results from the QoS control are provided to the user terminal or the server 6 from the network management unit 4 through the eighth link 5-3.

Operations by each of the nodes 2-1 to 2-4 are the same as those in each of the nodes of the fourth embodiment.

According to the sixth embodiment, the same effects as obtained in the case of the fourth embodiment can be obtained. There is an advantage to the user in that the QoS control can be exercised and the result from the QoS control can be collected, on demand, without production of the tracing processing packet MP1-1 or the information collecting packet MP2-2.

Moreover, the technological thought used in the modified example of the fourth embodiment can be applied to the sixth embodiment.

(G) Seventh Embodiment

Next, a network quality control system of the seventh embodiment of the present invention is described by referring to the drawing. FIG. 9 is a schematic block diagram showing configurations of the network quality control system 1C according to a seventh embodiment of the present invention. In FIG. 9, same reference numbers are assigned to corresponding parts having the same functions as those in the fourth embodiment.

In the network quality control system IC, two network management systems having the same configurations as provided in the fourth embodiment are connected to each other.

In the network quality control system 1C, a network N1 being made up of the fifth node 2-5 to the eighth node 2-8, the ninth link 3-6 to thirteenth link 3-10, the fourteenth link 5-4, the fifteenth link 5-5 and the network management unit 4-1 are added to configurations of the fourth embodiment.

The fifth node 2-5 to the eighth node 2-8 in the network N1 are connected by five links including the ninth link 3-6 to the thirteenth link 3-10 in the example in FIG. 9. Moreover, contents of processing to be performed by the fifth node 2-5 to the eighth node 2-8 are the same as those of processing by the first node 2-5 to the fourth node 2-4 in the network N. Between the fourth node 2-4 and the fifth node 2-5 is mounted the sixteenth link 3-11 to connect the networks N and N1 each other. The transfer packet P to be sent out from the network N to the network N1 is fed to the fifth node 2-5 of the network N1 through the fourth node 2-4, to the above sixteenth link 3-11 of the network N.

The fourteenth link 5-4 is connected between the fifth node 2-5 and the network management unit 4-1 while the fifteenth link 5-5 is connected between the eighth node 2-5 and the network management unit 4-1.

The processing to be by the network management unit 4-1 is basically the same as that to be done by the network management unit 4, however, as described later, a parameter of a resident active packet group MP1 and a parameter of a circulating active packet group MP2, both being produced depending on a network to be connected, differ from each other.

The transfer packet P, as in the case of the fourth embodiment, is introduced through the edge node 2-1 to the network N and guided out through the edge node 2-4 from the network N. Moreover, the guided-out transfer packet P, as in the case described above, is introduced through the sixteenth link 3-11 to the fifth node 2-5 serving as the edge node on the introduction side of the network N1 and then to the network N1, then is guided out from the network N1 through the eighth node 2-8 on the edge node on the guiding-out side of the network N1.

The resident active packet group MP1 and the circulating active packet group MP2, as in the case of the fourth embodiment, are produced in the network management unit 4 and introduced through the first node 2-1 to the network N. These management packets are transferred through the path through which the transfer packet P has passed and are fed to the network management unit 4 through the fourth node 2-4.

The network management unit 4, when each of the resident active packet group MP1 and circulating active packet group MP2 has returned back to the network management unit 4, transmits these packets to the network management unit 4-1 through the seventeenth link 5-6. In the network management unit 4-1, a parameter being specific in the network N1 is produced and the produced parameter is overwritten with a parameter being specific in the network N contained in the resident active packet group MP1 and circulating active packet group MP2.

The resident active packet group MP1 and circulating active packet group MP2 each having a revised parameter being specific in the network N1 are transmitted from the network management unit 4-1 and is introduced from the fifth node 2-5 to the network N1. These management packets are transferred through the path through which the transfer packet P has passed and are fed to the network management unit 4-1 through the fourth node 2-8.

By a series of processing procedures described above, the QoS control on the transfer packet P is exercised and results from the QoS control are collected in each of the networks N and N1.

Moreover, the technological thought used in the modified example of the fourth embodiment can be applied to the seventh embodiment.

According to the seventh embodiment, even on the network on which a plurality of units such the network management units exists as described above, by transmitting and receiving a program between the network management units, without exchange of information among all the nodes or many nodes on the network, and by transmitting and receiving information to and from both the edge nodes each corresponding to the network, it is possible to exercise the QoS control on the predetermined transfer packet and to collect information about the result from the QoS control. As a result, the load of processing to be performed by the network management unit can be reduced more, compared with the conventional case.

Moreover, when the QoS control is exerted on the transfer packet and the information about the result from the QoS control is collected, since only the node through which the transfer packet to be managed has passed performs operations required for the collection, the load of processing to be performed by the node can be reduced more, on average, compared with the conventional case.

(H) Eighth Embodiment

A network management system of the eighth embodiment of the present invention has the same configurations as those in the first and fourth embodiments. The network management system of the eighth embodiment will be described by referring to FIG. 1.

In the network management system of the eighth embodiment, instead of the QoS control processing, filtering processing is performed on a transfer packet to be managed. Hereinafter, the filtering processing is referred to as "filtering". The filtering represents processing in which, in order to reduce a state of congestion, a predetermined packet is selected at each node and is abandoned.

(H-1) Configurations of Eighth Embodiment

Configurations of the network management system of the eighth embodiment will be described hereinafter.

In the network management system 4 of the eighth embodiment, when the filtering is performed at each node through which a predetermined transfer packet P passes, a resident active packet group MP1 serving as a first management packet group described later and a circulating active packet group MP2 serving as a second management packet group are produced. Both the above packet groups MP1 and MP2 contain a program, parameters, data or a like.

The network management unit 4, as in the case of the fourth embodiment, transmits both the packet groups MP1 and MP2 to the edge node 2-1 on the introduction side in the network N and receives these packet groups from the edge node 2-4 on the guiding-out side. Each of the resident active packet group MP1 and circulating active packet group MP2 contains packet specific information used to specify a content of the transfer packet on which the filtering is performed or of the predetermined transfer packet, which is the same packet specific information employed in the fourth embodiment.

The resident active packet group MP1 of the eighth embodiment flows while tracing the predetermined transfer packet P which has passed through the network N. The program, parameters, data or a like contained in the packet group MP1 are made resident on each of the nodes on the path and the filtering on the predetermined packet passing through the node is performed using the program, parameters, data or the like contained in the packet group MP1. The resident active packet group MP1 of the eighth embodiment includes such a tracing processing packet MP1-1 as is used in the fourth embodiment and also, instead of the QoS control packet MP1-2, a filtering packet MP1-2 used to perform the filtering on the transfer packet or predetermined transfer packet based on a fixed condition.

The resident active packet group MP2 may be made up of either of a single packet or a plurality of packets and the tracing processing packet MP1-1 and filtering packet MP1-2 may be made up of either of a single packet or a plurality of packets.

The filtering packet MP1-2 contains a filtering program, filtering parameters, filtering data or a like. The filtering program is used to perform the filtering in accordance with the filtering parameter to be applied to the transfer packet. Information about results from the filtering is inserted into the filtering data.

As the parameter for filtering, check items for the transfer packet and a filtering table containing information about an amount of the information to be corresponded to the check item are used. The check items includes, for example, an average use frequency of the queuing, packet specific information specifying contents of the transfer packet, average use frequency of the queuing of the predetermined transfer packet P or a like. It also includes an average transmission rate in traffics at a node and packet specific information for the transfer packet P.

The filtering data contains an amount of information about use amount of queuing accumulated in the queue unit, transmission rate, amount of abandoned packets, band, delay in passage of packets, fluctuations caused by the delay or a like. The information about results from the filtering is inserted into this data.

Moreover, the circulating active packet group MP2 of the eighth embodiment is made up of a program, parameters, data or a like which is sent out from the network management unit 4 after a lapse of fixed time following the time of the transmission of the resident active packet group MP1. The circulating active packet group MP2 contains a driving packet MP2-1 used to drive the filtering program in the filtering packet MP1-2 and such the information collecting packet MP2-2 as used in the fourth embodiment.

The circulating active packet group MP2 is made up of a single packet or a plurality of packets and each of the driving packet MP2-1 and information collecting packet MP2-2 are also made up of a single packet or a plurality of packets.

The driving program contained in the driving packet MP2-1 of the eighth embodiment generates a driving signal to drive the filtering program being resident at each node.

The information collecting program is used to collect information about the result from the filtering obtained directly or indirectly from the resident active packet group MP1 being resident in a node designated by the information collecting parameter. The collected information about the result is incorporated into the information collecting data of the collecting packet MP2-2.

The network management unit 4 has the same functional components as is used in the fourth embodiment, as shown in FIG. 6. Each of the management packet driving section 41 to circulating active packet receiving and analyzing section 47 are operated to function, in parallel, for every predetermined transfer packet P on which the filtering is performed.

The management packet driving section 41 performs processing of the setting for the filtering of the corresponding transfer packet or predetermined transfer packet P and of driving the operation of the filtering. To trace a predetermined transfer packet or to perform the filtering of the transfer packet or the predetermined transfer packet, the packet on which the filtering is performed is identified using packet specific information for selection.

As the parameters required for an operator of the network management unit 4 to provide an instruction for the filtering, an average use frequency of the queuing for the transfer packet at each node and packet specific information used in the filtering table in which such algorithms as Random Early Detection (RED) or Weighted Random Early Detection (WRED) are employed. Moreover, parameters used in a filtering table in which average use frequency of the queuing for a predetermined transfer packet at each node and the packet specific information of the predetermined transfer packet are added may be used.

Also, as the parameters for the filtering, average transmission rate of traffics at each node and packet specific information of the transfer packet employed in the filtering table in which Committed Access Rate (CAR) or a like is used. Moreover, parameters used in the filtering table in which an average transmission rate of traffics at each node and packet specific information of a predetermined transfer packet P are added, may be used.

The operator of the network management unit 4 may be allowed to provide an instruction for changing the order of precedence in a transfer packet or a predetermined transfer packet to be processed in the filtering table, based on the number of errors (probability), delay in the passage of the transfer packet or the predetermined transfer packet in each node.

In the network management unit 4 of the eighth embodiment, each of the functions of the management packet driving section 41 to the circulating active packet receiving and analyzing section 47 can be thought by replacing these functions of the QoS control provided in the fourth embodiment with functions of the filtering. That is, for example, the QoS control packet MP1-2 of the resident active packet group MP1 in the fourth embodiment can be thought as the filtering packet MP1-2 of the eighth embodiment through which the network management unit 4 obtains information about results from the filtering at each node. The information about results from the filtering contains use frequency of queuing for the transfer packet or the predetermined transfer packet at each node, use frequency of queuing by the order of precedence, amount of information accumulated in the queue, amount of abandoned packets, band, delay in the passage of packets, fluctuations caused by the delay or a like.

Moreover, the information about results from the filtering contains an average transmission rate in traffics of the transfer packet or the predetermined transfer packet P or average transmission rate in traffics by the order of precedence, amount of abandoned packets, band, delay in the passage of packets, fluctuations caused by the delay or a like.

The network management unit 4, based on the information about the results, produces an instruction (see S7 in FIG. 6) as to whether the filtering operations using the present parameters is to be performed or each of the processing by the management packet driving section 41 to circulating active packet receiving and analyzing section 47 is to be performed. In accordance with contents of this instruction, the management packet driving section 41 is again driven.

Figure 10:
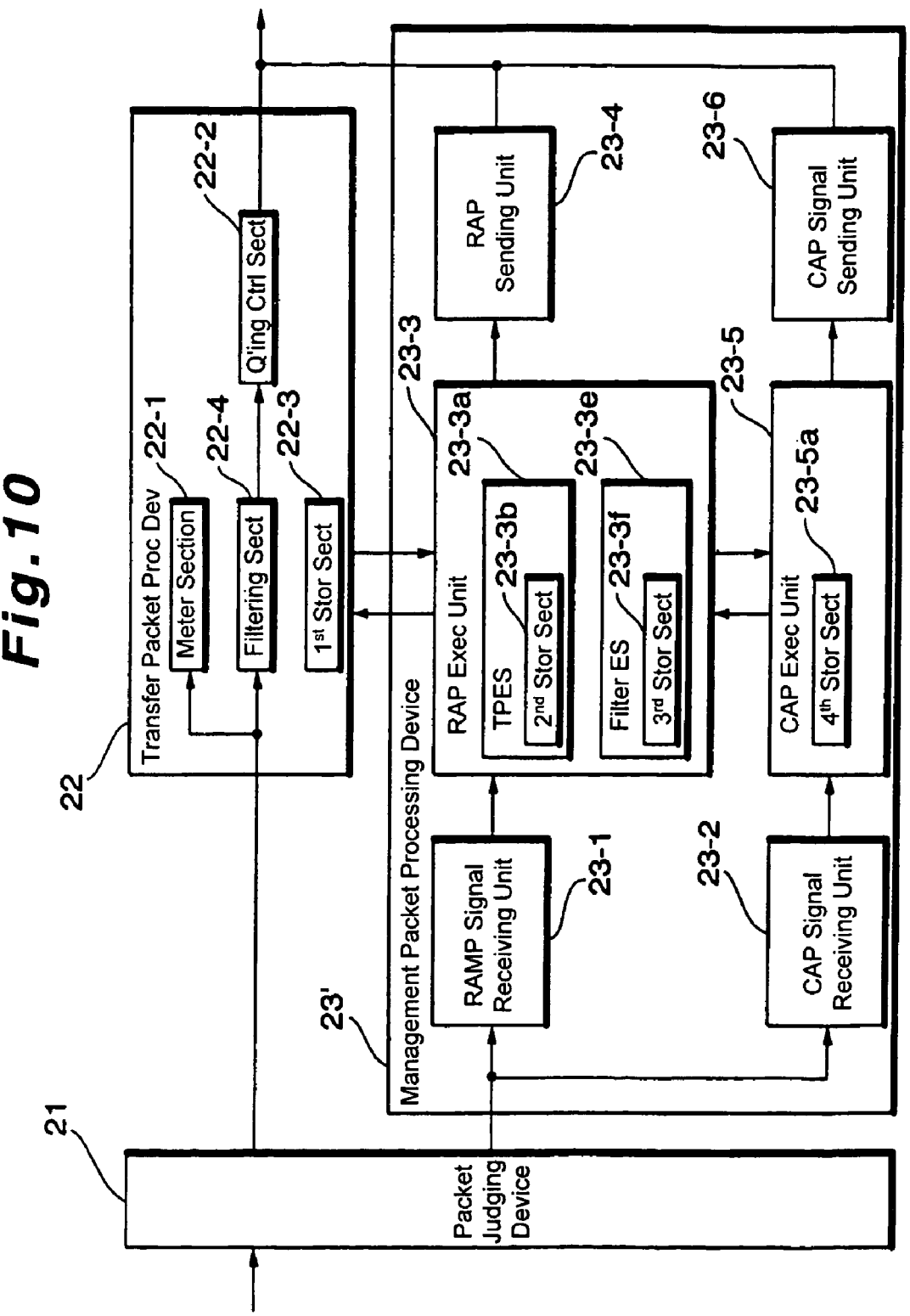
FIG. 10 is a schematic diagram showing configurations of a node employed in the eighth embodiment of the present invention.

Each of the first node 2-1 to the fourth node 2-4 has functional components as shown in FIG. 10. Configurations of hardware in each of the nodes may be those as provided in the conventional one. In FIG. 10, the functional components are provided in a form being merged.

FIG. 10 is a block diagram showing components of each of the nodes employed in the eighth embodiment. Each of the nodes has components having almost the same functions as those in the fourth embodiment. Configurations in the eighth embodiment differ from those in the fourth embodiment in that a filtering executing section 23-3e and a third storing section 23-3f, instead of the QoS control executing section 23-3c and the third storing section 23-3d in the management packet processing device 23' and a filtering section 22-4 in the transfer packet processing device 22 are provided.

The transfer packet processing device 22 of the eighth embodiment performs the filtering of the arrived transfer packet or the predetermined transfer packet P in accordance with an instruction from a filtering executing section 23-3e in the management packet processing device 23'. The transfer packet processing device 22 returns the information about results from the processing back through the first storing section 22-3 in the transfer packet processing device 22 to the filtering executing section 23-3c. As the result information about the filtering, the information described about the network management unit 4 is handled.

The transfer packet processing device 22 includes a meter section 22-1, filtering section 22-4, first storing section 22-3 and queuing section 22-2.

The meter section 22-1 is used to make measurements of an amount of use of the queue for the transfer packet or the predetermined packet P. The meter section 22-1 also makes measurements of a throughput (average transmission rate in traffics) or the number of errors (probability) of the transfer packet or of the predetermined transfer packet P, in a path through which the predetermined packet flows, to be treated in a layer above the network layer. The measurement results are stored in the first storing section 22-3. Moreover, the delay in the passage of the transfer packet or of the predetermined transfer packet P or fluctuations caused by the delay, for a path through which the transfer packet flows, are measured. These measurement results are stored in the first storing section 22-3. The above measurement results are fed through the first storing section 22-3 to the tracing processing executing section 23-3a.

The filtering section 22-4 is used to receive the transfer packet outputted from the packet judging device 21 and to perform the filtering on the transfer packet or on the predetermined transfer packet P. The filtering section 22-4, when no instruction for the filtering is fed from the filtering executing section 23-3c, performs a general filtering on the transfer packet or predetermined transfer packet P by using information about the first storing section 23-3. In the general filtering, the filtering section 22-4, for example, when use frequency of the queuing reaches an upper limit due to an increase in the traffic of packets at an output interface of the filtering section 22-4, stops transferring of the packets to the queuing control section 22-2 (this operation being called "tail drop" operation).

Moreover, the filtering section 22-4, when an instruction for the filtering is fed from the filtering section 23-3c of the management packet processing device 23', performs the filtering on the transfer packet or predetermined transfer packet P in accordance with the given instruction.

The queuing control section 22-2 is used to receive the predetermined transfer packet P outputted from the filtering section 22-4 or other transfer packet and to transfer the received packet to a next node on a transfer route, user terminal or server. The queuing control section 22-2, as in the case of the fourth embodiment, controls the queue in the FIFO control manner. Moreover, instead of the FIFO control method, Weighted Fair Queuing (WFQ), PQ or CQ method may be used to control the queuing.

The management packet processing device 23' performs processing of tracing the predetermined transfer packet P by causing the tracing processing program to be stored in the tracing processing packet MP1-1 to be resident and carries out filtering on the transfer packet or on the predetermined transfer packet P by causing the filtering program contained in the filtering packet MP1-2 to be resident. The management packet processing section 23' drives operations of the filtering packet MP1-2 by using the driving program stored in the driving packet MP2-1. By using the information collecting program stored in the information collecting packet MP2-2, information about results from the filtering contained in the filtering packet MP1-2 is collected.

The management packet processing device 23' includes a resident active packet receiving unit 23-1, circulating active packet receiving unit 23-2, resident active packet executing unit 23-3, tracing processing executing section 23-3a, second storing section 23-3b, filtering executing section 23-3e, third storing section 23-3f, resident active packet sending unit 23-4, circulating active packet executing unit 23-5, fourth storing section 5a and circulating active packet sending unit 23-6. Each of the above components other than the filtering executing section 23-3e and third storing section 23-3f has the same functions as those in the fourth embodiment.

The tracing processing executing section 23-3a, when having first received information about a path for the predetermined transfer packet P, makes a copy of a tracing processing packet MP1-1 made up of a tracing processing program stored in the second storing section 23-3b in the tracing processing executing section 23-3a, tracing processing parameters, tracing processing data or a like and filtering packet MP1-2 made up of a filtering program stored in the third storing section 23-3f, filtering parameters, filtering data or a like. The tracing processing executing section 23-3a, in order to trace the transfer packet P to be managed, overwrites a destination of the copied tracing processing packet MP1 with a destination of the transfer packet P and feeds it to the resident active packet sending section 23-4.

The filtering executing section 23-3e has the third storing section 23-3f store the filtering program, filtering parameters, filtering data or a like contained in the filtering packet MP1-2 to cause the filtering program to be resident at the filtering executing section 23-3e. The program is driven by a driving signal for filtering described later.

Moreover, the filtering executing section 23-3e, for example, in accordance with the filtering parameter for the transfer packet to be filtered or the predetermined transfer packet P, performs the setting for filtering at the filtering control unit 22-4. The filtering executing section 23-3c inserts information about results from filtering performed on the transfer packet or the predetermined transfer packet P into the filtering data of the third storing section 23-3f.

When filtering parameters are used, for example, parameters provided in a filtering table 7' as shown in FIG. 11 are employed. In the second stage in a row direction of the filtering table 7', contents to be processed when an average use frequency 71 of the queue (queuing control section 22-2) for the transfer packet in the node is selected as a check item, are shown. In the filtering table 7', if a value for the check item fits into a category that "a value of a check item exceeds a maximum threshold value" (72), all transfer packets are abandoned (71a). Similarly, if the value for the check item fits into a category that "the value of the check item is equal to a maximum threshold value" (73), transfer packets are abandoned at a designated frequency (71b). At this point, as the transfer packet to be abandoned, preferably, a packet to which a protocol having a re-transmitting function such as the TCP packet is selected. As the designated frequency, a maximum value out of Mark Probability Denominator values for the average use frequency of the queuing control unit 22-2 may be used. Also, if the value for the check item fits into a category that "the value of the check item is a minimum threshold value or more and a maximum threshold value or less" (74), transfer packets are abandoned depending on the average frequency of the queuing used as the value for the check item (71*c*). At this point, as the transfer packet to be abandoned, preferably, a packet to which a protocol having a re-transmitting function such as the TCP packet is selected, as in the above case. Also, as the designated frequency, a maximum threshold value out of Mark Probability Denominator values may be used. If the value for the check item fits into a category that "the value of the check item is a minimum threshold value or less (75), no transfer packets are abandoned (71*d*).

In the third stage in a row direction in the filtering table 7', contents to be processed when a first option (76) is added to the above check item 71 in which considerations are given to precedence of the transfer packet, are shown.

Now, if the value for the check item fits into a category that "the value of the check item exceeds a maximum threshold value (72)", all transfer packets are abandoned starting from the packet having lower precedence in the TOS (76*a*). Moreover, if the value for the check item fits into a category that "the value of the check item is equal to a maximum threshold value" (73), transfer packets are abandoned starting from the packet having a lower precedence at a designated frequency (76*b*). If the value for the check item fits into a category that "the value of the check item is a minimum threshold value or more and a maximum threshold value or less" (74), transfer packets are abandoned starting with the packet having a lower precedence, depending on the average frequency of the queuing used as the value for the check item (76*c*). If the value for the check item fits into a category that "the value of the check item is a minimum threshold value or less (75), no transfer packets are abandoned (76*d*).

As further conditions of the check items, in the fourth and fifth stage of the filtering table 7', second and third options are provided. As the second option, an average frequency (77) of the queuing control section 22-4 of the predetermined transfer packet P in the node is employed as the check item. As the third option, contents provided in the second option+the precedence of the predetermined transfer packet P are employed as the check item. These above conditions are applied when processing to provide conditions being severer than each of the conditions for the check items 71 and 76 is required.

For example, even if the value of the check item (average use frequency of queuing of the transfer packet) for the transfer packet in the node is the minimum threshold value or less (71*d* or 76*d*), when the average use frequency being the value of the check item of the predetermined transfer packet P exceeds the maximum threshold value (72) and if the second option is designated, all the transfer packets are abandoned (77*a*). Moreover, if the third option 78 is designated, all the predetermined packets P are abandoned starting with packets having a lower precedence are abandoned (78*a*).

When the second option 77 is designated and the value of the check item for the predetermined packet P is equal to the maximum threshold value (73), the predetermined transfer packet P is abandoned at a designated frequency (77*b*). If the third option 78, instead of the second option 77, is designated, the predetermined transfer packet P is abandoned starting with packets having a lower precedence at a designated frequency (78*b*). The predetermined transfer packet P, as in the case described before, is preferably a packet to be processed by a protocol having a re-transmitting function such as the TCP.

When the second option 77 is designated and if the value of the check item is a minimum threshold value or more and a maximum threshold value or less (74), the predetermined transfer packet P is abandoned depending on the check item (77*c*). When the second option is designated and if the value of the check item is a minimum threshold value or less, no predetermined transfer packet P is abandoned (77*d*). When the second option is designated and if the value of the check item is equal to the maximum threshold value, the predetermined transfer packet P is abandoned starting with the packet having a lower precedence with a designated frequency (78*b*). When the third option 78 instead of the second option 77 and if the value of the check item is a minimum threshold value or more and a maximum threshold value or less, the predetermined transfer packet P is abandoned starting with the packet having a lower precedence and depending on the value of the check item (78*c*). When the second option is designated and if the value of the check item is a minimum threshold value or less, no predetermined transfer packet P is abandoned (78*d*).

Moreover, as the parameters for the filtering, values shown in a filtering table 8 in FIG. 12 may be used.

In the second stage in a row direction of the filtering table 8, contents to be processed when an average transmission rate of the transfer packet at the node is designated as a check item, are shown. Contents of processing 81*a* to 81*d* to be performed for each of the check items (in cases in which the value of the check item exceeds a maximum threshold value (82), the value of the check item is equal to the maximum threshold value (83), the value of the check item is the minimum threshold value or more and the maximum threshold value or less (84) and the value of the check item is the minimum threshold value or less (85)) are the same as contents of processing explained in the filtering table 7' in FIG. 11.

In the third stage in the row direction of the filtering table 8, contents to be processed when considerations are given to a precedence of the transfer packet are shown. Contents of processing 86*a* to 86*d* to be performed for each of the check items are the same as contents of the processing 76*a* to 76*b* explained in the filtering table 7' in FIG. 11.

In the fourth and fifth stages in the row direction of the filtering table 8, contents of processing to be performed when the fifth option 87 (average transmission rate of the traffic of the predetermined transfer packet at the node) is designated as the check item and when the sixth option 88 (the fifth option+precedence of the predetermined transfer packet P) is designated as the check item are shown. These above conditions are applied when processing to provide conditions to the predetermined transfer packet P being severer than each of the conditions for the check items 81 and 86 is required.

For example, when the average transmission rate in traffics of the transfer packet at the node is designated as the check item, if the value of the check item exceeds the maximum threshold value (82) or is equal to the maximum threshold value (83) or is the minimum threshold value or more or the maximum threshold value or less (84), or is the minimum threshold value (85), the processing 81*a*, 81*b*, 81*c* and 81*d* may be performed in the same manner as the contents of the processing 77*a* to 77*d* in the filtering table 7'.

Contents of the processing to be performed when the fourth option 86 is designated are the same as those to be performed when the check item 81 is designated.

Most of the processing programs required for the processing by the filtering executing section 23-3*e* may be incorporated, in advance, in the filtering packet MP1-2. At this point, the filtering executing section 23-3e may be configured so as to provide an environment in which the processing program can be executed.

The resident active packet sending section 23-4 transmits the resident active packet group MP1 fed from the resident active packet executing section 23-3 to the same route (link) as that through which the predetermined transfer packet P corresponding to the packet group MP1 passes.

If there is a plurality of routes (links) that has sent out a series of the transfer packets, copies of the resident active packet group MP1 are made to send out them to each of the routes. The resident active packet sending section 23-4 in the edge node 2-4 on the guiding-out side sends out the resident active packet group MP1 to the network management unit 4.

Moreover, the resident active packet sending section 23-4, when having received the tracing processing packet MP1-1 and filtering packet MP1-2 of the resident active packet group MP1, if the received packets are made up of a plurality of packets, combines these two or more packets so as to be a single packet for processing, however, may be allowed to divide the single packet into a plurality of packets and to send the divided packets out.

The circulating active packet executing section 23-5 in each node, when having received the driving program of the driving packet MP2-1, generates a driving signal and feeds this signal to the filtering executing section 23-3e. This causes filtering programs being resident in the filtering executing section 23-3e contained in the filtering packet MP1-2 to be run.

The circulating active packet executing section 23-5, when having received the driving packet MP2-1, inserts the information about a path to be stored in the second storing section 23-3b for the tracing processing packet MP1-1 being resident in the tracing processing executing section 23-3a into data for tracing processing contained in the driving packet MP2-1.

Moreover, the circulating packet executing section 23-5, when having received the information collecting packet MP2-2, inserts the filtering information being stored in the third storing section 23-3f related to the filtering program contained in the resident filtering packet MP1-2 into the data for filtering contained in the information collecting packet MP2-2.

Most of the processing programs required for being executed in the circulating active packet executing section 23-5 may be stored in the circulating active packet group MP2 and the circulating active packet executing section 23-5 may be configured so as to provide an environment in which the processing program can be executed.

The circulating active packet sending section 23-6 sends out each of the driving packet MP2-1 and information collecting packet MP2-2 in which programs, parameters, data or a like are stored to the route (link) from which the resident active packet group MP1 has been sent out. At this time, the circulating active packet sending section 23-6 refers to the tracing processing data contained in the driving packet MP2-1 and information collecting packet MP2-2. The circulating active packet sending section 23-6 in the edge node on the guiding-out side sends out each of the packets MP2-1 and MP2-2 in the circulating active packet group MP2 to the network management unit 4. When there is a plurality of routes (links) from which the resident active packet group MP1 is sent out, the circulating active packet MP2 is also copied so as to send out it to each of the routes.

Moreover, the circulating active packet sending section 23-6, if each of the driving packet MP2-1 and information collecting packet MP2-2 is combined so as to be a single packet, may divide the single packet into a plurality of packets and then may send the divided packets out to the network management unit 4.

In the above description, the network management unit 4 is adapted to put together a plurality of the circulating active packet groups MP2, however, the circulating active packet processing section 23-4 in the edge node 2-4 on the guiding-out side of the transfer packet P may put together the plurality of the circulating active packet groups MP2.

(H-2) Operations of Eighth Embodiment

Operations of the filtering of the network management system 1 according to the eighth embodiment of the present invention.

The network management unit 4, when the predetermined transfer packet P to be traced is designated, the transfer packet or predetermined transfer packet P on which filtering is performed is designated and an instruction for the filtering is provided, the resident active packet group MP1 containing the tracing processing packet MP1-1 and filtering packet MP1-2 is formed and is transmitted to the edge node 2-1 on the introduction side.

The introduction-side edge node 2-1 has the second storing section 23-3 in the tracing processing executing section 23-3a store the tracing processing program saved in the tracing processing packet MP1-1 fed from the network management unit 4 and has the tracing processing executing section 23-3a run the program and waits for the predetermined transfer packet P to come. Moreover, the introduction-side edge node 2-1 has the third storing section 23-3f in the filtering executing section 23-3e store the filtering program being stored in the filtering packet MP1-2 fed from the network management unit 4 and waits for the filtering program to be executed.

The tracing processing executing section 23-3a, when the predetermined transfer packet P has arrived, inserts the information about the path into the tracing processing data in the tracing processing packet MP1-1 being stored in the second storing section 23-3b and sends the copy of the resident active packet group MP1 to the path for the transfer packet P (for example, destination being the link 3-1 or 3-2) through the resident active packet sending section 23-4. Other second nodes 2-2 to the fourth node 2-4 perform the same tracing processing on the predetermined packet P as described above. Moreover, the copying and outputting of the resident active packet group MP1 are not made on the predetermined transfer packet that has passed through the same route (link) but to the predetermined transfer packet P that has passed through the new path.

The network management unit 4, then, transmits the driving packet MP2-1 to the edge node 2-1 on the introduction side. The circulating active packet executing section 23-5 in each of the nodes has the fourth storing section 23-5a store the driving packet MP2-1 fed from the network management unit 4 and executes the driving program of the packet.

Each of the nodes inserts the information about the path to be stored in the second storing section 23-3b in the tracing processing executing section 23-3a set for the tracing processing packet MP1-1 into the tracing processing parameter of the driving packet MP2-1. When the driving packet MP2-1 is sent out to the same route (link) as the resident active packet group MP1 was sent out, the driving program ends and, at this point, all the information except the information notifying the passage of the driving packet MP2-1 is erased.

The network management unit 4 recognizes the completion of the setting for filtering at each node by receipt of the driving packet MP2-1 from the edge node 2-4 on the guiding-out side.

The network management unit 4, then, sends out the information collecting packet MP2-2 to the edge node 2-1 on the introduction side. Each of the nodes has the fourth storing section 23-5a in the circulating active packet executing section 23-5 store the information collecting packet MP2-2 fed from the network management unit 4 and executes the information collecting program.

Each of the nodes inserts the information about results from the filtering for the filtering packet MP1-2 to be stored in the third storing section 23-3f in the filtering executing section 23-3e into information collecting data being contained in the information collecting packet MP2-2 being stored in the fourth storing section 23-5a. Moreover, each of the nodes inserts the information about setting for the path being stored in the second storing section 23-3b in the tracing processing executing section 23-3a for the tracing processing packet MP1-1 into the tracing processing data of the information collecting packet MP2-2. At the same time when the information about results from the filtering and the information collecting packet MP2-2 inserted into the path information are sent out to the same route (link) as the resident active packet group MP1 was sent out, the information collecting program ends. In the fourth storing section 23-5a, all the information except the information notifying the passage of the driving packet MP2-1, is erased.

The network management unit 4 has the circulating active packet receiving and analyzing section 47 analyze the information about results from the filtering of the transfer packet or the predetermined packet P being stored in the information collecting data contained in the information collecting packet MP2-2 fed from the edge node 2-4 on the guiding-out side.

If the information about the result does not satisfy predetermined conditions, by using the resident active packet group MP1 having a newly changed parameter, an instruction (S7) for performing each processing of the management packet driving section 41 to the circulating active packet receiving and analyzing section 47 is produced.

(H-3) Effects of Eighth Embodiment

According to the eighth embodiment, the network management unit 4 can collect the information about results from filtering of the transfer packet or predetermined transfer packet P, without a need for transmission or receipt of the information to and from all nodes or many nodes, by transmission or receipt of the information to and from both the edges 2-1 and 2-4. As a result, the load of processing to be performed by the network management unit 4 can be reduced.

When the filtering is executed and information about results from the filtering is collected, since only the node through which the predetermined transfer packet P has passed performs operations required for the filtering operation, the load of processing to be performed by the node can be reduced more, on average, when compared with the conventional case.

(E-4) Modified Embodiment of Eighth Embodiment

Where a destination of the predetermined transfer packet P is not changed dynamically and when the execution of the filtering is possible in the filtering section 22-4, all that the filtering packet executing section 23-3e has to do is to set the table required for filtering at the filtering section 22-4. In this case, it is not necessary for the tracing processing executing section 23-3a to cause the tracing processing packet MP1-1 to be resident and not necessary for the filtering packet executing section 23-3e to cause the filtering packet MP1-2 to be resident.

In the description of the embodiment, no mention is made of a method of erasing the resident active packet group MP1 containing the tracing processing packet MP1-1 and filtering packet MP1-2, however, the method of erasing the tracing packet MP1 already employed in the first embodiment may be used.

Also, in the above embodiment, the method for executing the filtering and for obtaining the information about results by using the two kinds of the management packet group including the resident active packet group MP1 and circulating active packet group MP2 is provided, however, a method by using only the resident active packet group MP1 may be employed.

(I) Ninth Embodiment

Next, a network management system of the ninth embodiment of the present invention will be described by referring to the drawing.

Configurations of the network management system of the ninth embodiment of the present invention can be explained by referring to FIG. 4 which is used in the second and fifth embodiments. Therefore, same parts and reference numbers assigned to the corresponding parts as employed in the second and fifth embodiment can be used.

In the network management system 1A of the ninth embodiment, as in the case of the fifth embodiment, instead of the network management unit 4, a user terminal 6 or a server 6 being a sender of a transfer packet P serves as the sender of the resident active packet group MP1 and circulating active packet group MP2.

In the ninth embodiment, the first node 2-1 to the fourth node 2-4 perform filtering processing, instead of the QoS control in the fifth embodiment.

According to the ninth embodiment, as in the case of the eighth embodiment, when the filtering is executed and information about results from the filtering is collected, since only the node through which the predetermined transfer packet P has passed performs operations required for the filtering operation, the load of processing to be performed by the node can be reduced, on average, when compared with the conventional case.

Moreover, since the user terminal 6 or the server 6 serves as the sender of the resident active packet or the circulating active packet, the user or the server can obtain the path information on demand.

Technological thought provided as the modified embodiment of the eighth embodiment can be also applied to the ninth embodiment.

(J) Tenth Embodiment

Next, a network management system of the tenth embodiment of the present invention will be described by referring to a drawing.

Configurations of the network management system of the tenth embodiment of the present invention can be explained by referring to FIG. 5 which is used in the third and sixth embodiments. Therefore, same parts and reference numbers assigned to the corresponding parts as employed in the third and sixth embodiment can be used.

The network management system 1B of the tenth embodiment, as in the case of the eighth embodiment, the network management unit 4 serves as a sender of a resident active packet group MP1 and circulating active packet group MP2 and executes filtering and collects information about results. An instruction for execution of the filtering and for collection of information about results, as in the case of the sixth embodiment, is provided from the user terminal 6 and the server 6 to the network management unit 4 through an eighth link 5-3 and, moreover, the network management unit 4 provides the obtained information through the eighth link 5-3 to the user terminal 6 or the server 6.

Operations of the first node 2-1 to fourth node 2-4 are the same as those in each of the nodes in the eighth embodiment.

According to the tenth embodiment, the same effects as achieved in the eighth embodiment can be obtained. The user can have merits in that the user can perform the filtering of the transfer packet or predetermined transfer packet P, on demand, without the need to create the tracing processing packet group MP1 or information collecting packet group MP2 and can collect information about results from the filtering.

Technological thought provided as the modified embodiment of the eighth embodiment can be applied to the tenth embodiment.

(K) Eleventh Embodiment

A network management system of the eleventh embodiment of the present invention will be described by referring to a drawing.

Configurations of the network management system of the tenth embodiment of the present invention can be explained by referring to FIG. 9 which is used in the seventh embodiments. Therefore, same parts and reference numbers assigned to the corresponding parts as employed in the seventh embodiment can be used.

In the network management system 1C of the eleventh embodiment, as in the case of the eighth embodiment, two systems are connected to each other. In the eleventh embodiment, each of the nodes of this embodiment performs filtering processing, instead of the QoS control in the seventh embodiment.

Technological thought provided as the modified embodiment of the eighth embodiment can be applied to the eleventh embodiment.

According to the eleventh embodiment, even on a network in which a plurality of network management units exists, each of the network management units can perform the filtering and collect the information about results from filtering of the transfer packet or predetermined transfer packet P, without the need for the transmission or receipt of the information to and from all nodes or many nodes, by transmission or receipt of the information between the two network management units. As a result, loads of processing to be performed by the network management units can be reduced.

When the filtering of the transfer packet or predetermined transfer packet P is executed and information about results from the filtering is collected, since only the node through which the predetermined transfer packet P has passed performs operations required for the filtering operation, the load of processing to be performed by the node can be reduced, on average, when compared with the conventional case.

(L) Twelfth Embodiment

A network management system of the twelfth embodiment of the present invention will be described by referring to a drawing.

The network management system 1' of the twelfth embodiment manages operations of Service Level Agreement (SLA) of a packet that passes through a network N. Generally, the SLA is an agreement between a service provider and a service receiver, for example, in the communication network, the agreement between a communication carrier and a communication user. The agreement contains an agreement content, for example, that, "every time when communications for a user stop dead due to a failure of a node, ten thousand yen of a charge for using are returned back to the user" or "every time when specified communication quality cannot be maintained for one minute, ten thousand yen of the charge for using are returned back to the user". The SLA management represents that a quality of data on the communication collected by a management device that manages a network is compared with a quality agreed in the SLA and if there is breach of contract, a cash is returned, as appropriate, back to the user.

(L-1) Configurations of Twelfth Embodiment

FIG. 13 is a schematic block diagram showing configurations of a network management system 1' according to a twelfth embodiment of the present invention. The network management system 1', as in the case of the network management system 1, is applied to a connectionless network.

In the network management system 1', an SLA management unit 8 is connected through a signal line 7-1 to the network management unit 4 of the network management system 1. The SLA management unit 8 performs the management of the SLA and processing of information about returns (for example, an amount of cash to be returned, points to be given instead of the return, or a like).

The network management unit 4 performs the management of the SLA on the network N in accordance with an instruction provided by an input/output device (not shown) which is operated by an operator via the SLA management unit 8. As the network management unit 4, for example, the well-known EMS may be employed, as in the case of the first embodiment.

The network management unit 4, in accordance with an instruction from the SLA management unit 8, in order to perform the SLA management in each node on the path through which a series of the transfer packet P passes, the resident active packet group MP1 used as a first management packet group described later and circulating active packet group MP2 used as a second management packet group MP2.

The resident active packet group MP1 employed in the twelfth embodiment has two kinds of packets; one being such the tracing processing packet MP1-1 as used in the eighth embodiment and another being an SLA management packet MP1-2 used to perform the SLA management of a series of the transfer packets P to be managed instead of the filtering packet MP1-2 in the eighth embodiment.

The SLA management packet MP1-2 contained in the resident active packet group MP1 saves an SLA management program, SLA management parameters, SLA management data or a like. The SLA management program manages a transfer state of the transfer packet P. Each node having received the SLA management packet MP1-2 performs the SLA management in accordance with the SLA management parameter for the transfer packet to be managed. The information about results from the SLA management is inserted into the SLA management data. The SLA management parameter may be made of, for example, packet specific information specifying contents of the series of the transfer packets P, band for the transfer packet, and amount of transmitted transfer packets or a like. If there is room in each node to perform additional processing, information about the return is produced which is to be provided per unit time of fluctuations caused by the delay of the transfer packet corresponding to the packet specific information or per unit time of delay time in the transfer packet corresponding to the packet specific information.

Moreover, the circulating active packet group MP2 of the embodiment contains information collecting packet MP2-2 described above in the eighth embodiment, information collecting packet MP2-1' which performs the same function as the packet MP2-2, and congestion avoiding packet MP2-2' described later.

The information collecting program stored in the information collecting packet MP2-1' collects information about results from the SLA management obtained directly or indirectly from the resident active packet group MP1 being resident in a node designated by the information collecting parameter and inserts the collected information into the information collecting data. Moreover, information about time when the information collecting packet MP2-1' has been sent from each of the nodes and about time when the packet MP2-1' has been received by each node are inserted into the information collecting data.

If there is room for each node to perform processing, the delay fluctuation time corresponding to the packet specific information and the delay time corresponding to the packet specific information are calculated by using the information collecting program. Furthermore, the information about the return to be provided for the calculated delay fluctuation time and the information about the return to be provided for the calculated delay time are produced. The information about the return is inserted into the information collecting data, by using the information collecting program.

On the other hand, the congestion avoiding packet MP2-2' contains a congestion avoiding program, congestion avoiding parameters, congestion avoiding data, tracing processing data, or a like. The congestion avoiding program, in order to reduce the congestion in the transfer path at a time of transferring the transfer packet P, produces an instruction to increase a queuing value in the queuing control section in accordance with the congestion avoiding parameter. The produced instruction is inserted into the congestion avoiding data. The congestion avoiding parameter is selected, as appropriate, depending on the congestion states in each node, amounts of traffics, error rates, or a like. Into the congestion avoiding data are inserted information about the time when the congestion avoiding packet MP2-2' has been sent out from the network management unit 4, about the time when the packet MP2-2' has been received by the network management unit 4, and about the time when the packet MP2-2' has been sent out from each node, and about the time when the packet MP2-2' has been received by each node.

Figure 14:
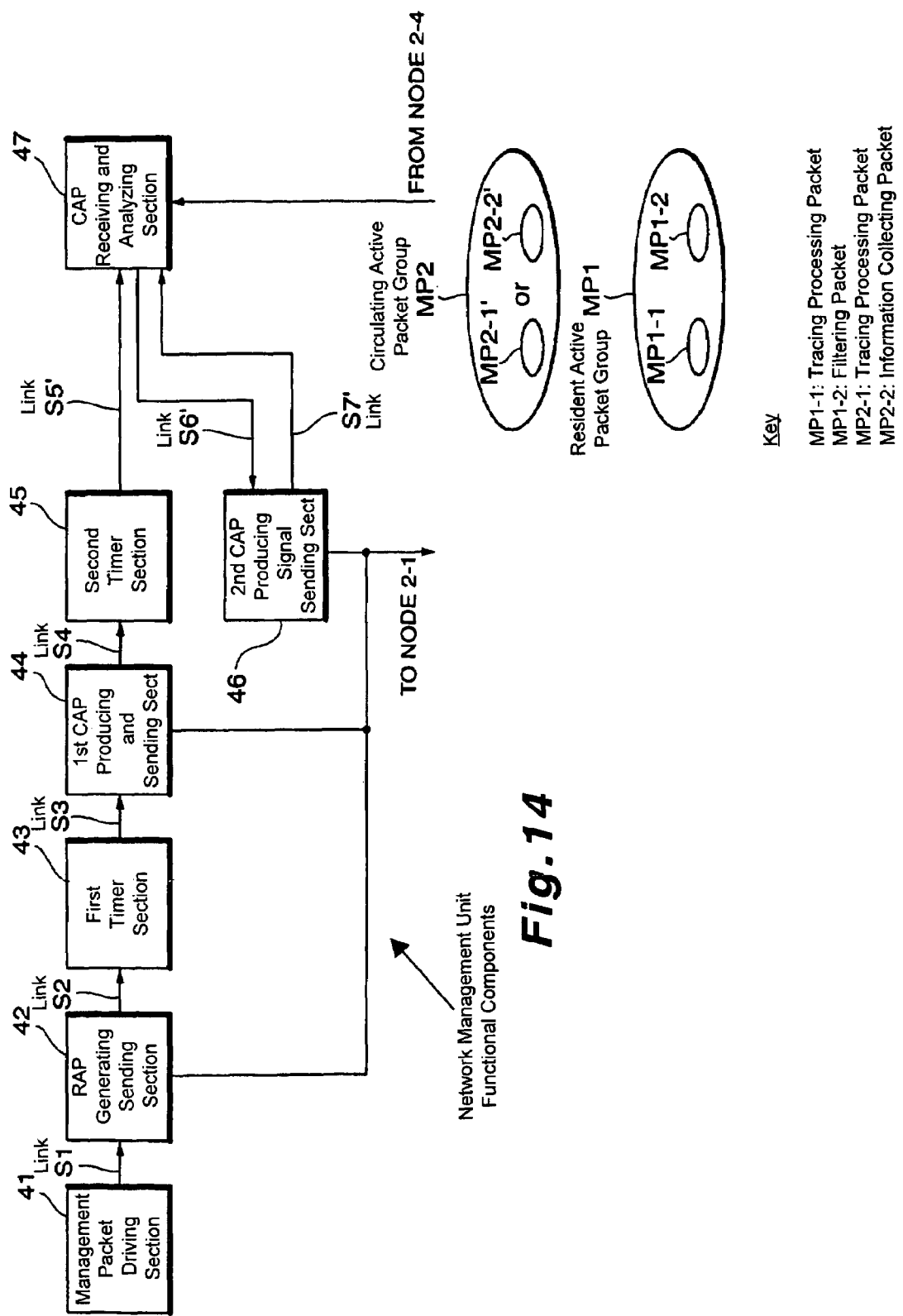
FIG. 14 is a schematic block diagram showing configurations of a network management unit according to a twelfth embodiment of the present invention.

The network management unit 4 has functional components as shown in FIG. 14. In FIG. 14, the network management unit 4 includes a management packet driving section 41, resident active packet generating sending section 42, first timer section 43, first circulating active packet producing and sending section 44, second timer section 45, second circulating active packet generating and sending section 46, and circulating active packet receiving and analyzing section 47. Each of the management packet driving section 41 to the second circulating active packet receiving and analyzing section 47 is operated to function, in parallel, to perform the SLA management for every kind of the transfer packet.

The management packet driving section 41, through the SLA management unit 8, performs the setting for processing for the SLA management and driving processing of the transfer packet to be managed, in accordance with an instruction fed from an input and output device manipulated by an operator. To specify the transfer packet P, the packet specific information can be used.

The management packet driving section 41 may perform the setting for processing for the SLA management and driving processing in response to a notification of, for example, a first transfer packet P out of a series of the transfer packets P fed from the edge node 2-1 on the introduction side.

The management packet driving section 41 sends a completion signal S1 notifying completion of the processing described above to the resident active packet producing and sending section 42.

The resident active packet producing and sending section 42, after having received the completion signal S1 from the management packet driving section 41, forms the resident active packet group MP1 containing the tracing processing packet MP1-1 and SLA management packet MP1-2 and transmits these to the edge node 2-1 on the introduction side. The resident active packet producing and sending section 42 sends out another completion signal S2 notifying the completion of the processing described above to the first timer section 43.

The first timer section 43, when having received the completion signal S2 fed from the resident active packet producing and sending section 42, measures delay fluctuation time in the passage of the transfer packet P on which the SLA management is performed in the first node 2-1, to the fourth node 2-4, delay time in the passage of the transfer packet P and generates information about the return using the delay time as the parameter and, when the measurement is completed, notifies the first circulating active packet generating and sending section 43 of these results. The first timer section 43 starts measurements of the fixed time from a point when the resident active packet producing and sending section 42 has sent the resident active packet group MP1. Moreover, the fixed time can be set by an operator using an input and output device (not shown) via the SLA management unit 8. The processing of the measurements of the time can be performed according to the setting provided by the operator. Moreover, in the first timer section 43, the timing when the first circulating active packet producing and transmitting section 44 sends out the information collecting packet MP2-1' described later can be also set by the operator via the SLA management unit 8. The first timer section 43 transmits a completion signal S3 notifying the completion of processing to be performed by the first timer 43 to the first circulating active packet producing and sending section 44.

The first circulating active packet producing and transmitting section 44, when having received the completion signal S3 fed from the first timer section 43, forms the information collecting packet MP2-1' used to collect results from the SLA management of a series of transfer packets P and sends out it to the edge node 2-1 on the introduction side. The first circulating active packet producing and transmitting section 44 transmits a completion signal S4 notifying the completion of the processing described above to the second timer section 45.

The second timer section 45, when having received the completion signal S4 fed from the first circulating packet producing and transmitting section 44, makes measurements of delay fluctuation time in the passage of the transfer packet P in the first node 2-1 to the fourth node 2-4, delay time in the passage of the transfer packet P, time required for collecting information about the return to compensate for the delay fluctuation time in the passage of the transfer packet P, and period required for collecting information about the return to compensate for the delay time in the passage of the transfer packet P and, when the measurements are completed, notifies the circulating active packet receiving and analyzing section 47 of these results. The second timer section 45 starts the measurement of the fixed time from a time point, for example, when the first circulating active packet producing and transmitting section 44 has sent the information collecting packet MP2-1'. Moreover, the fixed time may be also set by the operator using the input and output device (not shown) via the SLA management unit 8 and the processing of the above measurement may be performed according to this setting. Also, in the second timer section 45, the notification to the circulating active packet receiving and analyzing section 47 may be made according to an instruction fed from the operator via the SLA management unit 8. The second timer section 45 transmits a completion signal S5' notifying the completion of the above processing to the circulating active packet receiving and analyzing section 47.

The circulating active packet receiving and analyzing section 47, when having received the completion signal S5' from the second timer section 45, starts an analysis on the following. The circulating active packet receiving and analyzing section 47, when having received information collecting packet MP2-1' from the edge node 2-4 on the guiding-out side, analyzes contents of the SLA management of the transfer packet P based on information about results from the SLA management which has been inserted into the information collecting data. The circulating active packet receiving and analyzing section 47 outputs the information about results from the SLA management via the input and output device (not shown).

The information about results from the SLA management includes, for example, the delay fluctuation time in the passage of the packet specific information used to specify contents of the transfer packet P, delay time in the passage of the transfer packet, throughput related to data transfer of the transfer packet to be handled in a layer above the network layer, and the number of errors (probability), and the network management unit 4 obtains information about the return based on the above information. If there is room in each node to perform additional processing, information about the return to compensate for the delay fluctuation time in the passage of the transfer packet P and about the return to compensate for the delay time in the passage of the transfer packet P can be inserted into the information about results from the SLA management and the network management unit 4 can use the information about the return as returning information. Moreover, in some cases, a plurality of the information collecting packets MP2-1' for a series of the transfer packets arrives at the circulating active packet receiving and analyzing section 47 in the network management unit 4. At this time, the circulating active packet receiving and analyzing section 47 analyzes not only the first information collecting packet MP2-1' but also the information about results from the SLA management contained in the information collecting data on other packet MP2-1' which has arrived during a period following a fixed time elapsed after the arrival of the above packet. The obtained information about the analysis is transferred to the SLA management unit 8 through the signal line 7-1 (not shown).

Moreover, the circulating active packet receiving and analyzing section 47, when being unable to receive the information collecting packet MP2-1' fed from the edge node 2-4 on the guiding-out side and unable to analyze the information about results from the SLA management described above even after the fixed time elapsed after the completion signal S5' had been received from the second timer section 45, judges that the network is in a congestion state. The circulating active packet receiving and analyzing section 47 transmits a signal S6' notifying that the network is in the congestion state to the second circulating active packet producing and sending section 46.

The second circulating active packet producing and transmitting section 46, when having received the signal S6' fed from the circulating active packet receiving and analyzing section 47, forms the congestion avoiding packet MP2-2' and sends it to the edge node 2-1 on the introduction side. Also, time of the transmission is written on data on the congestion avoiding packet MP2-2'. At this point, the second circulating active packet producing and transmitting section 46 sends out a completion signal S7' notifying the completion of the processing to be performed by the second circulating active packet producing and transmitting section 46, to the circulating active packet receiving and analyzing section 47.

The circulating active packet receiving and analyzing section 47, when having received the congestion avoiding packet MP2-2' transmitted to the edge node 2-1 on the introduction side from the second circulating active packet producing and transmitting section 46, from the edge node 2-4 via a relay node 2-2 or 2-3, writes the received time on data contained in the congestion avoiding packet MP2-2' and calculates the congestion time. Based on the calculated congestion time, the information about the return is calculated. The information about results from the analysis is transferred to the SLA management unit 8 (not shown).

Figure 15:
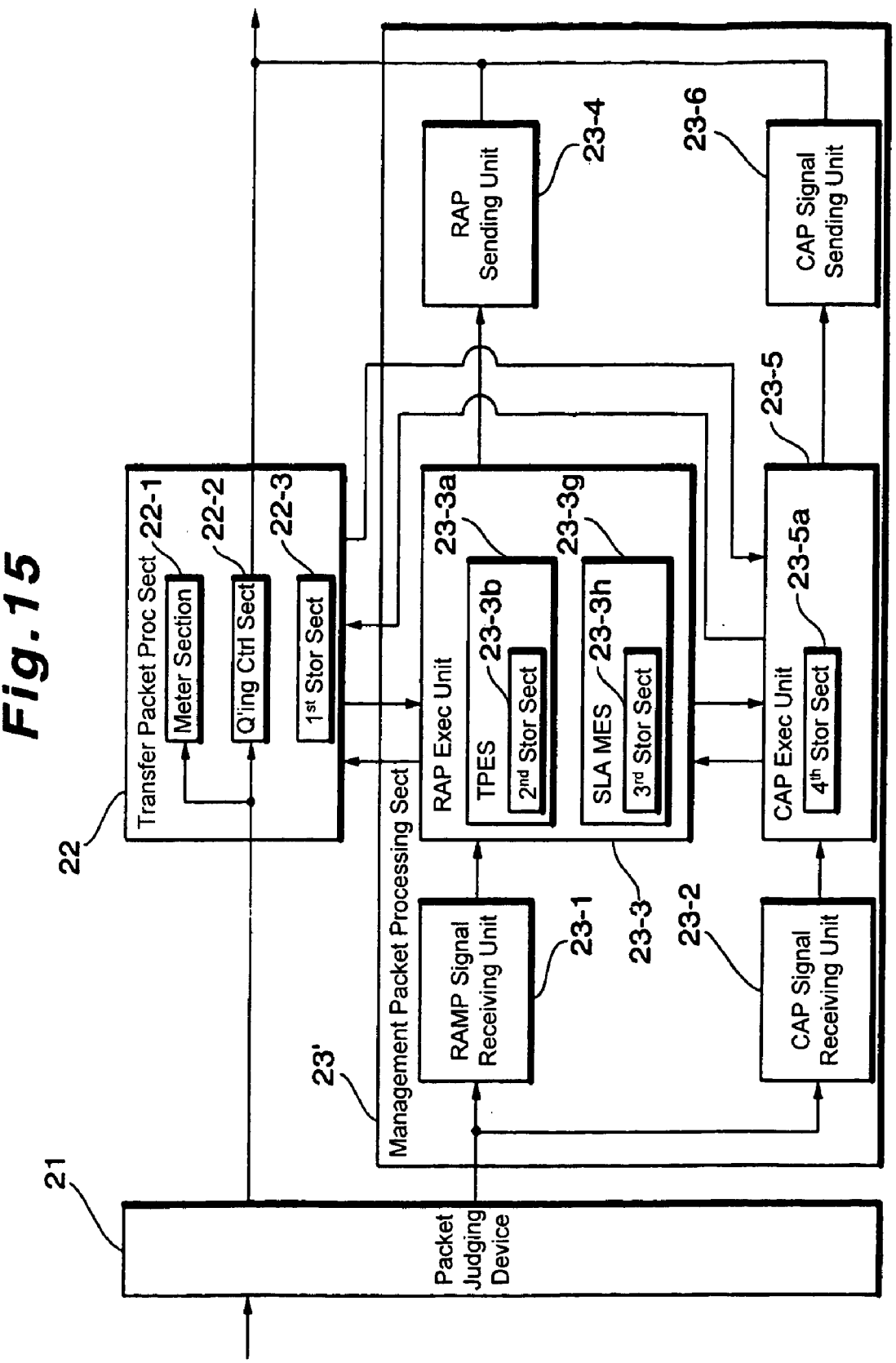
FIG. 15 is a schematic block diagram showing configurations of a node according to the twelfth embodiment of the present invention.

Each of the first node 2-1 to the fourth node 2-4 of the twelfth embodiment has functional components as shown in FIG. 15. Each of the functional components performs, instead of the QoS control processing in the fourth embodiment shown in FIG. 7, the SLA management processing. However, in each of the functional components of the twelfth embodiment, instead of the QoS control executing section 23-3c and the third storing section 23-3d, an SLA management executing section 23-3g and a third storing section 23-3h are mounted. Hereinafter, different points between the twelfth and fourth embodiments are described.

The meter section 22-1 being mounted in the transfer packet processing section 22 of the twelfth embodiment makes measurements of the delay fluctuation time in the passage of the packet, delay time in the passage of the packets or a like occurring when the transfer packet P passes in a path through which the transfer packet P flows in every service level defined by precedence in the predetermined transfer packet P or in the TOS. Results from the measurement are stored in the first storing section 22-3 in the transfer packet processing section 22.

The measurements of the delay fluctuation time and delay time in the passage of packets can be made as follows. For example, a packet between a node from which the packet is transferred and a node to which the packet is transferred can be used. As one of the examples, a packet containing a Packet Internet Groper (Ping) command used to confirm connection among computers on a TCP/IP network is applicable. According to the Ping command, since the time when the request has been transmitted is stored in data in the transmitting message, the time required until a reply to the transmitting message is returned from the unit to which the transfer packet is transferred can be measured and a state of the congestion in the path to be used until the packet reaches the unit to which the transfer packet is transferred. At this point, in order to obtain the delay fluctuation time and delay time, since all that is needed is that time required for the packet to pass through a path is able to be calculated, the measurement time by the Ping command may be one-half. Moreover, if there is a difference in the delay time between a going path and a returning path caused by differences in the traffic amounts, as described above, in order to improve measurement accuracy, by inserting information about receiving time and sending time of packets at each node into the data in the information collecting packet MP2-1', the delay time in the passage of the transfer packet P among nodes using the receiving time in the present node and sending time in the previous node.

The instruction fed from the circulating active packet executing section 23-5 in the management packet processing section 23' to the queuing control section 22-2 of the embodiment contains, for example, values of the queuing selected, as appropriate, by a state of congestion at each node, amount of traffics, error rate or a like. For example, since the packet at a high level of service has to be transferred with first priority, a large value as the queuing value is set to a packet at the high level of service while a small value as the queuing value is set to a packet at a low level of service or that can be re-transmitted.

The resident active packet executing section 23-3 has the third storing section 23-3h save the SLA management program, SLA management parameters, SLA management data or a like being stored in the SLA management packet MP1-2 and causes the SLA management program to be resident at the SLA management executing section 23-3g.

The SLA management executing section 23-3g, for example, in accordance with the SLA management parameter, performs the setting for the SLA management at the meter section 22-1 in the transfer packet processing section 22 and carries out the SLA management. The information about results from the SLA management performed on the transfer packet to be managed is inserted into the SLA management data in the third storing section 23-3h.

Moreover, the SLA management executing section 23-3g acquires the delay in the passage of the transfer packet P in each node, fluctuations caused by the delay in each node, throughput of data transfer to be handled in a layer above the network layer for the transfer packet P, the number of errors (probability) through the first storing section 22-3, based on the SLA management parameter. If the network is of connection oriented communication type, the SLA management executing section 23-3g acquires information about the delay in establishing the network connection and about the delay in releasing the network connection through the first storing section 22-3. If there is room to perform additional processing by the SLA management executing section 23-3g, information about the return to compensate for the fluctuations caused by the delay, delay in the passage of the packet in each node, and other elements are produced. If there is no room to perform additional processing by the SLA management executing section 23-3g, the information described above can be produced by the circulating active packet executing section 23-5 in each node and by the circulating active packet receiving and analyzing section 47 in the network management system 4.

Most of programs required for the SLA management executing section 23-3g to perform the processing described above can be described in advance in the SLA management packet MP1-2 and, in that case, the SLA management executing section 23-3g may be configured so as to provide an environment in which the above processing program can be executed.

The circulating active packet executing section 23-5, in order to improve the accuracy in measurements of the delay time of the transfer packet, stores the time when the management packet processing section 23' has received the packet MP2-1' and the time when the management packet processing section 23' has sent out the packet MP2-1' by using the information collecting program contained in the information collecting packet MP2-1' being stored in the fourth storing section 23-5a. At this point, the circulating active packet executing section 23-5 may use the time when the information collecting program in the information collecting packet MP2-1' has been driven as the time when the management packet processing section 23' has received the packet MP2-1' and the time when the information collecting program has ended as the time when the management packet processing section 23' has sent out the packet MP2-1'. By using the stored time, for example, a difference in time between the time of the receipt of the packet MP2-1' and the time of the transmission of the packet MP2-1' can be used as the delay time in the passage of the transfer packet P among nodes. The obtained delay time is inserted into the SLA management data of the information collecting packet MP2-1.

Moreover, the circulating active packet executing section 23-5, when having received the congestion avoiding program, congestion avoiding parameter, congestion avoiding data or a like being stored in the congestion avoiding packet MP2-2, changes the parameter and processing method in the queuing control section 22-2 in the transfer packet processing section 22. In the case of changes in parameters, the parameter is changed so that many queues are assigned with first priority to the transfer packet that should be escaped from the congestion state. Moreover, the processing method is changed so that, by using such the queuing control method as the WFQ described in the fourth embodiment, and queuing control using the PQ table or using the CQ table, instead of the FIFO method, many queues are assigned with first priority to the transfer packet P.

(L-2) Operations of Twelfth Embodiment

Next, operations of the SLA management of the network management system 1' of the twelfth embodiment will be briefly explained.

The network management unit 4, when the transfer packet P on which the SLA management processing is to be performed has been specified and when an instruction for the SLA management has been provided, forms the resident active packet group MP1 containing the tracing processing packet MP1-1 and SLA management packet MP1-2 and sends them to the edge node 2-1 on the introduction side.

The edge node 2-1 on the introduction side has the second storing section 23-3b in the tracing processing executing section 23-3a store the tracing processing program contained in the tracing processing packet MP1-1 and the tracing processing executing section 23-3a execute the tracing processing program and waits for the arrival of the transfer packet P. Moreover, the edge node 2-1 on the introduction side has the third storing section 23-3h in the SLA management executing section 23-3g store the SLA management program contained in the SLA management packet MP1-2 and the SLA management executing section 23-3g execute the SLA management program and then makes measurements of the delay fluctuation time and the delay time in the passage of the transfer packet. If there is room to perform additional processing, the information about the return based on the results from the measurement is calculated.

The edge node 2-1 on the introduction side, when the transfer packet has arrived, has its tracing processing executing section 23-3a insert the information about a path for the transfer packet into the tracing processing data contained in the second storing section 23-3b and sends out a replica of the resident active packet group MP1 to a route (for example, destination: link 3-1 or 3-2) for the transfer packet through the resident active packet sending section 23-4.

Each of the second node 2-2 to the fourth node 2-4 performs processing of tracing the transfer packet, as in the case of the first node. Moreover, copying and outputting of the resident active packet group MP1 are not performed on the transfer packet P having passed through a same route (link) out of a series of the transfer packets P but are performed on the transfer packet P having passed through a new route.

The network management unit 4 then transmits the information collecting packet MP2-1' to the edge node 2-1 on the introduction side.

In the edge node 2-1 on the introduction side, the information collecting program being stored in the information collecting packet MP2-1' is saved in the fourth storing section 23-5a in the circulating active packet executing section 23-5 in each node and the information collecting program is executed in the circulating active packet executing section 23-5. If high accuracy in the measurement of the delay time is required, as described above, the time when the information collecting packet MP2-1' has been received and the time when the information collecting packet MP2-1' has been sent are inserted into the information collecting data in the fourth storing section 23-5a.

In each of the nodes, the information about results from the SLA management being stored in the third storing section 23-3h in the SLA management executing section 23-3g is inserted into the information collecting data in the fourth storing section 23-5a. Moreover, in each of the nodes, the information about the setting for the path information being stored in the second storing section 23-3b in the tracing processing executing section 23-3a is inserted into the tracing processing data contained in the information collecting packet MP2-1' being stored in the fourth storing section 23-5a. At the same time when the information collecting packet MP2-1' is sent to the same route (link) through which the resident active packet group MP1 has passed, its information collecting program ends and, at this point, all the information except the information about the passage of the information collecting packet MP2-2 is erased from the fourth storing section 23-5a. The edge node 2-4 on the guiding-out side transmits the information collecting packet MP2-1' to the network management unit 4.

In the network management unit 4, the circulating active packet receiving and analyzing section 47 analyzes results from the SLA management on the transfer packet P contained in the information collecting data in the arrived information collecting packet MP2-1'.

Moreover, the network management unit 4, when having judged, due to no supply of the information collecting packet MP2-1', that the circulating active packet receiving and analyzing section 47 is in a state of congestion, performs the followings. The network management unit 4 transmits the congestion avoiding packet MP2-2' to the edge node 2-1 on the introduction side and has the fourth storing section 23-4a in the circulating active packet executing section 23-5 in each of the nodes store the congestion avoiding program being stored in the congestion avoiding packet MP2-2'. The stored congestion avoiding program is executed by the circulating active packet executing section 23-5 in each node. Into the congestion avoiding data in the congestion avoiding packet MP2-2 is inserted information about the time when the congestion avoiding packet MP2-2' is transmitted.

In each of the nodes, the information about the setting for the path information being stored in the second storing section 23-3b in the tracing processing executing section 23-3a is inserted into the tracing processing parameter in the tracing avoiding packet MP2-2'. At the same time when the congestion avoiding packet MP2-2' is sent to the same route (link) through which the resident active packet group MP1 has passed, its congestion avoiding program ends and, at this point, all the information except the information about the passage of the congestion avoiding packet MP2-2' is erased from the fourth storing section 23-5a.

The edge node 2-4 on the guiding-out side transmits the congestion avoiding packet MP2-2' to the network management unit 4. The network management unit 4, by the receipt of the congestion avoiding packet MP2-2', recognizes that the processing of the congestion avoidance of the transfer packet P in each node has completed. Moreover, the network management unit 4, based on the time when the congestion avoiding packet MP2-2' has been received and on the time when the congestion avoiding packet MP2-2' has been inserted into the congestion avoiding data, analyzes the time during which the transfer packet P is in a state of congestion.

The network management unit 4 obtains the information about the return from the analyzed information and transmits the information about the return to the SLA management unit 8 through the signal line 7-1.

(L-3) Effects of Twelfth Embodiment

According to the twelfth embodiment, the network management unit 4 can perform the SLA management of the predetermined transfer packet without the need for the transmission or receipt of the information to and from all nodes or many nodes of the network N, by the transmission or receipt of the information between both the edge nodes. As a result, loads of processing to be performed by the network management unit can be reduced more when compared with the conventional case.

Moreover, when the SLA management is carried out and the information about results is collected, since only the node through which the transfer packet has passed performs operations required for the above SLA management and the collection of the information, the load of processing to be performed by the node can be reduced, on average, when compared with the conventional case.

(L-4) Modified Embodiment of Twelfth Embodiment

If, in the network N, a unit to which the transfer packet P is to be transferred does not change dynamically and the execution of the SLA management by the queuing processing section 22-2 is possible, all that the SLA management packet executing section 23-3g has to do is to set the table required for the SLA management to the queuing processing section 22-2. In this case, it is not necessary for the tracing processing executing section 23-3a to cause the tracing processing packet MP1-1 to be resident and not necessary for the SLA management packet executing section 23-3g to cause the SLA management packet MP1-2 to be resident.

In the description of the twelfth embodiment, no mention is made of a method of erasing the resident active packet group MP1 in each node, however, the method of erasing the tracing packet MP1 already employed in the first embodiment may be used.

Moreover, in the twelfth embodiment, to carry out the SLA management and to obtain results from the SLA management, the two kinds of management packet groups including the resident active packet group MP1 and circulating active packet group MP2 are used, however, instead of these, only the resident active packet group MP1 may be employed.

For example, in the resident active packet group MP1 is stored information about all paths leading to the node to be handled. This enables the network management unit 4 to obtain information about all the paths on the transfer route from the resident active packet group MP1 fed from the edge node 2-4 on the guiding-out side.

In the twelfth embodiment, the system is shown in which the SLA management is carried out by tracing the transfer route of the transfer packet, however, if the transfer packet P passes through the path set in advance, information about the path set in advance may be stored in data on the tracing processing of the resident active packet group and circulating active packet group.

In the twelfth embodiment, to synchronize the processing to be performed by the SLA management unit 8, network management unit 4, and each node, the time produced by a Network Time Protocol (NTP) being one of protocols in networks or by a Global Positioning System (GPS) can be used or the time produced by using an outside signal such as a clock signal being phase-synchronized with a frame synchronization bit which is fed to a synchronous User Network Interface (UNI) such as an Integrated Services Digital Network (ISDN) can be employed.

Also, in the twelfth embodiment, the SLA management unit 8 and the network management unit 4 are used separately, however, they can be used as a single management unit by combining the two.

In the twelfth embodiment, the network management unit 4 transmits the information about the return to the SLA management unit 8, however, alternatively, an amount to be returned may be calculated by transmitting the circulating active packet group MP2 having passed through each node from the network management unit 4 to the SLA management unit 8 and by using the information obtained by the SLA management unit 8 from the circulating active packet group MP2.

In the twelfth embodiment, the circulating active packet executing section 23-5 in each of the nodes uses the time when the information collecting program in the information collecting packet MP2-1' has been run as the receiving time and the time when this program has ended as the sending time, however, alternatively, the time when the circulating active packet receiving section 23-2 has received the information collecting packet MP2-1' may be used as the receiving time, while the time when the circulating active packet sending section 23-6 has transmitted the information collecting packet MP2-1' may be used as the sending time.

(M) Thirteenth Embodiment

Figure 16:
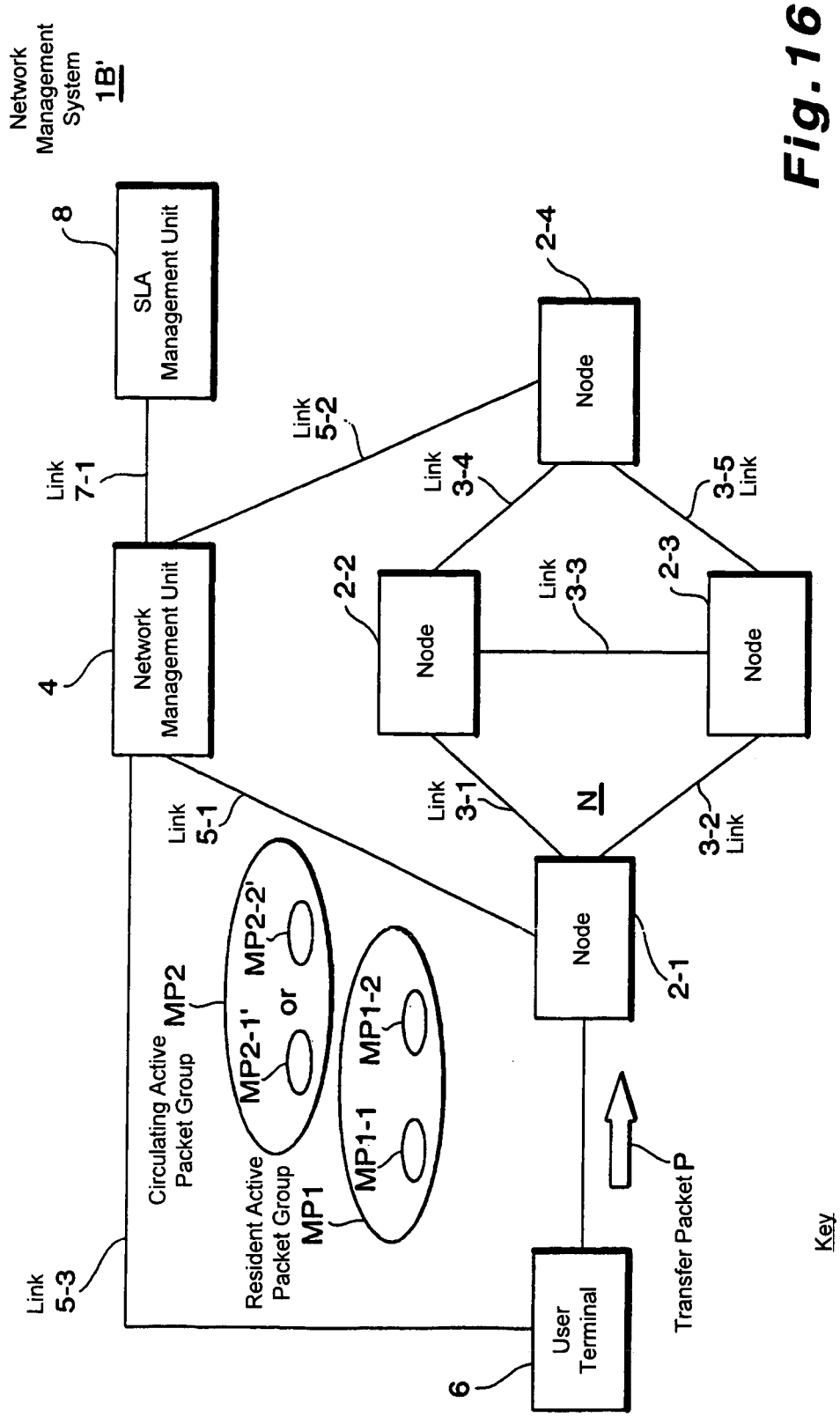
FIG. 16 is a schematic block diagram showing configurations of a network management system according to a thirteenth embodiment of the present invention.

A network management system of the thirteenth embodiment of the present invention will be explained by referring to a drawing. FIG. 16 is a schematic block diagram showing configurations of a network management system according to a thirteenth embodiment of the present invention. In FIG. 16, same reference numbers are assigned to corresponding parts having the same functions as those in FIG. 15.

In the network management system 1B' of the thirteenth embodiment, as in the case of the network management system 1' of the twelfth embodiment, a network management unit 4 serves as a sender of a resident active packet MP1 and circulating active packet MP2 and, in accordance with an instruction from an SLA management unit 8, executes the SLA management and collects results from the SLA management. However, the SLA management unit 8 in the network management system 1B' issues an instruction to the network management unit 4 in accordance with an instruction from a user terminal or a server 6 being connected to an edge node 2-1 on the introduction side. That is, the instruction from the user terminal 6 or the server 6 is sent through an eighth link 5-3, network management unit 4 and signal line 7-1 to the SLA management unit 8. Then, information about results obtained by the network management unit 4 is fed from the SLA management unit 8 to the user terminal 6 or the server 6.

Operations of a first node 2-1 to a second node 2-4 in the thirteenth embodiment are the same as those in each node in the twelfth embodiment.

According to the thirteenth embodiment, same effects obtained in the twelfth embodiment can be obtained. Moreover, the user terminal or server 6 has a merit in that it can perform the SLA management on the transfer packet P and collects information about results from the SLA management on demand.

Furthermore, technological thought provided as the modified embodiment of the twelfth embodiment can be also applied to the thirteenth embodiment.

(N) Fourteenth Embodiment

A network management system of the fourteenth embodiment of the present invention will be explained by referring to a drawing.

FIG. 17 is a schematic block diagram showing configurations of a network management system according to a fourteenth embodiment of the present invention. In FIG. 17, same reference numbers are assigned to corresponding parts having the same functions as those in FIG. 15.

In the network management system 1C' of the fourteenth embodiment, as shown in FIG. 17, two systems are connected to each other, as in the case of the network management system 1'. However, in the network management system 1C', a single SLA management unit 8 is connected.

In the network management system 1C', a network N1 made up of a fifth node 2-5 to eighth node 2-8, and ninth link 3-6 to thirteenth link 3-10, and of a network management unit 4-1 being connected through the network N1, fourteenth link 5-4 and fifteenth link 5-5 are added to the components in the twelfth embodiment.

Fifth node 2-5 to eighth node 2-8 in the network N1 and the network management unit 4-1 can be connected by a ninth link 3-6 to fifteenth link 5-5 in the same manner as in the seventh and eleventh embodiment.

A transfer packet is guided from the edge node 2-1 to the network N and guided out through the edge node 2-4, as in the case of the seventh and eleventh embodiments. Moreover, the guided-out transfer packet P is guided through the link 3-11 from the edge node 2-5 to the network N1 and from the edge node 2-8 to the network N1.

Moreover, the resident active packet group MP1 and circulating active packet group MP2, as in the case of the twelfth embodiment, in accordance with an instruction of the SLA management unit 8, are produced by the network management unit 4 and guided from the edge node 2-1 into the network N and are fed to the network management unit 4 from the edge node 2-4.

Furthermore, the resident active packet group MP1 and circulating active packet group MP2, as in the case of the seventh and eleventh embodiments, are transmitted through the link 5-6 to the network management unit 4-1 of the network N1 when they have returned to the network management unit 4. In the network management unit 4-1, a parameter is produced which changes depending on the network N1. The parameter which changes depending on the network N1 is overwritten on the parameter, in the resident active packet group MP1 and circulating active packet group MP2, which changes depending on the network N.

The resident active packet group MP1 and circulating active packet group MP2 having the parameter which has been renewed so as to match the network N1 are guided from the network management unit 4-1 into the edge node 2-5 in the network N1 and are supplied from the edge node 2-8 to the network management unit 4-1. The resident active packet group MP1 and circulating active packet group MP2, after having been fed to the network management unit 4-1, passes through the link 5-6 and, after having passed through the network management unit 4, are fed to the SLA management unit 8.

By a series of processing described above, in the network management system 1C', the SLA management on the transfer packet is performed and information about results is collected.

Furthermore, technological thought provided as the modified embodiment of the twelfth embodiment can be also applied to the fourteenth embodiment.

Thus, according to the fourteenth embodiment, even on the network on which a plurality of units such the network management units exist, by transmitting and receiving a program between the network management units, without exchange of information among all the nodes or many nodes on the network and by transmitting and receiving information to and from both the edge nodes each corresponding to the network, it is possible to perform the SLA management on the transfer packet P and to collect information about the result from the SLA management. As a result, the load of processing to be performed by each of the network management unit can be reduced more, compared with the conventional case.

Moreover, when the SLA management is carried out and the information about results from the SLA management is collected, since only the node through which the transfer packet has passed performs operations required for the above SLA management and the collection of the information, the load of processing to be performed by the node can be reduced, on average, when compared with the conventional case.

(O) Other Embodiment

In each of the above embodiments, for example, each of the management packets such as the tracing processing packet MP1-1 is provided as a single packet, however, if an amount of the information is large, the packet can be made up of a plurality of packets.

Also, in each of the above embodiments, each of the packets is shown as the packet belonging to the same layer as the transfer packet P belongs, however, packets each belonging to a different layer can be employed. Moreover, if the network permits, equivalents to transfer packets and to each of management packets may be transferred in a format other than the packet.

In each of the above embodiments, information collecting packet is sent out once, however, it may be sent out a plurality of times. For example, the network management unit 4 may send out the information collecting packet at established intervals and may acquire each piece of the management information. In this case, it is preferable that the resident active packet group MP1 is sent by a method which does not change depending on the passage of the information collecting packet.

Furthermore, in each of the above embodiments, the example in which the resident active packet group MP1 is introduced from the network management unit into the network N is provided, however, the network management unit 4, by causing the resident active packet group MP1 to be resident at the edge node 2-1 on the introduction side, may perform only driving of the resident active packet group MP1 including the specific information of the transfer packet P.

It is apparent that the present invention is not limited to the above embodiments but may be changed and modified without departing from the scope and spirit of the invention.

What is claimed is:

1. A network management system comprising: a communication network having a first edge node serving as an entrance unit to said network for a transfer signal passing through said network, a second edge node serving as an exit unit used to send out said transfer signal from said network to an outside and a relay node being mounted between said first edge node and said second edge node and on a transfer route extending from said first node to said second node; a path information acquiring unit being connected to said first edge node and second edge node so as to be communicable with said first and second edge nodes and being used to send out a tracing signal used to trace said transfer signal along said transfer route on which said transfer signal has passed, to said first edge node, and being used to acquire information about a path through which said transfer signal passes; and wherein each of said nodes is made up of a path information holding unit used to hold information about said path through which said transfer signal passes, a tracing signal residing unit used to make said tracing signal be resident when having received said tracing signal and to produce a replica of said tracing signal and a tracing signal transmitting unit used to feed said replica of said tracing signal to said nodes being adjacent to each other on said transfer route and wherein said path information acquiring unit used to acquire said information about said path on said transfer route for said transfer signal extending from said first edge node to said second edge node, from one node out of a plurality of said nodes.

2. The network management system according to claim 1, wherein said path information holding unit is used to insert said path information into said tracing signal being resident in said node having said path information holding unit.

3. The network management system according to claim 1, wherein said path information holding unit holds said path information so as to be associated with said tracing signal which resides in said node having said information holding unit.

4. The network management system according to claim 1, wherein said path information acquiring unit feeds information collecting signal used to collect said path information being held by each of said nodes on said transfer route for said transfer signal, to said first edge node.

5. The network management system according to claim 4, wherein each of said nodes further comprises an information collecting signal processing sending unit used to insert, when having received said information collecting signal, said path information being held by said information collecting signal processing sending unit, into said information collecting signal and used to feed said collecting signal to said nodes being adjacent to each other on said transfer route.

6. The network management system according to claim 1, wherein said path information acquiring unit receives said path information for said transfer route of said transfer signal extending from said first edge node through said relay node to said second edge node, from said second edge node.

7. The network management system according to claim 5, wherein said path information acquiring unit receives said information collecting signal fed from said first edge node through said relay node to said second edge node, from said second edge node.

8. The network management system according to claim 1, wherein said path information held by said path information holding unit contains information about paths leading to said node having said path information holding unit and wherein said path information acquiring unit acquires all path information for said transfer signal by receipt of said tracing signal having said path information from said second edge node.

9. The network management system according to claim 1, wherein said path information acquiring unit is a network management unit and wherein said network management unit feeds said tracing signal to said first edge node.

10. The network management system according to claim 4, wherein said path information acquiring unit is a network management unit and wherein said network management unit feeds said information collecting signal to said first edge node.

11. The network management system according to claim 1, wherein a user terminal serving as a sender of said transfer signal is connected to said first edge node and wherein said network management unit acquires said path information in accordance with an instruction fed from said user terminal.

12. The network management system according to claim 1, wherein said path information acquiring unit is a user terminal serving as a sender of said transfer signal and being connected to said first edge node and wherein said user terminal feeds said tracing signal to said first edge node.

13. The network management system according to claim 4, wherein said path information acquiring unit is a user terminal serving as a sender of said transfer signal and being connected to said first edge node and wherein said user terminal feeds said information collecting signal to said first edge node.

14. The network management system according to claim 1, wherein said network is of a connectionless-mode communication type.

15. The network management system according to claim 1, wherein each of said signals is handled in a form of a packet and wherein said tracing packet has a tracing processing program to trace said transfer packet and wherein said path information acquiring unit sends out a quality control packet having a program to control a quality of communications in each of said nodes and a driving packet having a driving program to start said control program contained in said quality control packet, to said first edge node.

16. The network management system according to claim 15, wherein said path information acquiring unit simultaneously sends out said tracing packet and said quality control packet.

17. The network management system according to claim 15, wherein said tracing signal residing unit is made up of a first storing section to store said tracing packet fed from said path information acquiring unit and a first packet executing section to execute said program contained in said tracing processing packet in said first storing section and to insert said path information in said transfer packet into said tracing packet and wherein said tracing signal sending unit has a first packet sending section used to feed said tracing packet into which said path information has been inserted by said first packet executing section and said quality control packet fed from said path information acquiring unit, to said nodes being adjacent to each other on said transfer route for said transfer packet and wherein each of said nodes is further provided with a second storing section used to store said quality control packet, a third storing section used to store said driving packet fed from said path information acquiring unit, a third packet executing section used to execute said program contained in said driving packet in said third storing section and to produce a driving instruction to start said program contained in said quality control packet in said second storing section, a second packet executing section used to execute said quality control program driven by said driving instruction and to control said communication quality and a second packet sending section used to feed said driving packet to said nodes being adjacent to each other on said transfer route for said transfer packet.

18. The network management system according to claim 17, wherein said path information acquiring unit receives said tracing packet, said quality control packet and said driving packet fed to said second edge node from said first edge node through said relay node, from said second edge node.

19. The network management system according to claim 17, wherein said second packet executing section acquires results from said quality control processing.

20. The network management system according to claim 19, wherein said path information acquiring unit feeds an information collecting packet containing an information collecting program used to collect said path information being held by each of said nodes on said transfer route for said transfer packet, to said first edge node.

21. The network management system according to claim 20, wherein said third storing section stores said information collecting packet fed from said path information acquiring unit and wherein said third packet executing section executes said collecting program contained in said information collecting packet in said third storing section and inserts information about results from said communication quality control into said information collecting packet and wherein said second packet sending section feeds said information collecting packet to said nodes being adjacent to each other on said transfer route.

22. The network management system according to claim 21, wherein said path information acquiring unit receives said information collecting packet fed from said first edge node through said relay node to said second edge node, from said second edge node.

23. The network management system according to claim 18, wherein said path information acquiring unit is a network management unit.

24. The network management system according to claim 22, wherein said path information acquiring unit is a network management unit.

25. The network management system according to claim 23, wherein a communication server or a user terminal serving as a sender of said transfer signal is connected to said first edge node and wherein said network management unit sends out said tracing processing packet, said quality control packet and said driving packet in accordance with an instruction fed from said server or said user terminal.

26. The network management system according to claim 25, wherein said network management unit sends out said information collecting packet in accordance with an instruction fed from said server or said user terminal.

27. The network management system according to claim 15, wherein said path information acquiring unit is a communication server being connected to said first edge node or a user terminal serving as a sender of said transfer signal being connected to said first edge node.

28. The network management system according to claim 20, wherein said path information acquiring unit is a communication server being connected to said first edge node or a user terminal serving as a sender of said transfer packet being connected to said first edge node.

29. The network management system according to claim 17, wherein said network is of a connectionless-mode communication type.

30. The network management system according to claim 1, wherein each of said signals is handled in a form of a packet and wherein said tracing packet has a tracing processing program to trace said transfer packet and wherein said path information acquiring unit sends out a filtering processing packet containing a filtering processing program to select a transfer packet fed from said each of nodes based on a predetermined condition and a driving packet having a driving program to start said program contained in said processing packet, to said first edge node.

31. The network management system according to claim 30, wherein said path information acquiring unit simultaneously sends out said tracing packet and said filtering processing packet.

32. The network management system according to claim 30, wherein said tracing signal residing unit is provided with a first storing section used to store said tracing packet fed from said path information acquiring unit and with a first packet executing section used to execute said processing program contained in said tracing packet in said first storing section and to insert said path information in said transfer packet into said tracing packet and wherein said tracing signal sending unit is provided with a first packet sending section used to feed said tracing packet into which said path information has been inserted by said first packet executing section and said transfer packet fed from said path information acquiring unit to said nodes being adjacent to each other on said transfer route for said transfer packet and wherein each of said nodes is further provided with a second storing section used to store said filtering processing packet, with a third storing section used to store said driving packet fed from said path information acquiring unit, with a third packet executing section used to execute said driving program contained in said driving packet in said third storing section and to produce a driving instruction to start said program contained in said filtering processing packet in said second storing section, with a second packet executing section used to execute said filtering processing program driven by said driving instruction and to perform said filtering processing and with a second packet sending section used to feed said driving packet to said nodes being adjacent to each other on said transfer route for said transfer packet.

33. The network management system according to claim 32, wherein said second packet executing section acquires information about results from said filtering processing.

34. The network management system according to claim 33, wherein said path information acquiring unit feeds an information collecting packet having an information collecting program to collect said path information being held by each of said nodes on said transfer route for said transfer packet, to said first edge node.

35. The network management system according to claim 34, wherein said third storing section stores said information collecting packet fed from said path information acquiring unit and wherein said third packet executing section executes said collecting program contained in said information collecting packet in said third storing section and inserts information about results from said filtering processing into said information collecting packet and wherein said second packet sending section feeds said information collecting packet to said nodes being adjacent to each other on said transfer routes.

36. The network management system according to claim 35, wherein said path information acquiring unit receives said information collecting packet fed to said second edge node from said first edge node through said relay node, from said second edge node.

37. The network management system according to claim 30, wherein said path information acquiring unit is a network management unit and wherein said network management unit has a first packet producing and transmitting section used to produce said tracing packet and said filtering processing packet and to send out both said packets and a second packet producing and transmitting section used to said driving packet and to send out said driving packet and wherein, after said tracing processing packet and said filtering packet have been sent out from said first packet producing and transmitting section, said driving packet is transmitted from said second packet producing and transmitting section.

38. The network management system according to claim 34, wherein said path information acquiring unit is a network management unit and wherein said network management unit is provided with a first packet producing and transmitting section used to produce said tracing packet and said filtering processing packet and to send out said both packets, with a second packet producing and transmitting section used to produce said driving packet and to send out said produced driving packet and with a third packet producing and transmitting section used to produce said information collecting packet and to send out said produced information collecting packet and wherein, after said tracing processing packet and said filtering processing packet have been sent out from said first packet producing and transmitting section, said driving packet is sent out from said second packet producing and transmitting section and, after said transmission of said driving packet, said information collecting packet is sent out from said third packet producing and transmitting section and said information collecting packet fed to said second edge node through said relay node from said first edge node is received from said second edge node.

39. The network management system according to claim 37, wherein a communication server or a user terminal serving as a sender of said transfer signal is connected to said first edge node and wherein said network management unit sends out said tracing processing packet, said filtering processing packet and said driving packet in accordance with an instruction fed form said communication server or said user terminal.

40. The network management system according to claim 38, wherein a communication server or a user terminal serving as a sender of said transfer signal is connected to said first edge node and wherein said network management unit sends out said tracing processing packet, said filtering processing packet, said driving packet and said information collecting packet in accordance with an instruction fed from said communication server and user terminal.

41. The network management system according to claim 30, wherein said path information acquiring unit is a communication server being connected to said first edge node or a user terminal serving as a sender of said transfer signal being connected to said first edge node.

42. The network management system according to claim 36, wherein said path information acquiring unit is a communication server being connected to said first edge node or a user terminal serving as a sender of said transfer signal being connected to said first edge node.

43. The network management system according to claim 32, wherein said network is of a connectionless mode communication type.

44. The network management system according to claim 1, wherein each of said signals is handled in a form of a packet and wherein said tracing packet has at least a tracing processing program to trace said transfer packet and wherein said path information acquiring unit sends out a Service Level Agreement (SLA) management packet having a program to manage said SLA processing and check as to whether predetermined service is maintained in accordance with said SLA already agreed in advance between said network manager and a user and information collecting packet having an information collecting program to collect said path information held by each of said nodes on said transfer route for said transfer packet, to said first edge node.

45. The network management system according to claim 44, wherein said path information acquiring unit simultaneously sends out said tracing packet and said SLA packet.

46. The network management system according to claim 44, wherein said tracing signal residing unit is provided with a first storing section used to store said tracing packet fed from said path information acquiring unit and with a first packet executing section used to execute said processing program contained in said tracing packet in said first storing section and to insert said transfer information in said transfer packet into said tracing packet and wherein said tracing signal sending unit has a first packet sending section used to feed said tracing packet into which said path information has been inserted by said first packet executing section and said SLA management packet fed from said path information acquiring unit to said nodes being adjacent to each other on said transfer route for said transfer packet and wherein each of said nodes is further provided with a second storing section used to store said SLA management packet, with a second packet executing section used to execute said management program contained in said SLA management packet in said second storing section and to acquire information about results form transfer management of said transfer packet, with a third storing section used to store said information collecting packet fed from said path information acquiring unit, with a third packet executing section used to execute said collecting program contained in said information collecting packet in said third storing section and to insert information about results from management obtained from said second packet executing section into said information collecting packet and with a second packet sending section used to feed said information collecting packet into which information about said management results is inserted by said third packet executing section to said nodes being adjacent to each other on said transfer route for said transfer packet.

47. The network management system according to claim 46, wherein said second storing section stores said information about results from said management obtained by said second packet.

48. The network management system according to claim 46, wherein said third packet executing section inserts said packet information contained in said transfer packet into said information collecting packet.

49. The network management system according to claim 46, wherein said path information collecting unit receives said information collecting packet fed to said second edge node through said relay node from said first edge node, from said second edge node.

50. The network management system according to claim 44, wherein said path information acquiring unit, when having judged, based on predetermined conditions, that said transfer route for said transfer packet is put in a congestion state, sends out a congestion avoiding packet having a program to reduce said congestion state so that said transfer packet is able to avoid said congestion.

51. The network management system according to claim 50, wherein said third storing section stores said congestion avoiding packet fed from said path information acquiring unit and wherein said third packet executing section executes said congestion avoiding program contained in said congestion avoiding packet in said third storing section and wherein said second packet sending section feeds said congestion avoiding packet to said nodes being adjacent to each other on said transfer route.

52. The network management system according to claim 51, wherein said path information acquiring unit receives said congestion avoiding packet fed to said second edge node through said relay node from said first edge node, from said second edge node.

53. The network management system according to claim 49, wherein said path information acquiring unit is a network management unit and wherein said network management unit is provided with a first packet producing and transmitting section used to produce said tracing packet and said SLA management packet and to send said both produced tracing processing packet and SLA management packets, with a second packet producing and transmitting section used to produce said information collecting packet and to send out said produced packet and with a first packet receiving section to receive said information collecting packet and wherein, after said transmission of said tracing processing packet and said SLA management packet from said first packet producing and transmitting section, said information collecting packet is sent out from said second packet producing and transmitting section.

54. The network management system according to claim 52, wherein said path information acquiring unit is a network management unit and wherein said network management unit is provided with a first packet producing and transmitting section used to produce said tracing packet and said SLA management packet and to send out said both packets, with a second packet producing and transmitting section used to produce said information collecting packet and to send out said produced packet, with a third packet producing and transmitting section used to produce said congestion avoiding packet and to send out said produced packet, based on said predetermined conditions, and with a second packet receiving section used to receive said information collecting packet and said congestion avoiding packet and wherein, after transmission of said tracing processing packet and said SLA management packet from said first packet producing and transmitting section, said information collecting packet is sent out from said second packet producing and transmitting section and, after said transmission of said information collecting packet, said congestion avoiding packet is sent out, whenever necessary, from said third packet producing and transmitting section.

55. The network management system according to claim 54, wherein said predetermined condition for said congestion avoiding packet is that said information collecting packet is not supplied to said path information acquiring unit within a fixed time.

56. The network management system according to claim 53, wherein a communication server or a user terminal serving as a sender of said transfer signal is connected to said first edge node and wherein said network management unit, based on an instruction fed from said server or user terminal, sends out said tracing processing packet, said SLA management packet and said information collecting packet.

57. The network management system according to claim 54, wherein a communication server or a user terminal serving as a sender of said transfer signal is connected to said first edge node and wherein said network management unit, based on an instruction fed from said server or user terminal, sends out said tracing processing packet, said SLA management packet, said information collecting packet and said congestion avoiding packet.

58. The network management system according to claim 46, wherein said third packet executing section inserts information about time when execution of said information collecting program has started and about time when running of said information collecting program has ended, into information about results from said management.

59. The network management system according to claim 49, wherein said SLA management unit used to manage said SLA is connected to said path information acquiring unit and wherein said path information acquiring unit, based on said management result information being stored in said information collecting packet fed from said second edge node and on unit information being able to be obtained for every unit of predetermined information about said management results, produces information about a return to a user of said network and feeds said information about said returns to said SLA management unit.

60. The network management system according to claim 54, wherein said network management unit inserts information about a first time showing time when said third packet producing and transmitting section has transmitted said congestion avoiding packet, into said congestion avoiding packet and information about a second time showing time when said second packet receiving section has received said congestion avoiding packet, into said congestion avoiding packet.

61. The network management system according to claim 60, wherein said LSA management unit used to control said SLA is connected to said network management unit and wherein said network management unit, based on information about a third time showing a difference between said first time and said second time contained in said congestion avoiding packet having received by said second packet receiving section and on unit time information obtained for every predetermined information unit of said third time information, produces information about said return for a user of said network and feeds said information about said return to said SLA management unit.

62. The network management system according to claim 46, wherein said network is of a connectionless mode communication type.

63. A node for being used in a communication network which is mounted on a transfer route for a transfer signal passing through said network and which receives a tracing signal used to trace said transfer signal and which stores information about a path on said transfer route for said transfer signal,comprising: a path information holding unit to hold information about said path for said transfer signal passing through said path information holding unit; a tracing signal residing unit, when having said tracing signal, to cause said tracing signal to be resident in said tracing signal residing unit and to produce a replica of said tracing signal; and a tracing signal sending unit to feed said replica of said tracing signal to nodes being adjacent to each other on said transfer route for said transfer signal.

\* \* \* \* \*